WESLEY B. BARTON
GALE C. CHAPMAN
ROBERT N. FERRY
NORMAN JOEHLIN
LEROY C. KLEIST
ARTHUR W. TYLER
INVENTORS

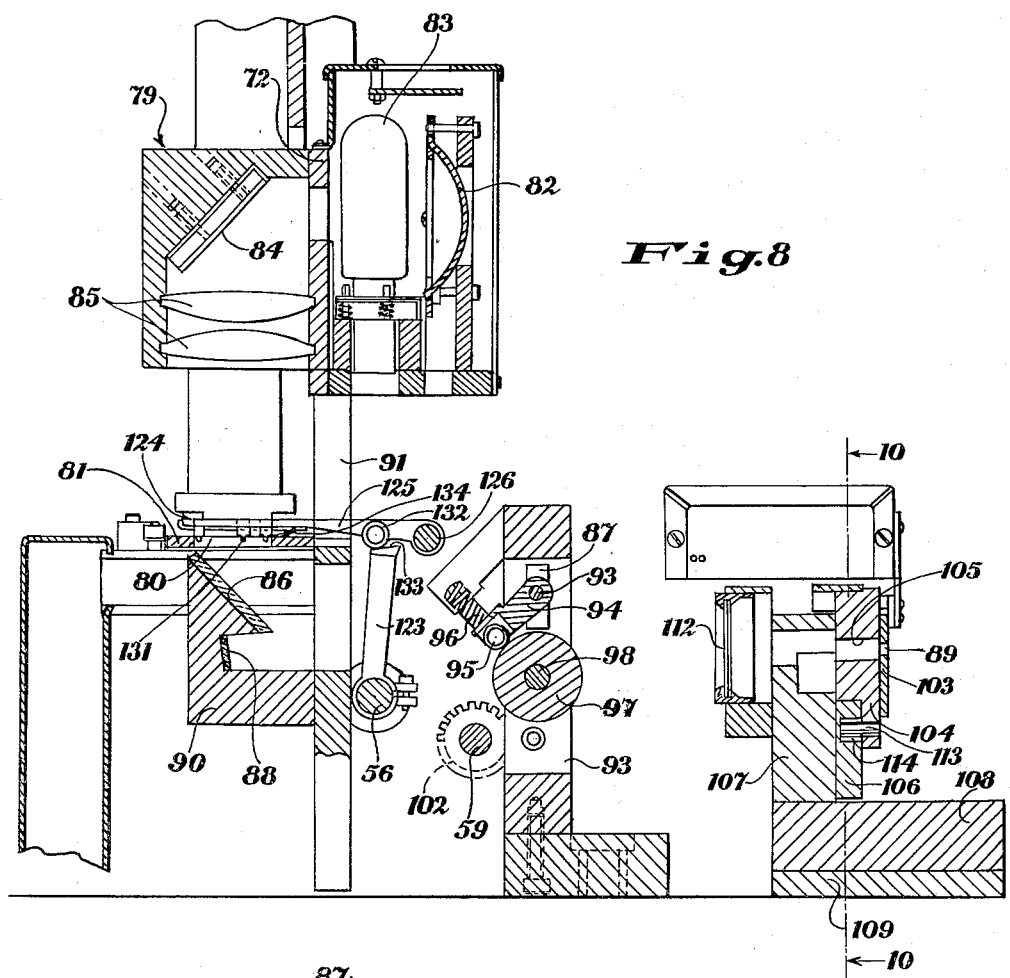
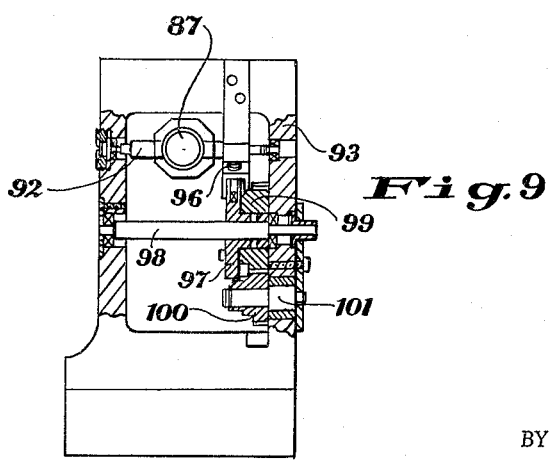

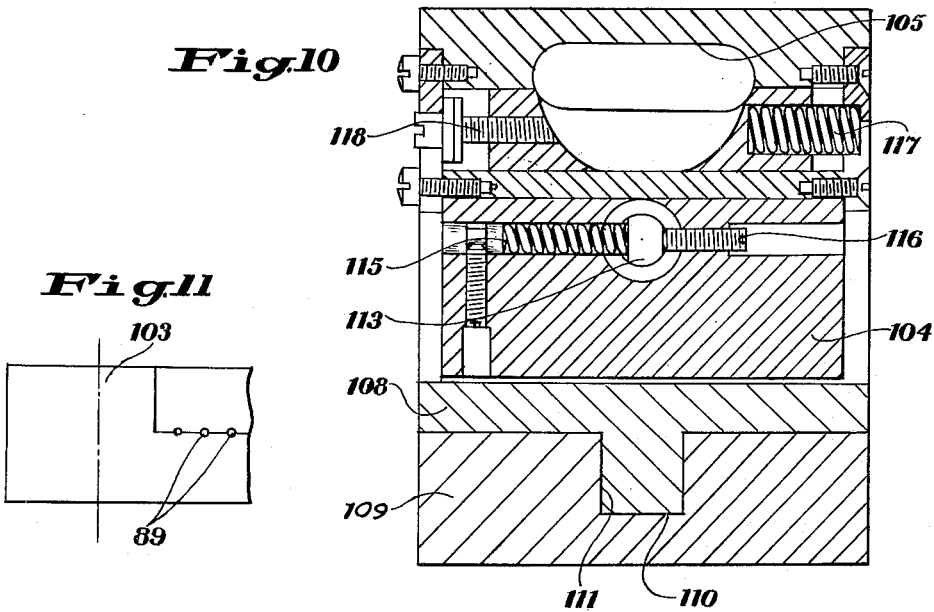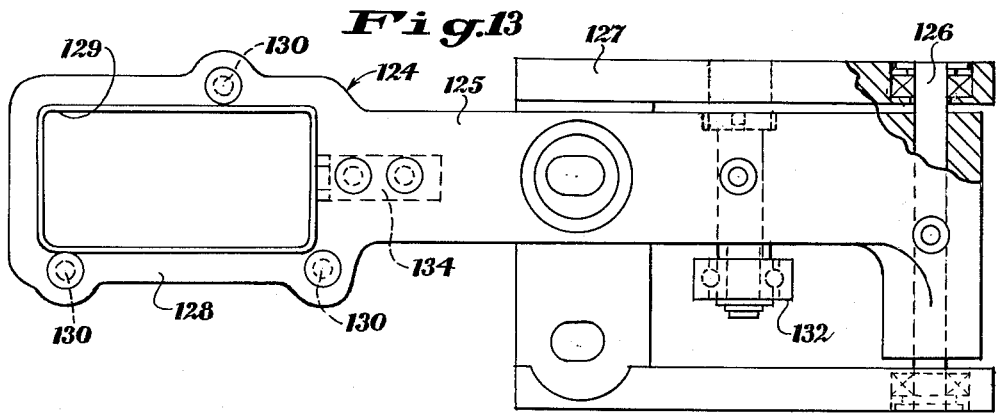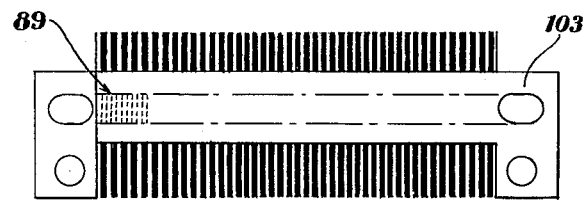

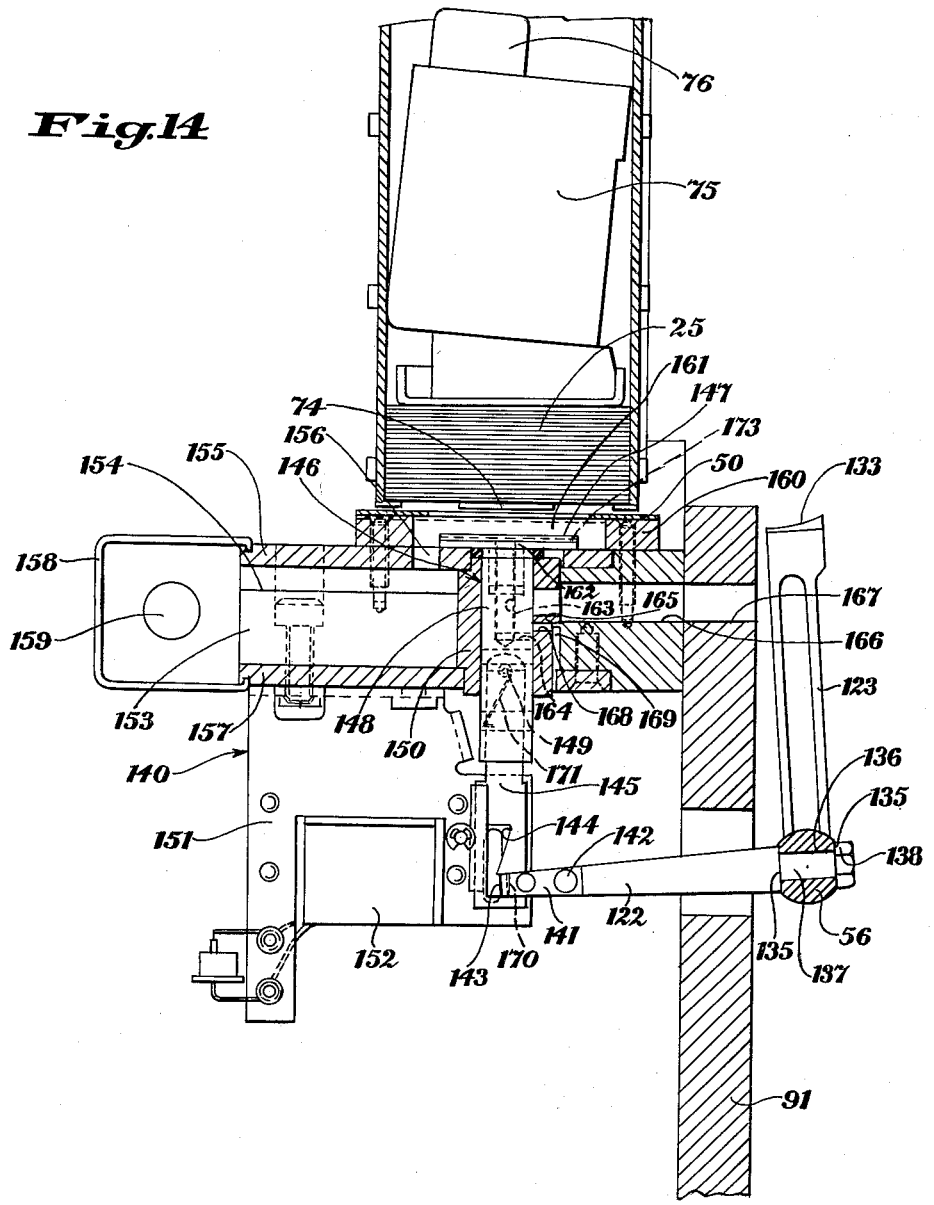

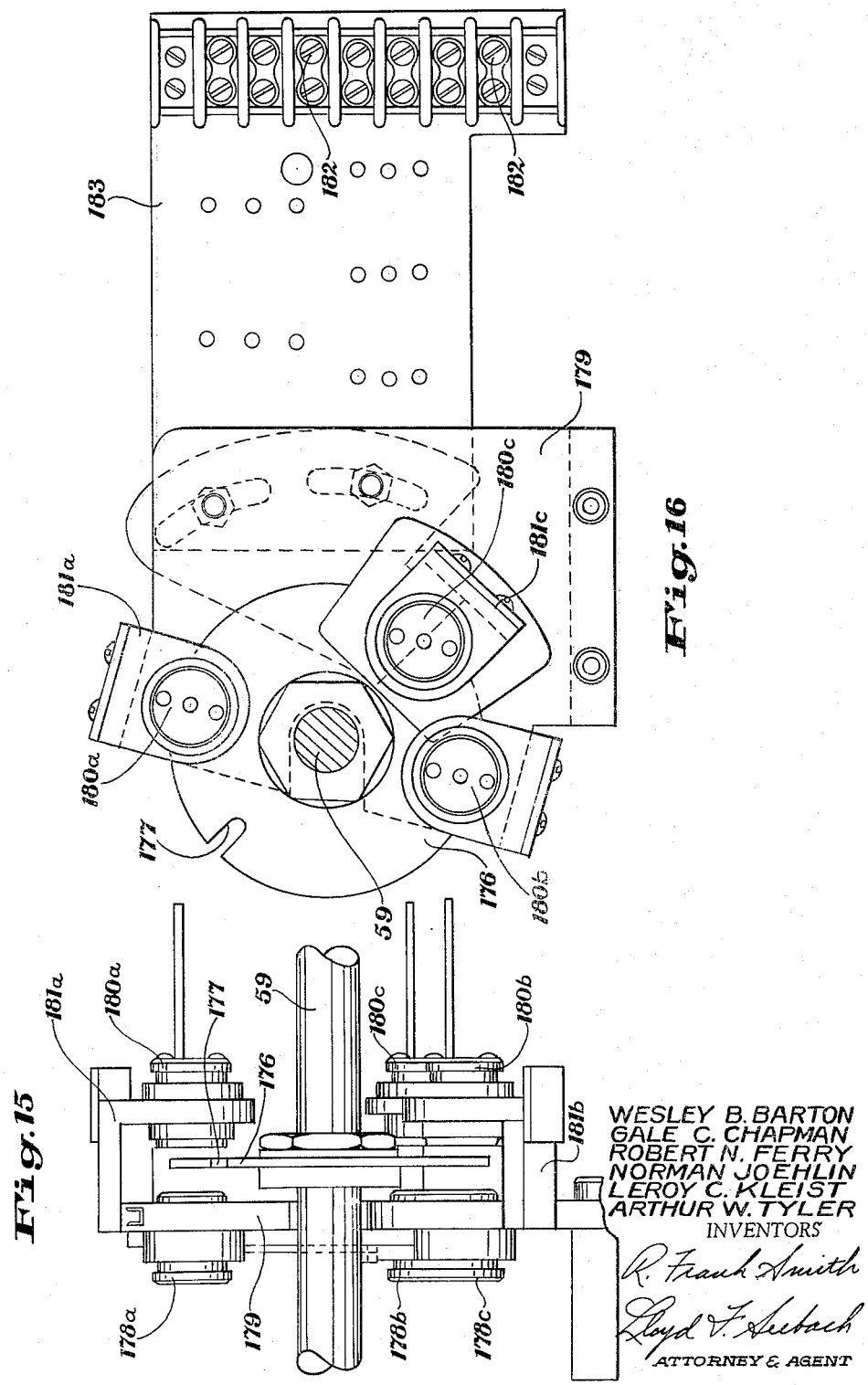

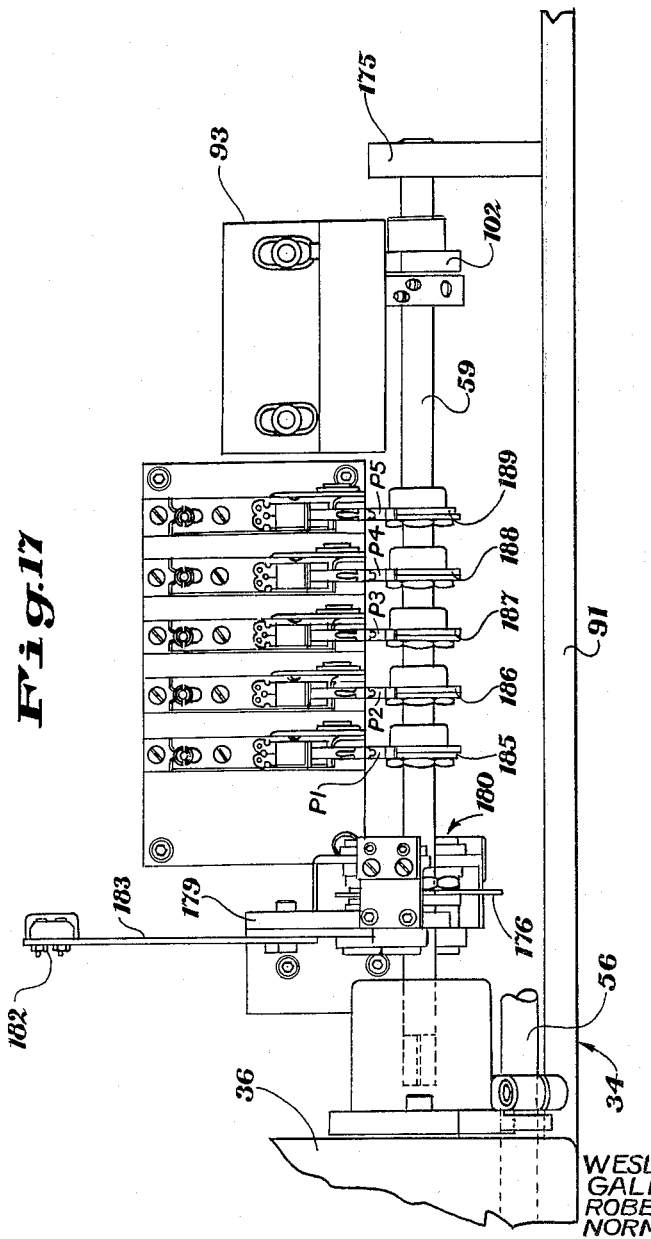

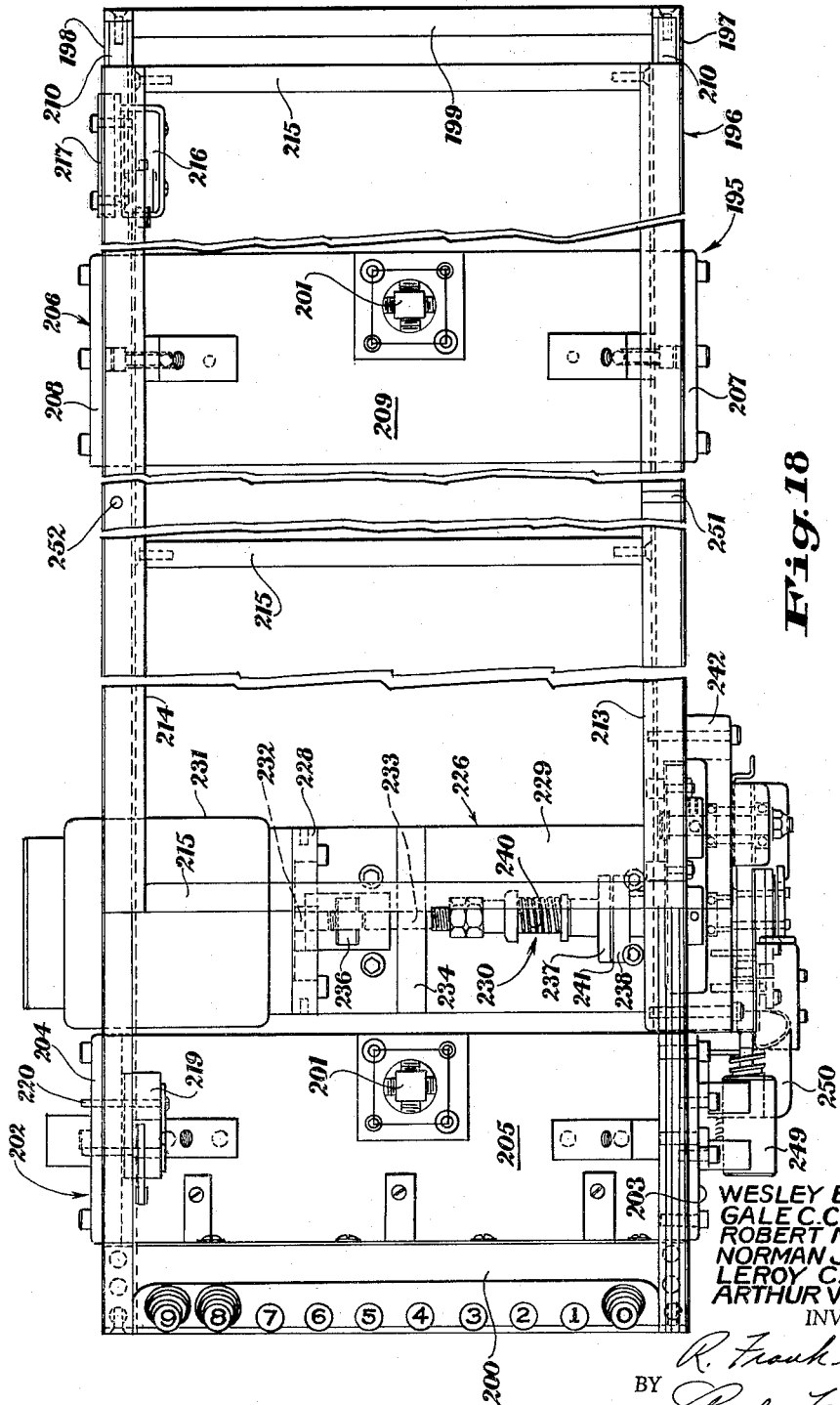

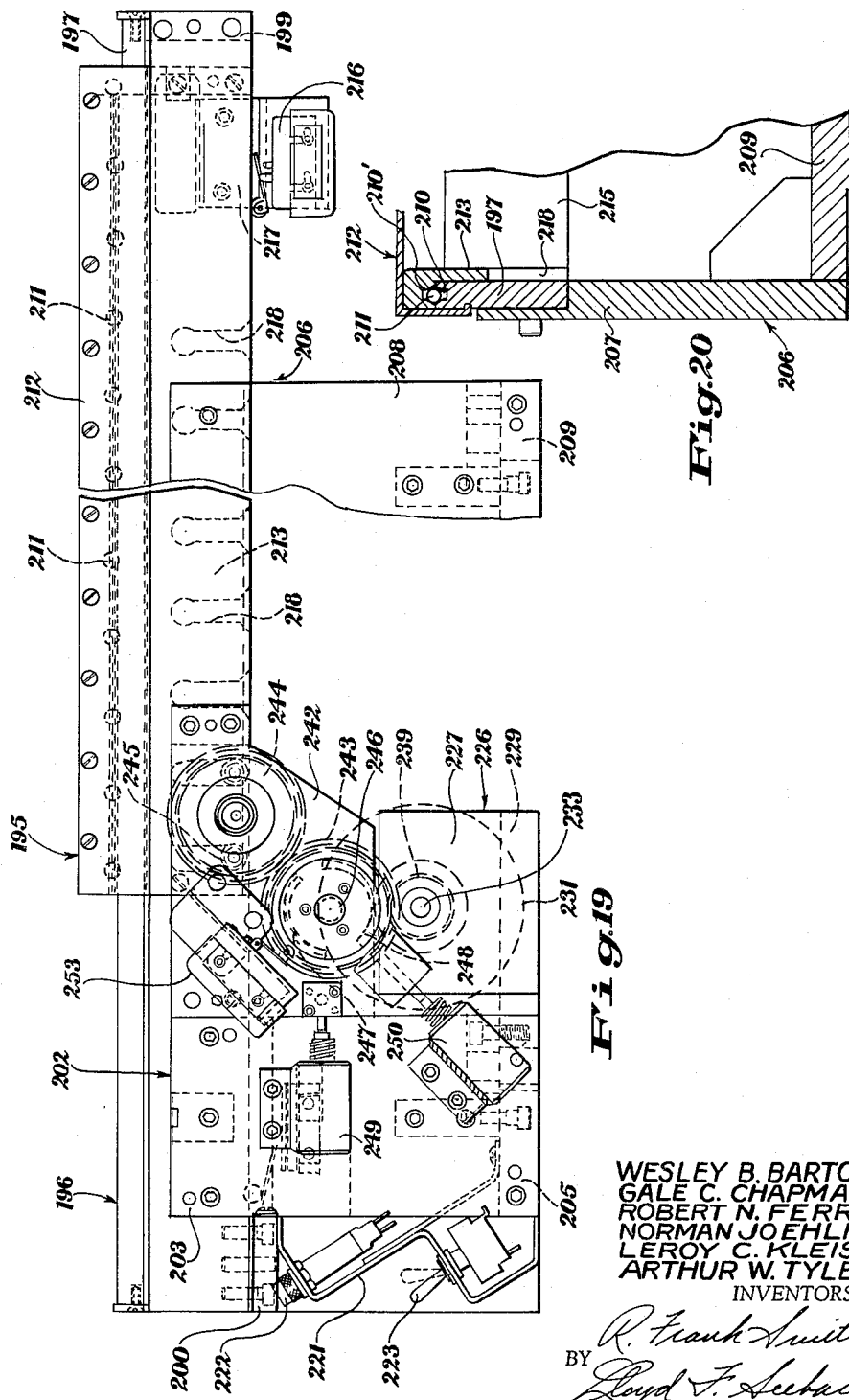

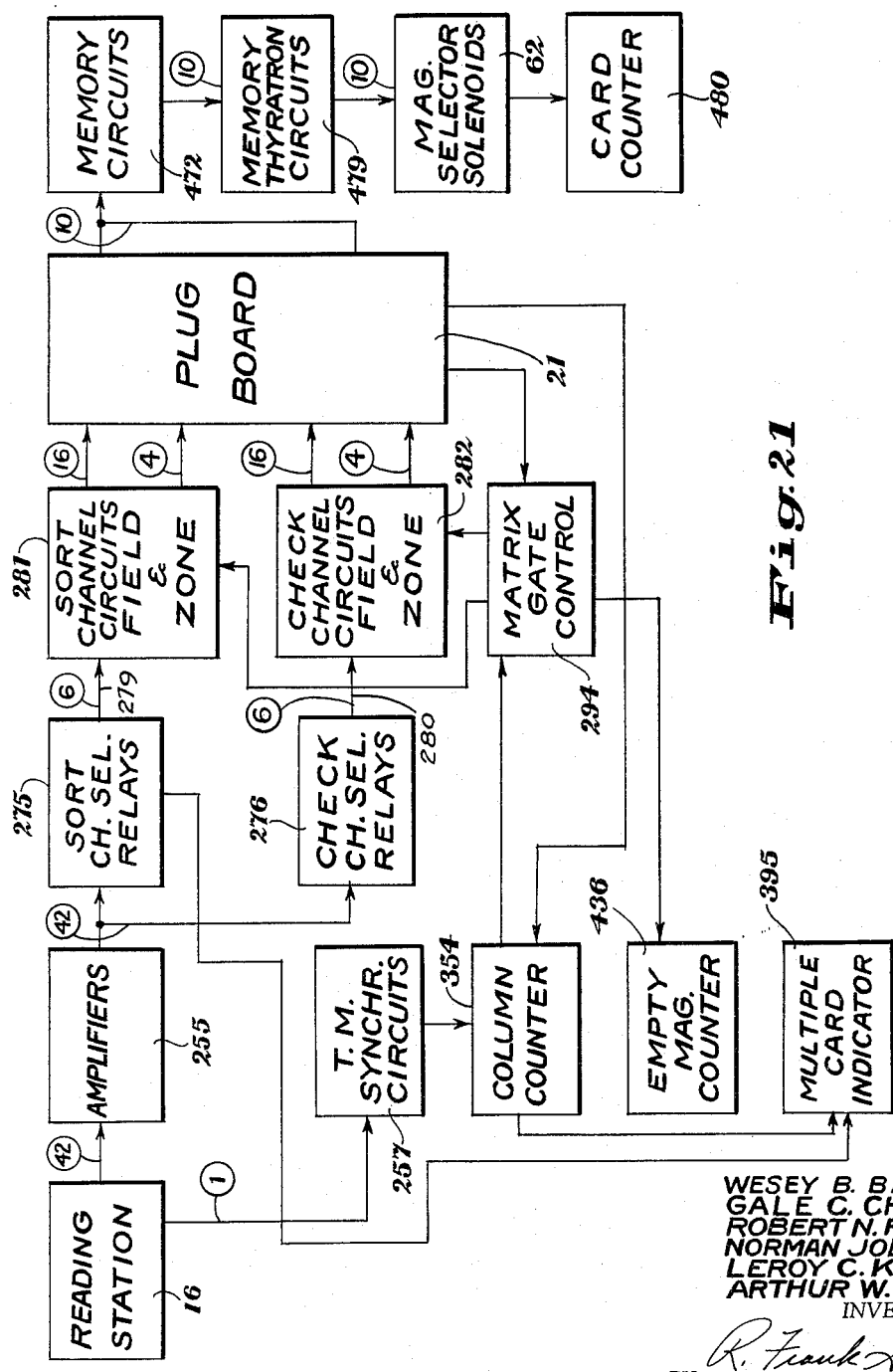

SORT & CHECK CHARACTER RELAYS

WESLEY B. BARTON
GALE C. CHAPMAN
ROBERT N. FERRY
NORMAN JOEHLIN
LEROY C. KLEIST
ARTHUR W. TYLER
INVENTORS

BY R. Frank Smith
Lloyd F. Seebach
ATTORNEY & AGENT

Aug. 15, 1961

W. B. BARTON ET AL 2,996,184

AUTOMATIC SORTING DEVICE

Filed March 18, 1958

WESLEY B. BARTON
GALE C. CHAPMAN
ROBERT N. FERRY
NORMAN JOEHLIN
LEROY C. KLEIST
ARTHUR W. TYLER
INVENTORS

BY R. Frank Smith
Lloyd F. Seebach
ATTORNEY & AGENT

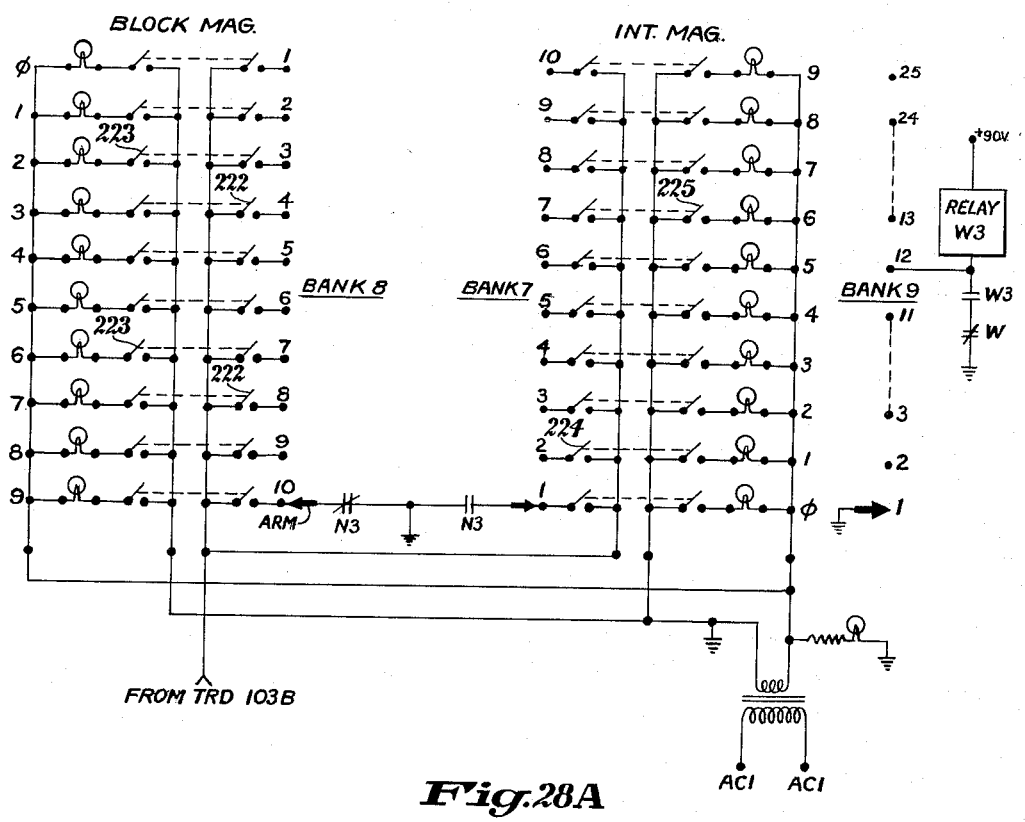

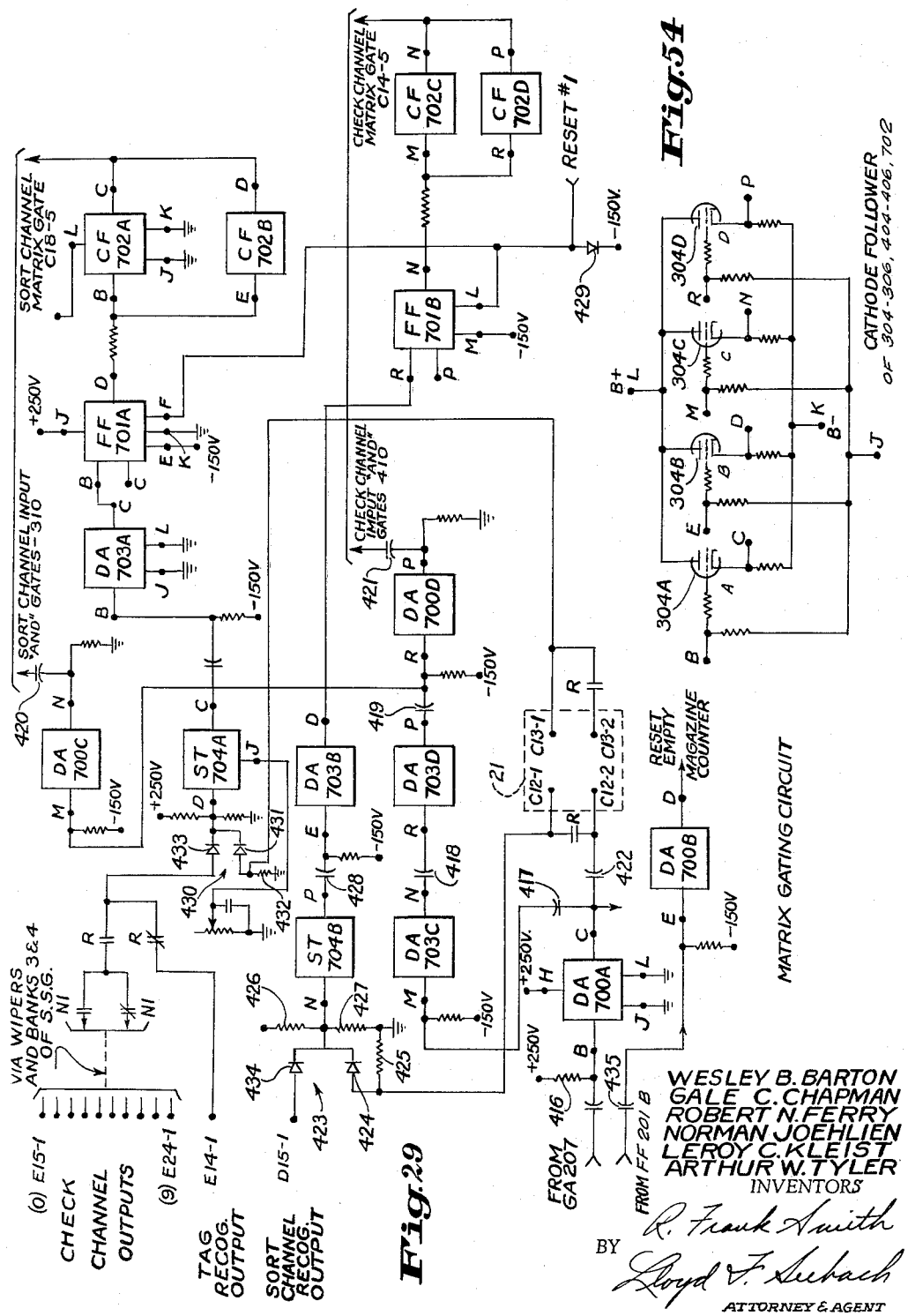

WESLEY B. BARTON
GALE C. CHAPMAN
ROBERT N. FERRY
NORMAN JOEHLIN
LEROY C. KLEIST
ARTHUR W. TYLER
INVENTORS

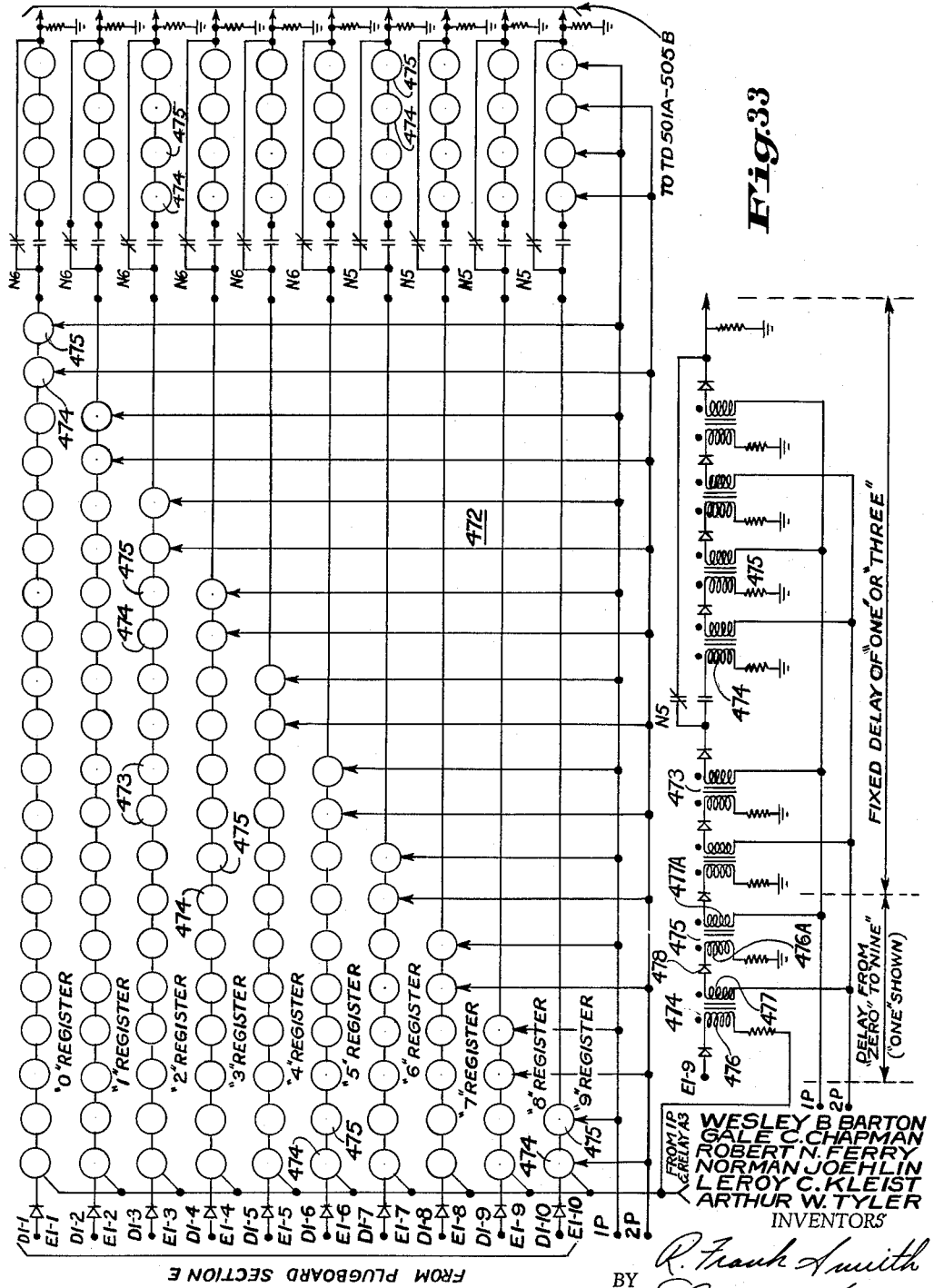

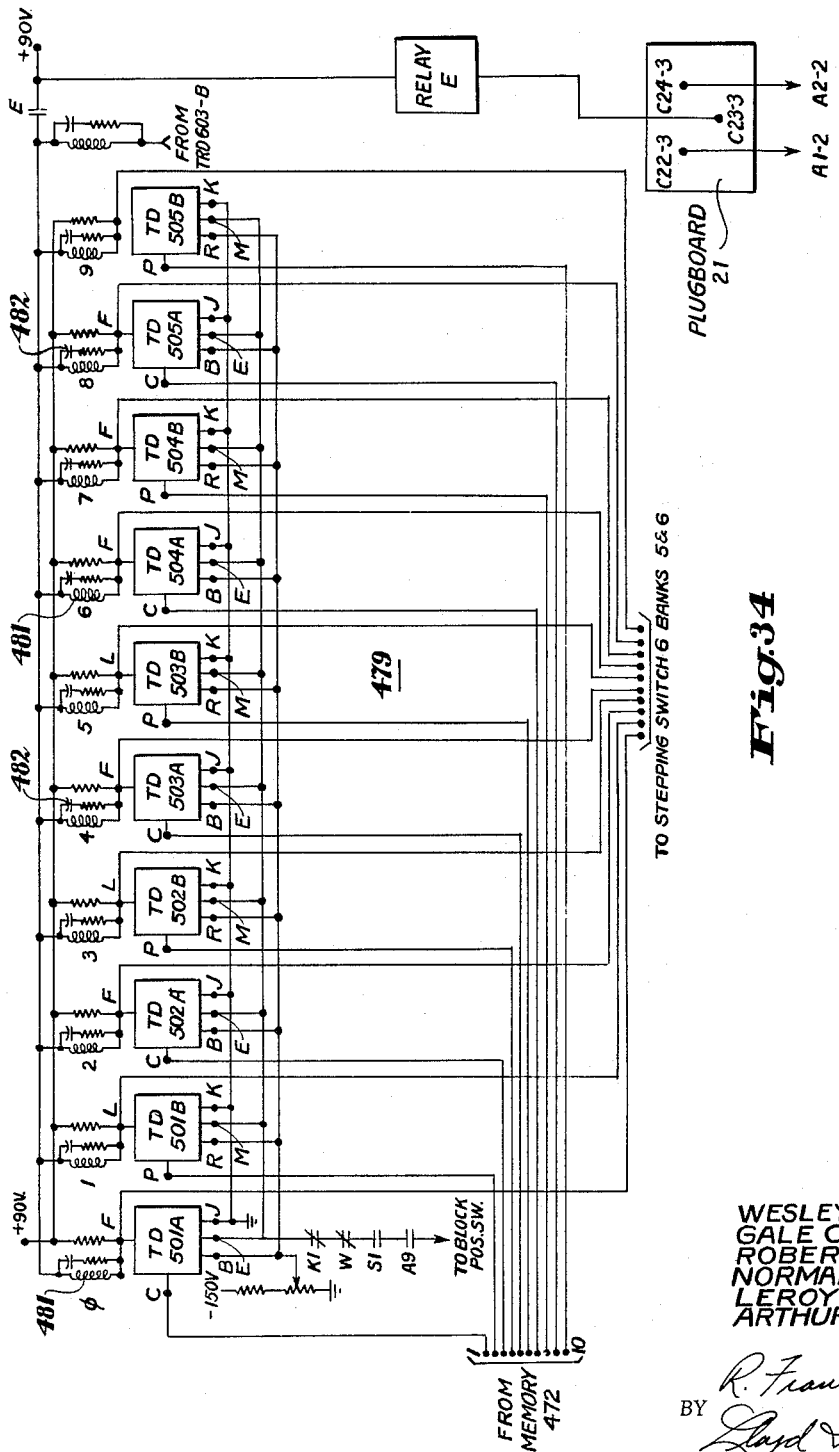

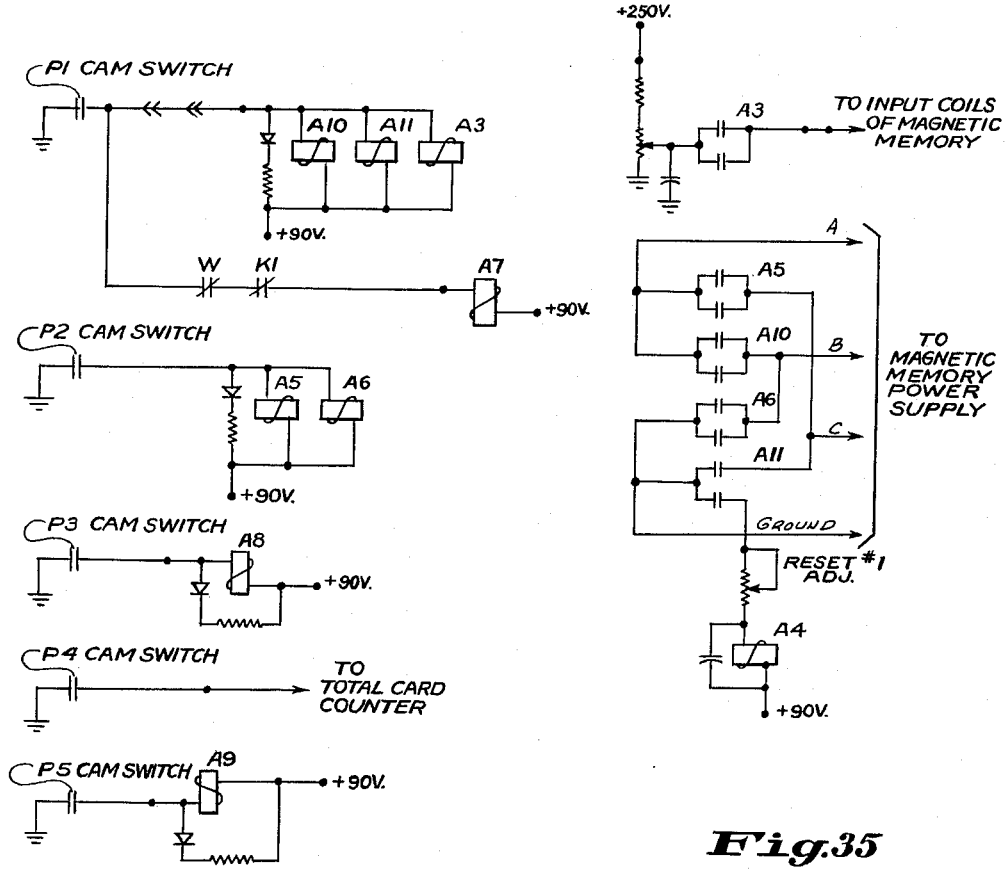
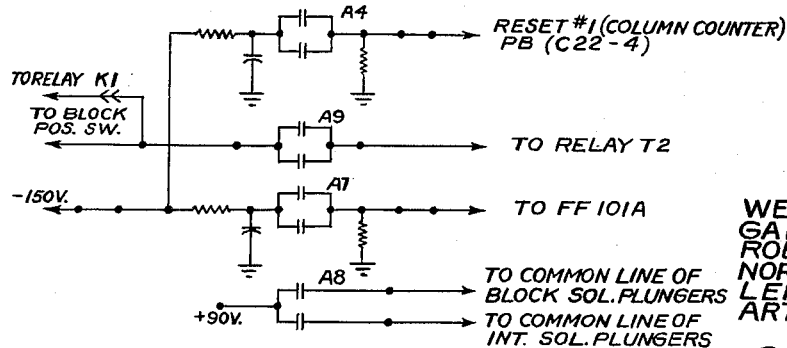
Fig. 35

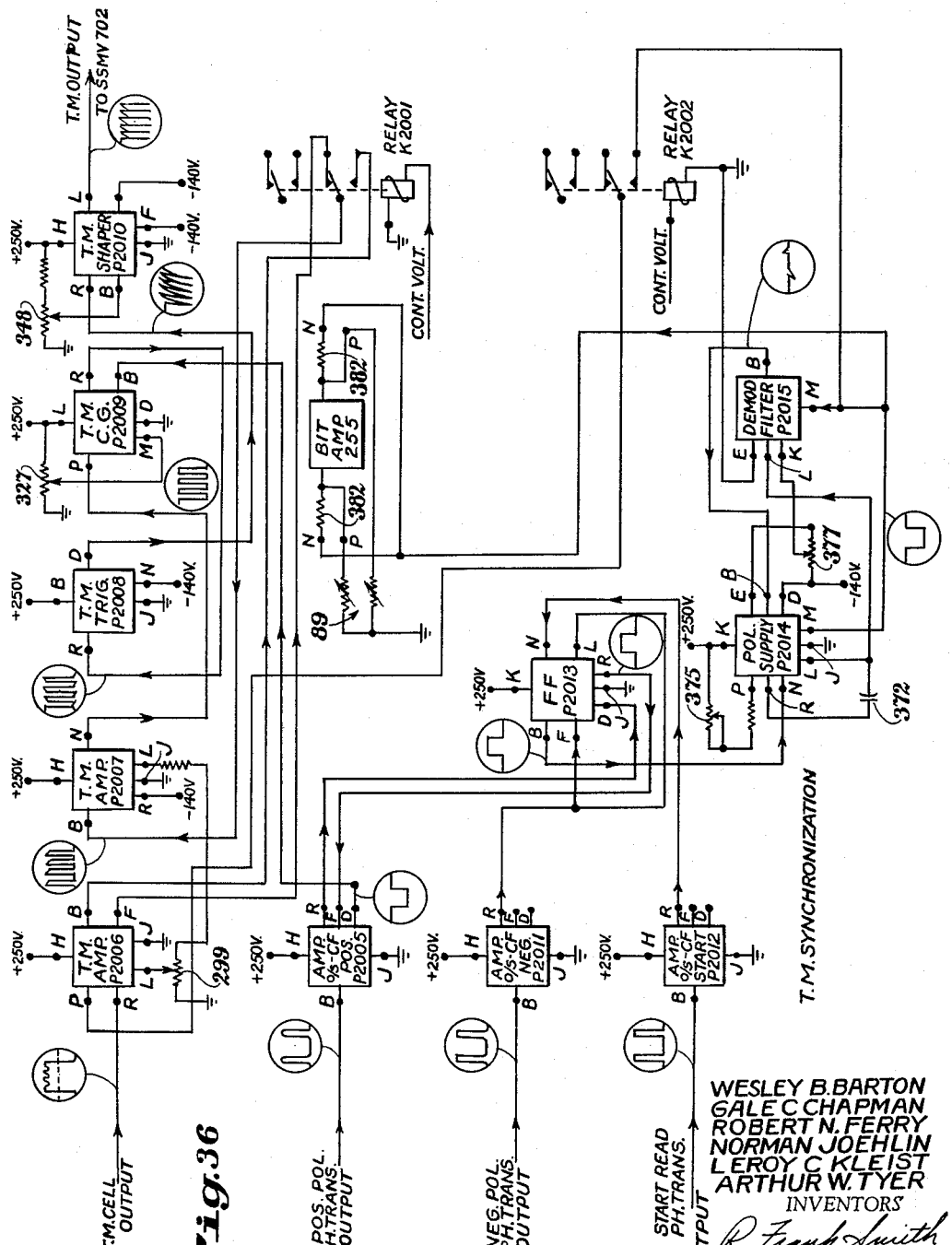

WESLEY B. BARTON
GALE C. CHAPMAN
ROBERT N. FERRY
NORMAN JOEHLIN
LEROY C. KLEIST
ARTHUR W. TYLER
INVENTORS

Aug. 15, 1961 W. B. BARTON ET AL 2,996,184
AUTOMATIC SORTING DEVICE
Filed March 18, 1958 36 Sheets-Sheet 30
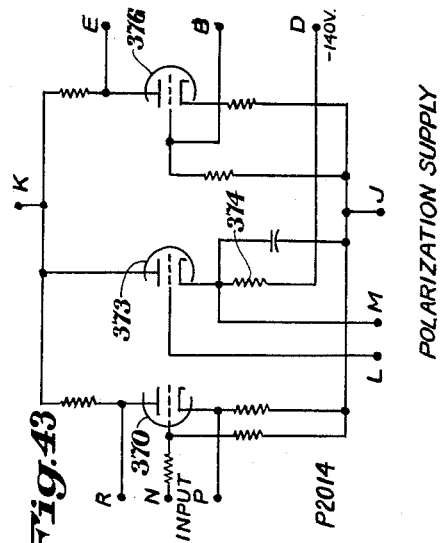
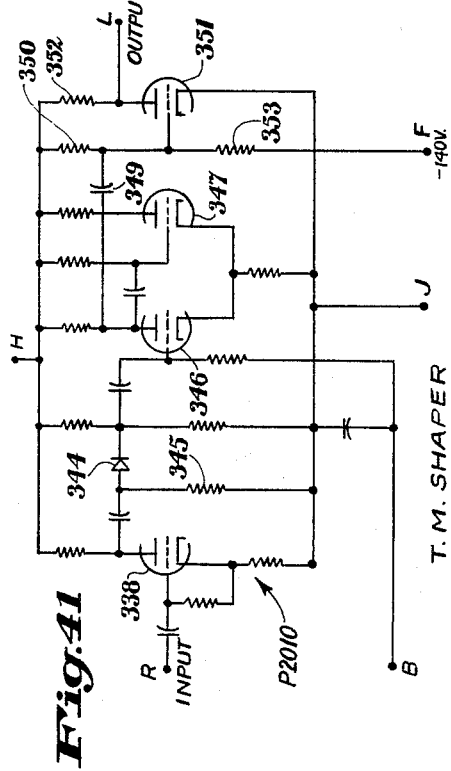
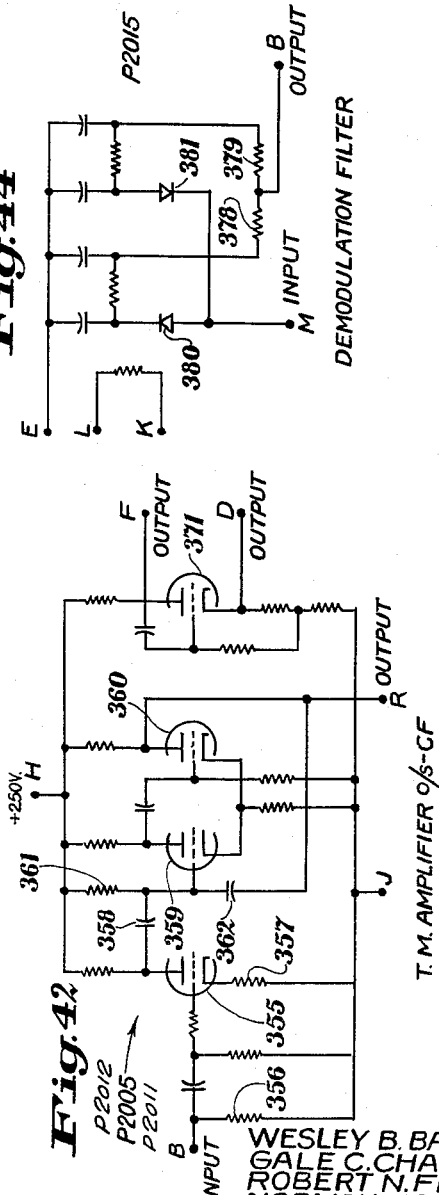
WESLEY B. BARTON
GALE C. CHAPMAN
ROBERT N. FERRY
NORMAN JOEHLIN
LEROY C. KLEIST
ARTHUR W. TYLER
INVENTORS
BY R. Frank Smith
Lloyd F. Seebach
ATTORNEY & AGENT

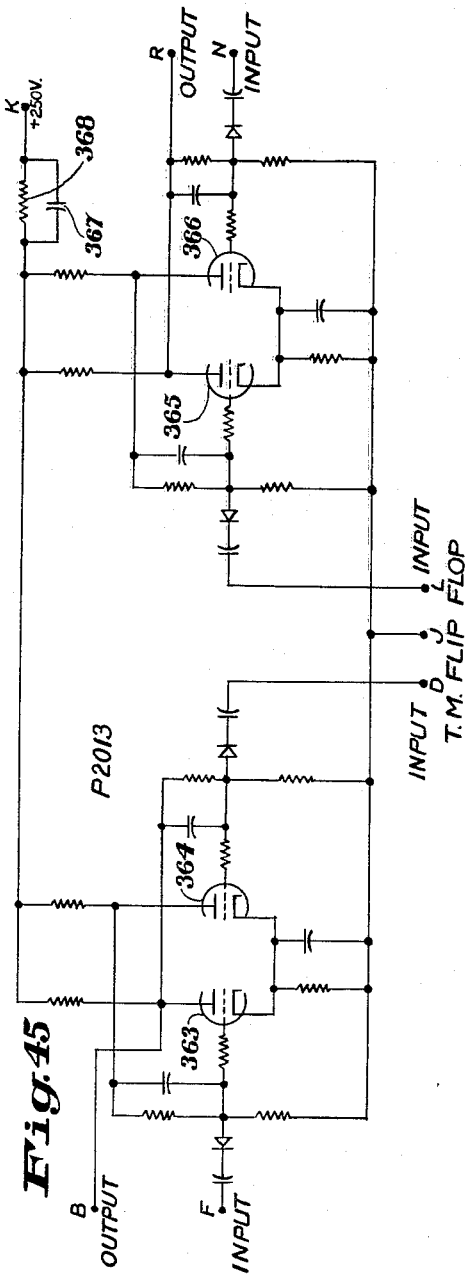
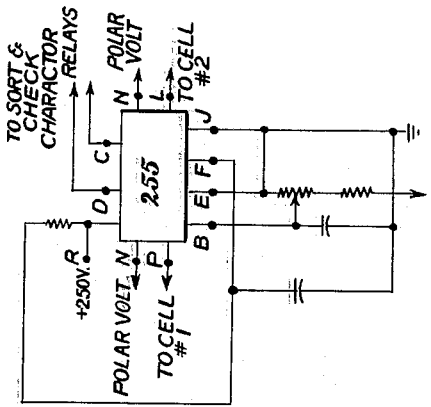
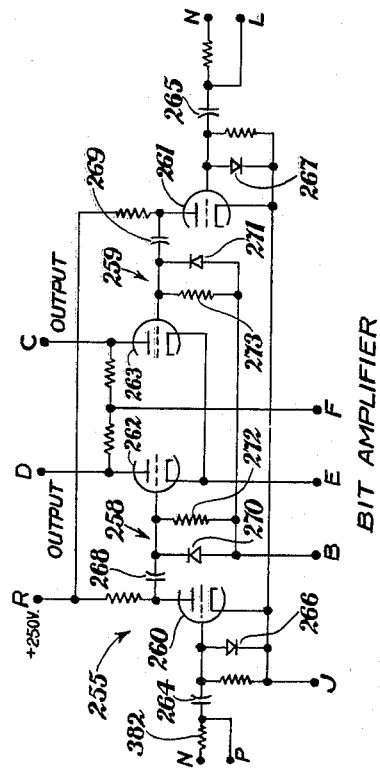

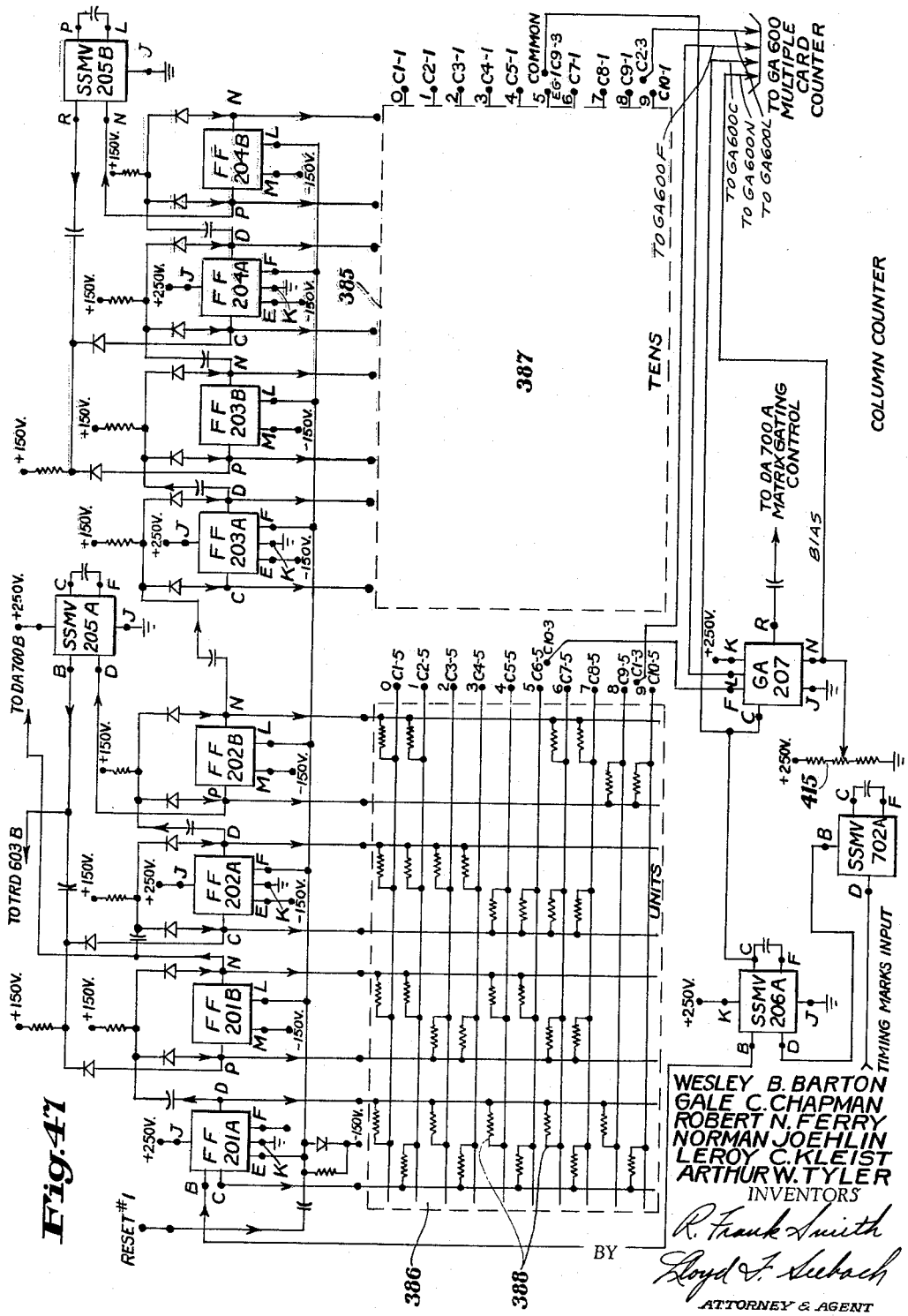

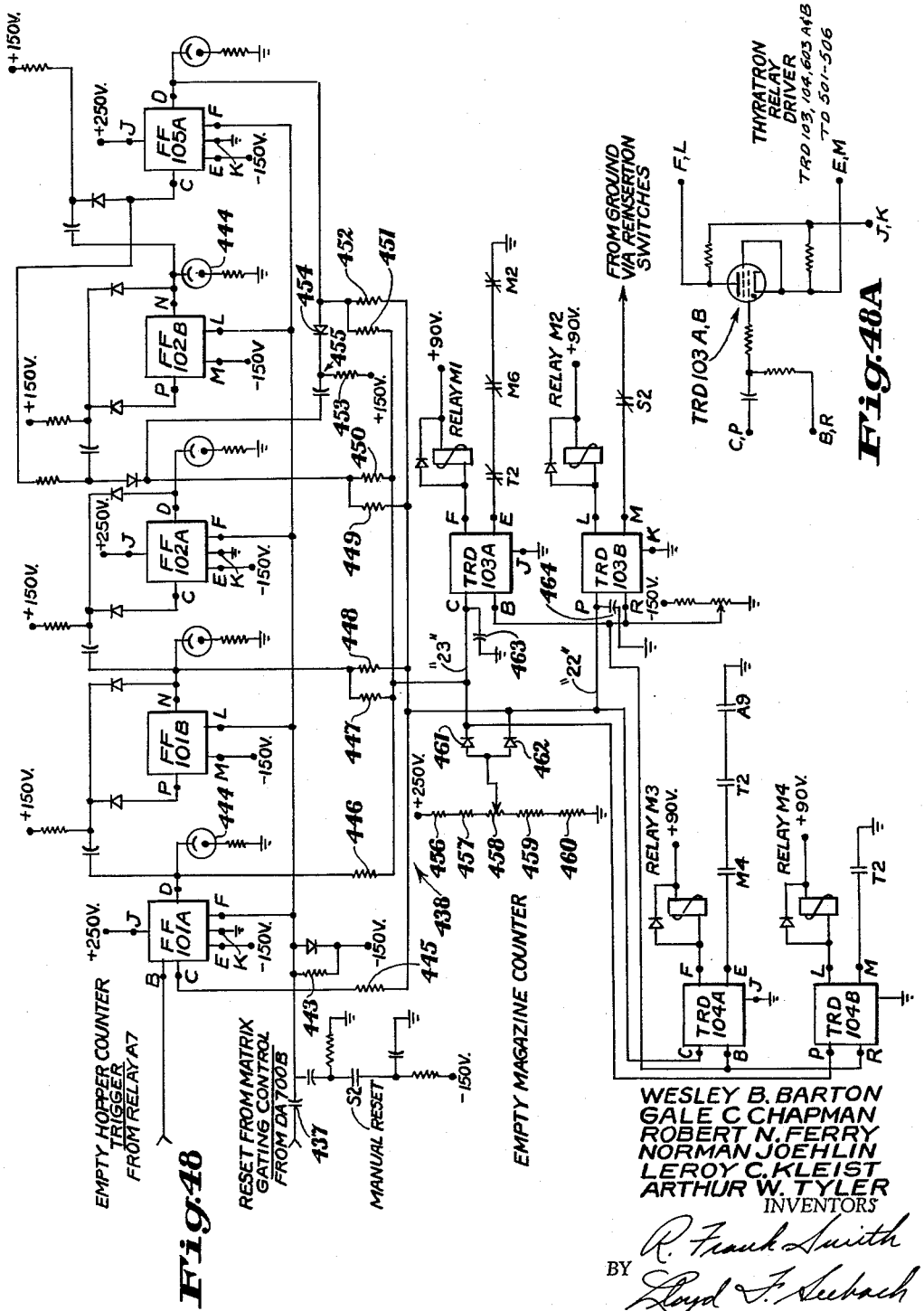

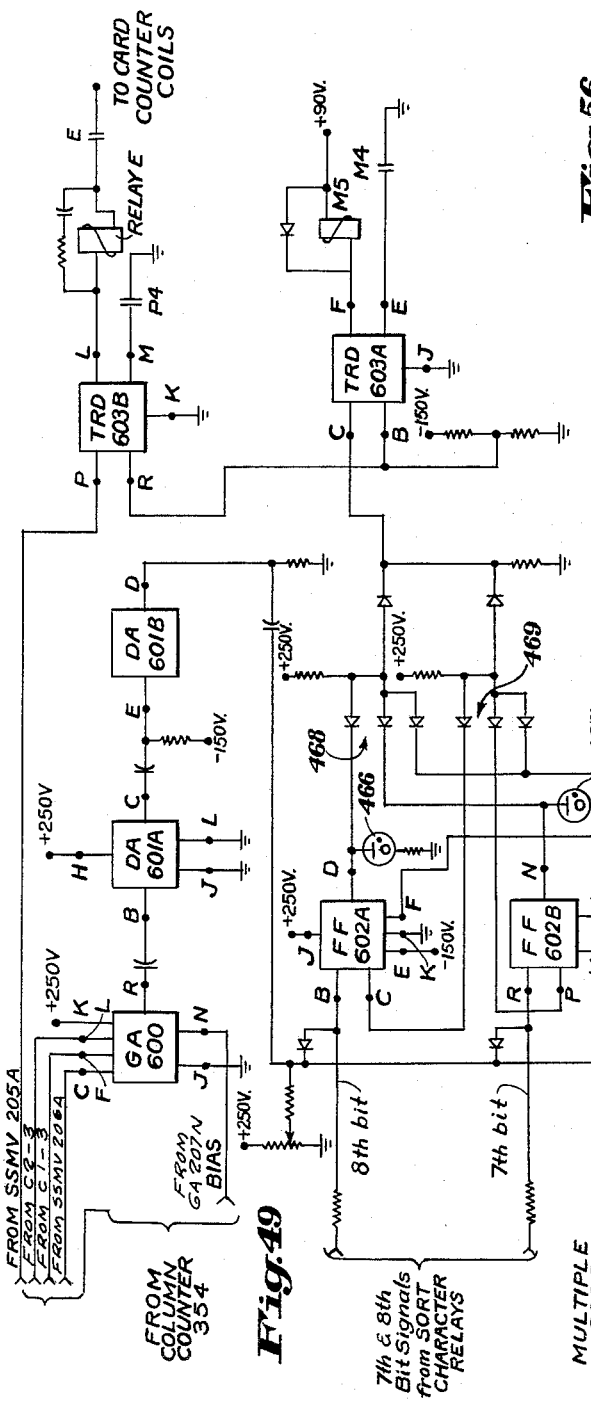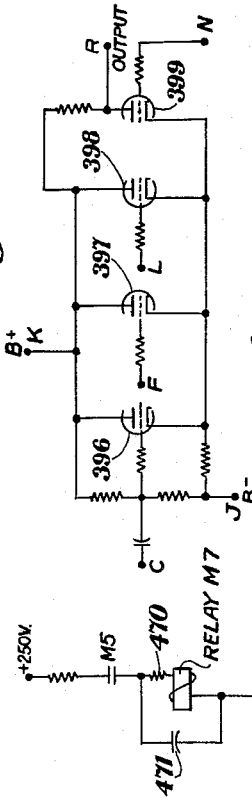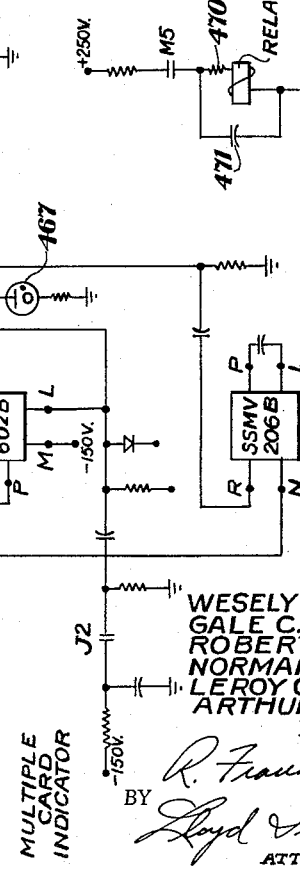

FF 101, 102, 105
FF 201-204
FF 307-309
FF 407-409
FF 602, 701, 702

FLIP FLOP

TIMING CAPACITORS (TIME DELAY REQUIRED DETERMINES VALUE - EXTERNAL TO PACKAGE)

SINGLE SHOT MULTIVIBRATOR
SSMV 205, 206, 702

DRIVER AMPLIFIER
DA 601, 700, 703

SCHMITT TRIGGER

WESLEY B. BARTON
GALE C. CHAPMAN
ROBERT N. FERRY
NORMAN JOEHLIN
LEROY C. KLEIST
ARTHUR W. TYLER
INVENTORS

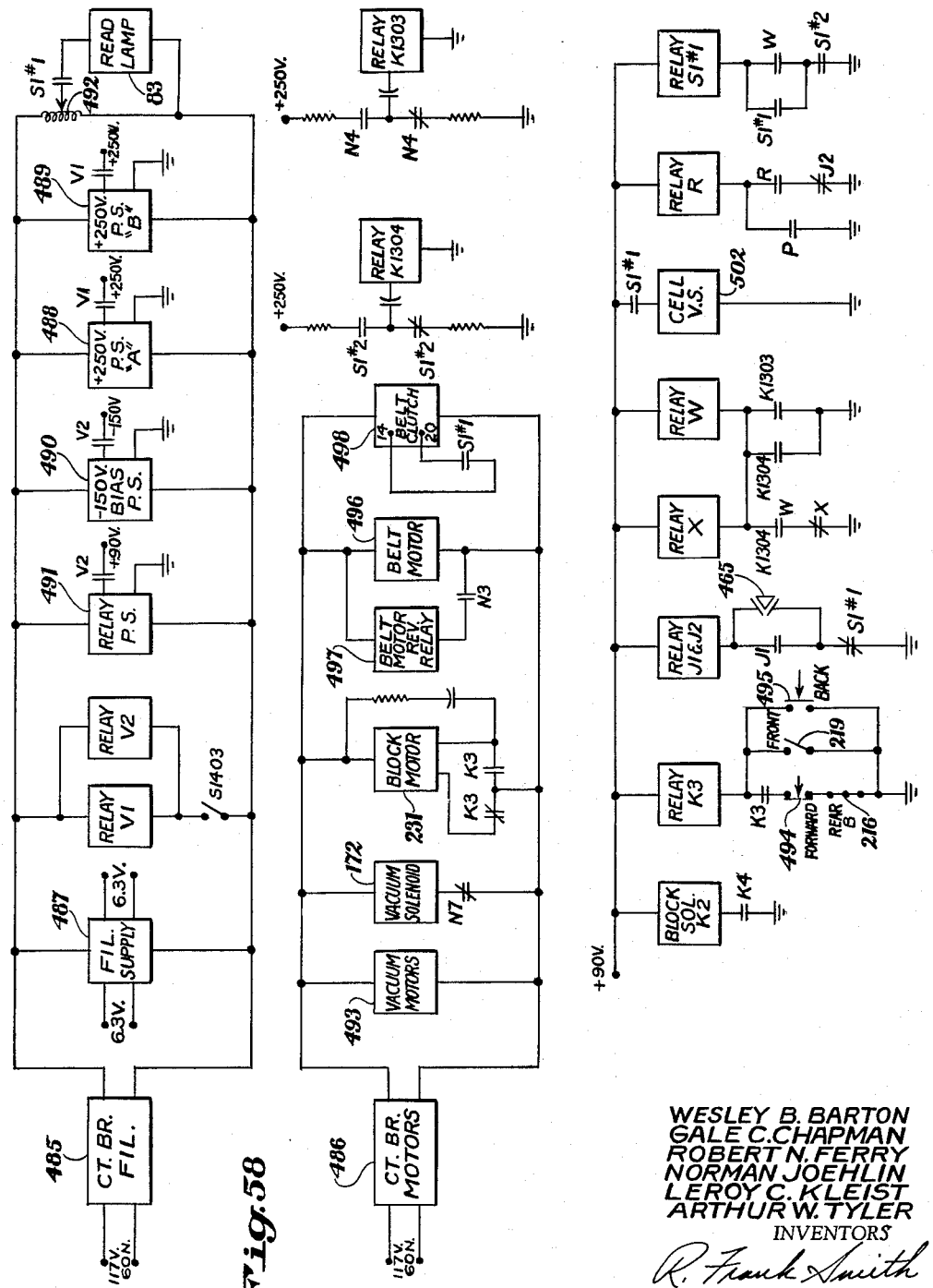

United States Patent Office 2,996,184
Patented Aug. 15, 1961

2,996,184
AUTOMATIC SORTING DEVICE
Wesley B. Barton, Urbana, Ill., Gale C. Chapman, New Haven, Ind., Robert N. Ferry, Pittsford, N.Y., Norman C. Joehlin, Fort Wayne, Ind., Leroy C. Kleist, Champaign, Ill., and Arthur W. Tyler, Weston, Mass., assignors, by direct and mesne assignments, to Eastman Kodak Company, Rochester, N.Y., a corporation of New Jersey
Filed Mar. 18, 1958, Ser. No. 722,342
37 Claims. (Cl. 209—72)

The present invention relates to apparatus for sorting a plurality of information bearing elements having code thereon and more particularly to apparatus in which said elements are moved with respect to a plurality of receptacles arranged on both sides of a reading station so as to determine from the code on each element the receptacle into which each element is to be inserted.

Sorters for information bearing elements, such as punched cards, are well known and in such sorters the cards are passed beneath or between sensing fingers which determine the receptacle into which the card is to be delivered. In such sorters the cards usually fall into the receptacle of their own weight after being moved to the proper receptacle by a carrier, such as a plurality of driven rollers. Since such sorters are not fully automatic, it is necessary for the operator to withdraw the cards from the receptacles after each sort and stack them in the feeder for the second pass or any additional passes through the machine in accordance with the number of sorts or the number of digits to be sorted. Such sorters can then be classified as being fully automatic only if a single sort is to be made. Otherwise, the operator must be present to condition the machine for any continuation or extension of the sort problem.

The present invention relates to apparatus for sorting information bearing elements having a code thereon, which in the embodiment disclosed is produced photographically, and which can be produced by other means, such as perforation, marking, magnetization, etc. of the element depending on the material utilized for the element. The element described in more detail hereinafter is provided with an area in which documents, cards, sheets, maps, drawings, photographs, etc. are reproduced or recorded and a code area in which the information or subject matter of the image area is represented by code. Accordingly, an element can be of photographic paper or film and since the apparatus can be readily adapted to other types of code bearing elements, the term "element" or "card," as used interchangeably hereinafter, is therefore meant to include cards, chips, sheets, etc., whether of a light-sensitive or magnetizable material, paper, metal, or composition in which the code can be readily exposed, punched, marked or reproduced.

In the embodiment of the invention about to be described, a station in which the code on each element or card is scanned is arranged between a single supply receptacle or magazine and a group of fixed magazines, the supply magazine being arranged between the scanning station and a block of magazines which can be retained with any one row of magazine aligned with the supply and fixed magazines or can be indexed intermittently to align any row of magazines with the supply and fixed magazines. The magazines are capable of having cards inserted therein or withdrawn therefrom and, as a result, the elements or cards can be moved in either direction past the scanning station by an apertured metal conveyor belt arranged beneath the magazines. A plurality of aligned and reciprocatory plungers are arranged beneath the belt, one plunger being aligned with each magazine. Each plunger in cooperation with a vacuum applied thereto is capable of being moved through an aperture in the belt, when it is stationary, and into the magazine thereover to engage and withdraw the lowermost card from its respective magazine and deposit it on the belt. To insert a card in a magazine, the plunger engages the card on the belt thereover and raises it into the magazine where it is retained by lips on the bottom of the magazine. Since the magazines are capable of having cards inserted therein or withdrawn therefrom, the plungers are capable of accomplishing such insertion and withdrawal of the elements, and the conveyor is capable of being reversed, the sorting operation is completely automatic in that cards may be passed back and forth any number of times between the fixed magazines and the block magazines and past the scanning station to accomplish the number of passes necessary for the desired sort.

The sorter described hereinafter serves to file sort and fine sort either positive or negative photographic cards, the file sort placing the cards in file blocks of magazines in accordance with the coded information contained in any coded column of the card and the fine sort placing the cards in a single magazine in either ascending or descending order in accordance with the code contained in any column of the card and the program established by the plugboard. The scanning or reading station is the junction of the mechanical and optical elements of the sorter and the array of photocells or light-sensitive elements for sensing the code on each element or card can be considered as the junction of the optical and electrical elements. The timing shaft is the machine component which supplies coordination of the three basic elements of the machine, that is, the mechanical, optical and electrical components. A machine cycle consists of one revolution of the timing shaft and all of the planned functions occur during each revolution irrespective of the presence or absence of cards in the machine.

A six binary code which allows 64 code combinations is used in the system about to be described. The excess three code has been selected to permit easy complementing, and the six bits are broken down into zone and field. The field's four least significant bits are common to the numerical and alphabetical characters. The two zone bits, two most significant bits, are used to distinguish among the different assigned characters, ten for numbers and thirty for the alphabet and other symbols. Characters outside each of the excess three groups are utilized for machine control functions. To select a given character, therefore, the correct field and zone must be combined. An example of such a code structure for only the numerals and alphabet can be set up as follows:

| Zone Binary Bits, Nos. 1 and 2 | | | | Binary Bits, Nos. 3–6 |
|---|---|---|---|---|
| 00 | 01 | 10 | 11 | |
| ∅ | & | / | . | 0011 |
| 1 | A | J | , | 0100 |
| 2 | B | K | S | 0101 |
| 3 | C | L | T | 0110 |
| 4 | D | M | U | 0111 |
| 5 | E | N | V | 1000 } Field |
| 6 | F | O | W | 1001 |
| 7 | G | P | X | 1010 |
| 8 | H | Q | Y | 1011 |
| 9 | I | R | Z | 1100 |

For a negative card in the described embodiment, a "one" will be an opaque bit and a "zero" a clear bit.

Briefly, to block or file sort, assuming the sorting character has been determined and the sort is to be a numerical sort, the cards are placed in the supply magazine, withdrawn one by one from the supply magazine and placed on the belt therebelow and then moved intermittently past the scanning or reading station. During the interval each card is stationary in the reading station, the sort character is scanned and decoded, the decoded character signal determining into which of the ten intermediate magazines the card will be inserted. After all of the cards have been distributed amongst the ten intermediate magazines, the transport belt is reversed and the cards are again moved past the scanning station, the withdrawal or feeding commencing with the "zero" intermediate magazine, to determine into which of the first ten block magazines the cards are to be inserted. Upon insertion of the last card into its respective block magazine and before cards are fed from the "one" intermediate magazine, the block magazine is indexed to position the second row of magazines over the belt. The distribution now continues until all of the cards in the "one" intermediate magazine are distributed into the second row of the block after which it is again indexed. This procedure repeats until all intermediate magazines are depleted of cards. The cards will then be distributed into 100 magazines and, if necessary, each group of cards in the block can be redistributed in the same manner to provide a break down into 10,000 categories. Various controls are provided to insure insertion of a last card into its proper magazine, to retain multiple cards in a group, to stop the machine when any one magazine becomes full, and other controls which can best be described in conjunction with a more complete description of the machine as follows hereinafter.

To fine sort, that is, when the cards are to be arranged into complete order, the cards are inserted in either the intermediate or block magazines depending on whether an ascending or descending order is required. The procedure is similar to that of a file sort with the exception that the block magazine is not indexed. The sorting proceeds character by character with the cards passing from one group of magazines to the other past the scanning station until the sort is completed. When an alphabetic sort is required, two machine passes per alphabetic character are required inasmuch as there are twenty-six alphabetic characters and only ten magazines in each group.

In addition to file and fine sorts, a sort by tags may be desirable and up to ten tags may be used per machine pass. Provisions are also available to make a sort based on frequency distribution, that is, to have several characters enter a particular magazine.

By means of a plugboard, the necessary machine logic and control is set up for the desired sort to be made. The code structure on a card is imaged on light-sensitive detectors at the scanning station and converted into electrical signals which are decoded by a diode matrix. To minimize the matrix size and to use the code structure most efficiently, the field (four least significant bits) is translated into its sixteen possibilities of which only ten are shown above and the zone (two most significant bits) is translated into its four possibilities, these signals being wired to the plugboard.

"AND" and "OR" gates are also provided, an "AND" gate producing an output signal when one signal and another signal are applied to an input simultaneously and an "OR" gate producing an output signal when one signal or another signal is applied to an input. For example, it is necessary to combine by "and" logic 0011 (the four least significant bits) and 00 (the two most significant bits) to produce the output signal for the digit zero. Any other of the forty possibilities shown above can be formed by similar logic. The "OR" gate would be used if, for example, it is desired to combine cards whose translated codes produced 000011 (excess three zero) and 000100 (excess three one) for insertion into the same magazine or for alphabetical sorting.

For a numerical sort "and" logic would combine the field and zone combinations for excess-three-zero through excess-three-nine and the ten outputs would be connected to the ten magazine memory inputs of one group of magazines. On the other hand, for an alphabetical sort the fields and zones are combined in OR gates and the outputs are connected to the memory units for the magazines. Inasmuch as two card passes are required for an alphabetical sort, cards having sort characters A and J will be inserted in one magazine; characters B, K and S will be found in a second magazine; and characters I, R and Z will be in still another magazine after the first pass. On the second pass letters A–I will be in order in the 01 magazine, letters J–R will be in order in the 10 magazine and letters S–Z will be in order in the 11 magazine, the 01, 10 and 11 magazines being determined by the plugboard set up.

During the sorting operation, a checking operation can also be performed. This is accomplished by proper plugging which results in the previous sorting character being checked against the magazine feeding the card during the next pass. Either positive or negative cards can be handled but not intermixed positive and negative cards.

It is the primary object of the invention, therefore, to provide a fully automatic sorter for code bearing elements in which the elements are moved between two groups of receiving and feeding magazines and past a reading station for determining from the code the magazine into which each element is to be inserted.

Another object of the invention is to provide a fully automatic sorter for code bearing elements in which a fixed group of magazines are arranged on one side of a reading station and a block of magazines are arranged on the other side of the reading station, the block being indexed upon completion of the sort with respect to each fixed magazine to position another row of magazines with respect to the element conveying means for receiving the element from the next designated fixed magazine.

Yet another object of the invention is to provide a fully automatic sorter for code bearing elements in which said elements are movable by a conveying means in either of two directions and with respect to two spaced groups of magazines to provide two distinct types of sorts.

Still another object of the invention is to provide a fully automatic sorter for code bearing elements in which said elements are moved between two groups of magazines and past a reading station in accordance with a predetermined sort program.

A further object of the invention is to provide a fully automatic sorter for code bearing elements in which the coded character to be sorted is divided into a field and zone of sort to provide a program of sort based on the field for a numerical sort and on the field and zone for an alphabetical sort.

A still further object of the invention is to provide a fully automatic sorter for code bearing elements in which a predetermined program of sort can be established for a numerical, alphabetic or alpha-numeric sort.

A further object of the invention is to provide a fully automatic sorter for code bearing elements in which the sort in one direction is automatically checked with the next sort made in the opposite direction.

And still another object of the invention is to provide a fully automatic sorter for code bearing elements in which various controls for determining a full magazine, for permitting insertion of elements at a predetermined point in the sort in a predetermined magazine due to the same magazine having been previously filled, for determining the last sort, for determining the last pass, for automatically indexing the block magazine, for automatically reversing the sort, for insuring that the last element in any pass is inserted in its respective magazine as well as other safety controls serve to render the apparatus automatically operative with a minimum amount of attention required of the operator.

These and other objects and advantages will be apparent from the description which follows of apparatus embodying such features. Reference is now made to the accompanying drawings wherein:

FIG. 4A is a diagrammatic representation showing the relation of the various magazines to the reading station;

FIG. 7 is a vertical section showing the relation of the intermediate magazines to the transport belt;

FIG. 8 is a vertical section through the reading station comprising the lamp house, the mirror support, the oscillating mirrors and the cell array;

FIG. 9 is a front elevation view, partially in section, of the oscillating mirror assembly;

FIG. 10 is a vertical section taken substantially along line 10—10 of FIG. 8;

FIGS. 11 and 12 are detail views of the block in which the cell array is mounted;

FIG. 13 is a plan view of the card hold-down mechanism;

FIG. 14 is a vertical section through one of the magazines showing the plunger assembly associated therewith and the actuating mechanism therefor;

FIGS. 15 and 16 are front and side elevation views of the pulse generating means arranged on the timing shaft;

FIG. 17 is a plan view of the timing shaft showing the relation of the Geneva, pulse generating means and cam-actuated switches thereto;

FIGS. 18, 19 and 20 are plan, side and partial sectional views of the mechanism for indexing the block magazines with respect to the transport belt;

FIG. 21 is a block diagram showing the general arrangement of the sorter circuitry;

FIGS. 28 and 28A are schematics of the "G" stepping switch circuit and various relays associated with the different banks thereof;

FIG. 29 is a schematic of the matrix gatting circuit for the sort and check channels;

FIG. 33 is a schematic of the memory unit with the E1–9 unit shown in detail;

FIG. 34 is a schematic of memory thyratron driver circuits for actuation of the plunger assemblies;

FIG. 35 is a schematic of the cam-switch means shown in FIG. 17;

FIG. 36 is a schematic of the timing mark synchronization circuit;

FIGS. 37–45 are detail schematics of various individual circuits utilized in the timing mark synchronization circuit;

FIGS. 46 and 46A are schematics of the bit amplifier circuit used in conjunction with the cell array;

FIG. 47 is a schematic of the column counter circuit;

FIGS. 48 and 48A are schematics of the empty magazine counter circuit and the thyratron relay driver circuit used therein;

FIG. 49 is a schematic of the multiple card indicator circuit;

FIGS. 50–56 are detail schematics of various circuits common to several other circuits; and FIGS. 57 and 58 are detail schematics of various relay circuits used in the apparatus.

Figure 1:
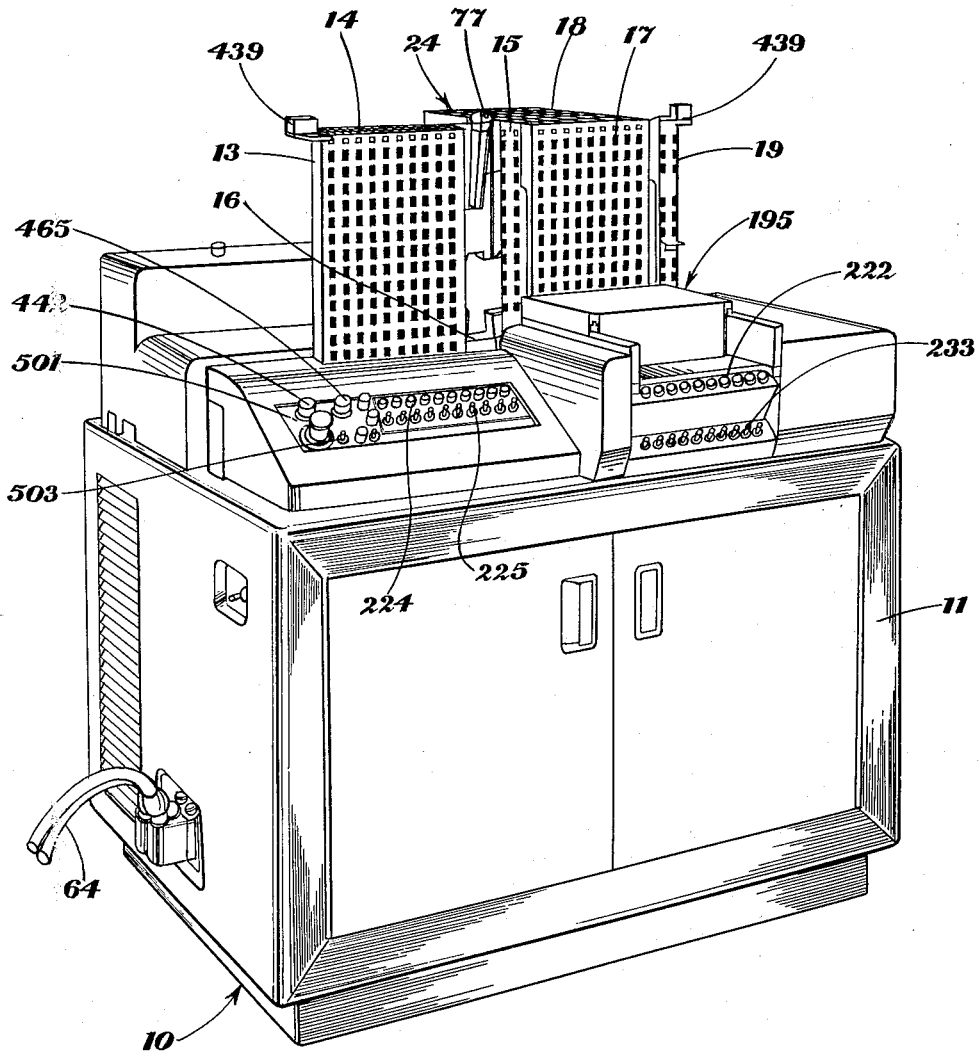
FIG. 1 is a perspective view of the console for receiving, transporting and handling the code bearing elements or cards.
Figure 2:
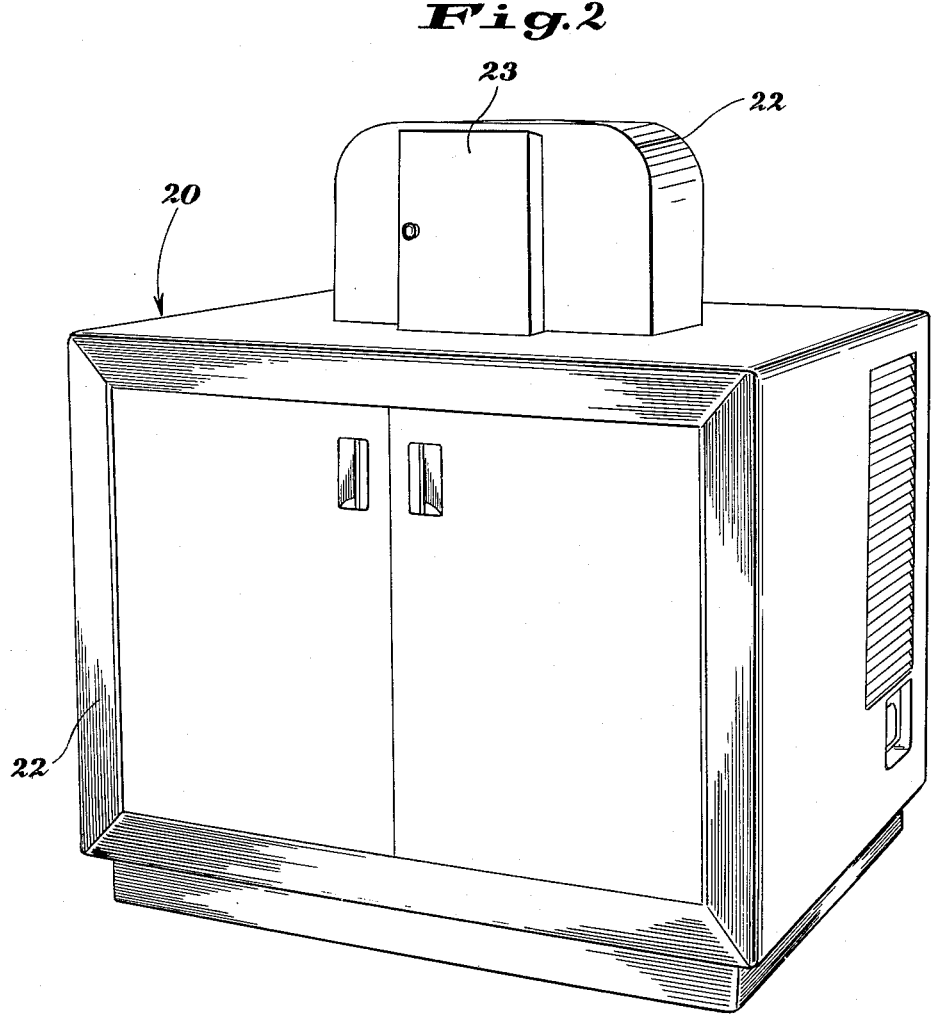
FIG. 2 is a perspective view of the program console in which the circuitry for controlling the sort program is housed.

The apparatus shown in FIGS. 1 and 2 comprises the mechanical, optical and electrical elements for providing a completely automatic sorter for information bearing elements. The operation of the apparatus depends upon an interrelated and coordinated relationship between each of these elements. For this reason, the optical elements or components can be conveniently considered as being the bridge between the mechanical and electrical components with the machine components providing a network which unites all three components.

In FIG. 1, the console 10 comprises a base or cabinet 11 in which the electrical elements for driving and controlling the mechanical components are housed. On the top of base 11 an apertured belt is mounted for movement beneath groups of magazines including a reject magazine 13 which can be integral with a group of fixed magazines 14, a supply magazine 15 which is mounted to the right of reading station 16, a group of magazines 24 which are arranged in two blocks 17 and 18 of fifty magazines each and a second reject magazine 19. This mechanism and the elements associated therewith are controlled by the circuitry contained in program console 20 and connected to console 10 via cables 64. The means for determining the sort program is determined by a plugboard 21 which is mounted within housing 22 on console 20 and which is accessible by means of door 23.

Figure 3:
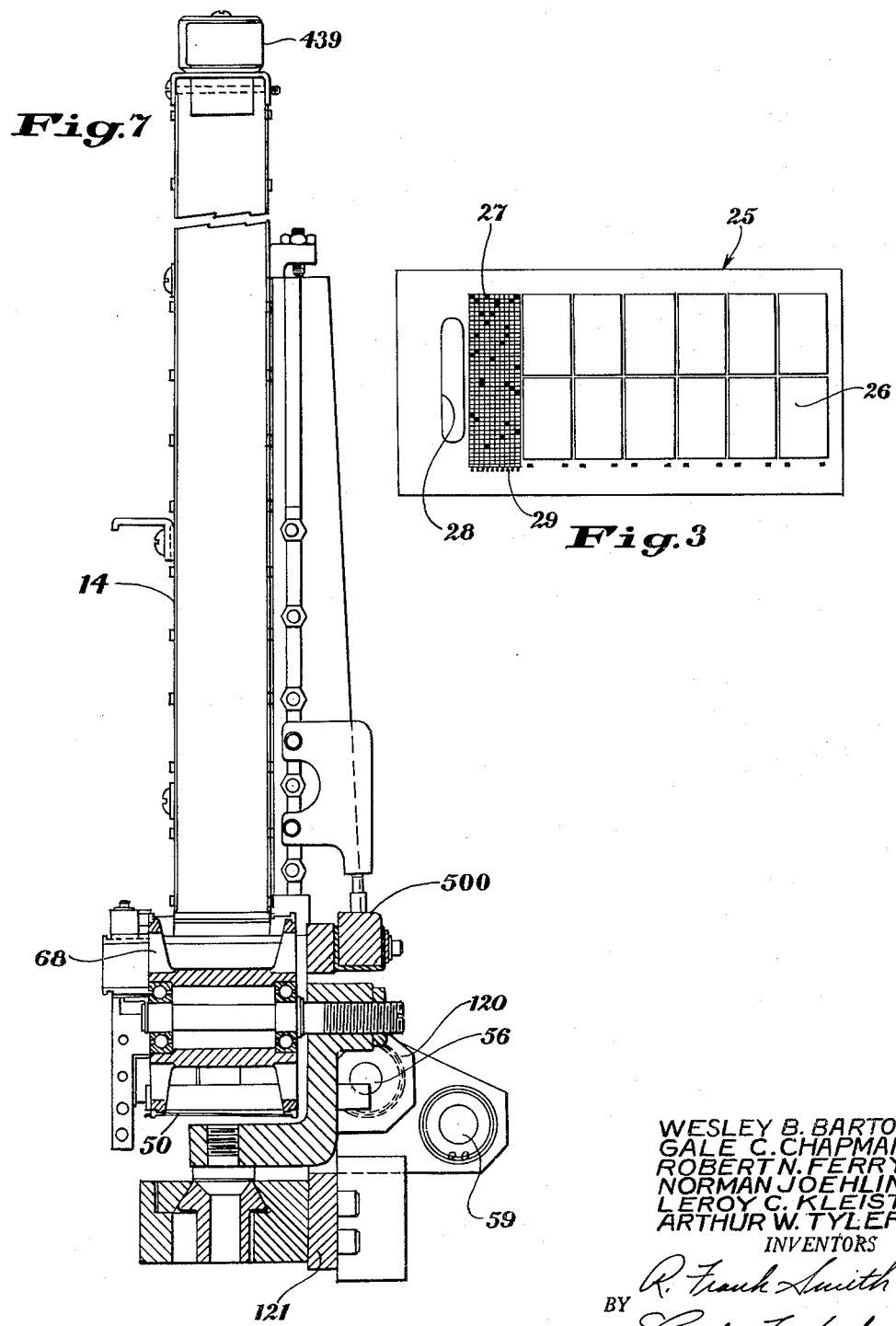
FIG. 3 is a detail plan view of one of the information bearings cards showing the relative location of the various areas thereof.

Before proceeding with any further description of the apparatus, it is believed that a description of the element or card to be sorted in the apparatus should be described. As shown in FIG. 3, each element or card 25 is a small piece of negative or positive film approximately five-eighths of an inch in width and one and one-quarter inches long. The card comprises an image area 26, a code area 27 and a transverse slot or aperture 28. Each element comprises at least the equivalent of ten columns of code and a maximum of twelve images arranged in pairs longitudinally of the card. The image area 26 can, therefore, contain from zero to twelve images and as the number of images is reduced the number of code columns can be increased or the entire card can be completely filled with columns of code. As described above, a binary-three code is utilized so that six bits will comprise a character which, as shown in the above table, can be a number, letter or symbol. A track of bits lengthwise of card 25 is referred to as a row and a track of bits transversely of the card is termed a column. As just mentioned above, a row of bits can vary in number depending on the amount of coded information to be placed on the card. A column, however, always contains forty-two bits or the equivalent of seven characters. Adjacent each code column is a timing mark 29 which is utilized, as described hereinafter, to count the code columns. In a system utilizing a tag character, a column comprises six characters which constitute a word or, if no tag is used, a word can then comprise seven characters. The six binary bits comprising a character and the same six bits in each row is designated a channel or character row. The tag channel is preferably arranged adjacent timing marks 29 and the character positions are counted away from the timing marks, the tag character being designated as the "zero" character and the character farthest from the timing mark being designated as the sixth character.

The sorter described herein is driven by a conventional, squirrel-cage, induction-type motor 496 which is only shown diagrammatically in FIG. 58 and which is mounted within cabinet 11. The motor supplies power through a conventional magnetic clutch to a pulley which, in turn, is connected by belt 31 to pulley 32 on the input shaft 33 of Geneva drive 34. This main drive motor is instantly reversible by means of relays used in series with the start winding and is also capable of variable speed in accordance with the amount of current applied to the magnetic clutch.

Figure 4:
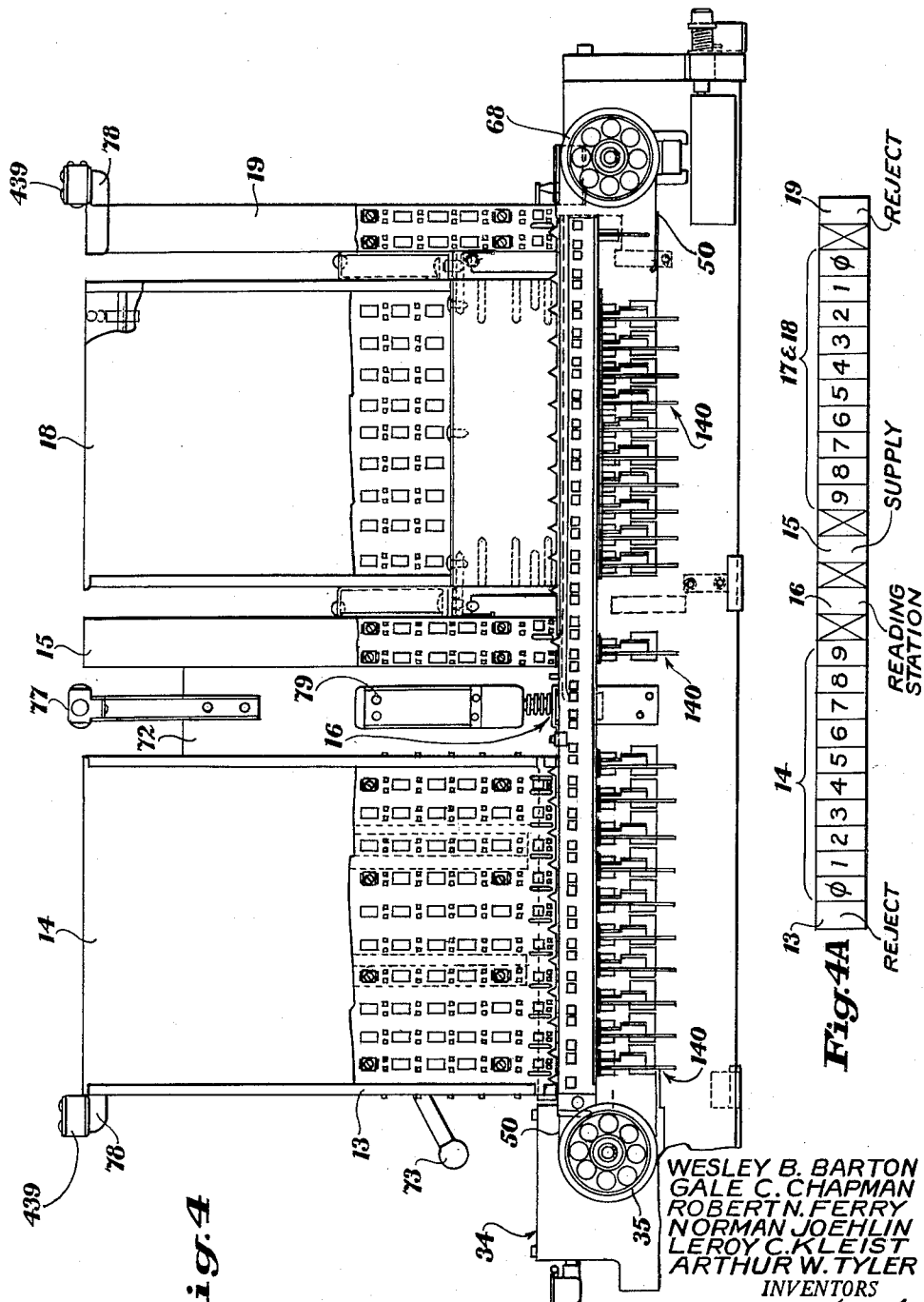
FIG. 4 is a front elevation of the sorter mechanism arranged on the top of the console shown in FIG. 1.
Figure 5:
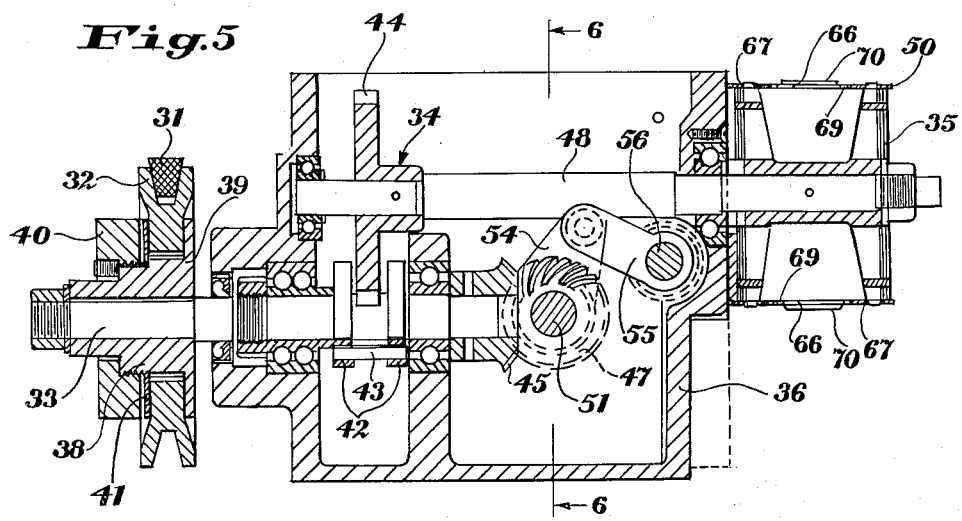
FIG. 5 is a vertical section through the Geneva drive showing the relation of the various shafts.

The Geneva drive 34 is located to the left side of the sorter, as viewed from the front in FIGS. 1 and 4, and serves to impart intermittent rotary motion to drive sprocket 35. Input shaft 33 is journaled in casing 36 and externally thereof pulley 32 is mounted on sleeve 38, which is keyed to shaft 33, and between flange 39 on said sleeve and collar 40; flange 39, collar 40 and pressure plate 41 comprising an adjustable torque limiting means for pulley 32. Shaft 33 is provided with spaced flanges 42 and pin 43 is mounted between said flanges. The portion of shaft 33 between flanges 42 is cam-shaped and serves as a lock means for Geneva plate 44. Gear 45 is mounted on the inner end of shaft 33 and meshes with gears 46 and 47. Shaft 48 is journaled in casing 36 above shaft 33 and on the inner end thereof Geneva plate 44 is fixed thereto and intermittently rotated by pin 43 in a well-known manner. Drive sprocket 35 is fixed to the external end of shaft 48 and the intermittent rotation thereof also advances apertured belt 50 intermittently.

Gear 46 is fixed to shaft 51 and the hub of said gear is provided with a clutch face which is engaged by clutch member 52 which, in turn, is freely rotatable on shaft 51. Clutch member 52 has an eccentric hub 53 on which connecting rod 54 is freely mounted. The arm 55 is pinned to rocker shaft 56 and has its free end pivotally connected to the bifurcated end of rod 54. As input shaft 33 is continuously rotated, gear 45 drives gear 46 and the eccentric hub 53 imparts a reciprocatory motion to rod 54 which, in turn, through arm 55 imparts an oscillating rotary motion to rocker shaft 56.

Figure 6:
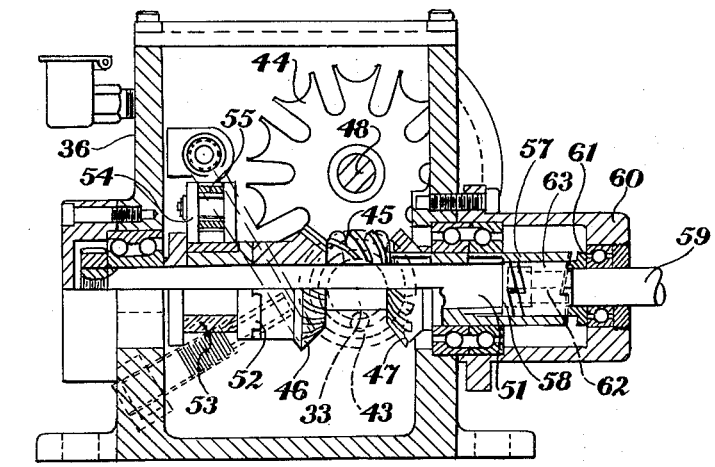
FIG. 6 is a vertical section taken substantially on line 6—6 of FIG. 5.

Shaft 51, as shown in FIG. 6, carries a sleeve 57 to which gear 47 is fixed and is provided on the end within sleeve 57 with a clutch portion 58. One end of cam shaft 59 is journaled in housing 60 which is fixed to casing 36. A clutch member 61 is fixed to sleeve 59 within housing 60. Shaft 59 is provided with a square extending end 62 on which a clutch sleeve 63 is slidably mounted. Clutch portion 58, clutch member 61 and clutch sleeve 63 comprise a unidirectional clutch for cam shaft 59. When gear 45 is rotated in a clockwise direction, as viewed in FIG. 6, gear 46 is driven in a counter-clockwise direction and gear 47 is driven in a clockwise direction or, in other words, due to arrangement of gears 45, 46 and 47, gears 46 and 47 always rotate in opposite directions. Due to the clutch faces on portion 58, member 61 and sleeve 63, said sleeve is cammed by said faces axially along end 62 to engage either portion 58 or member 61 depending on the direction of rotation of gear 45. The clutch faces on portion 58, member 61 and sleeve 63 are such that sleeve 63 can engage either of said other faces but which, due to spacing and direction of the step, cannot engage both members. As a result, shaft 59 is rotated in one direction via gear 46, shaft 51, clutch portion 58, and the left side of sleeve 63 on end 62 of shaft 59 and in the same direction, when the motor reverses the rotation of gear 45, via gear 47, sleeve 57, clutch member 61, and the right end of sleeve 63 on end 62 of shaft 59. While there is some delay in operation of timing shaft 59 due to the sliding action of sleeve 63, this delay is always less than one machine cycle and has no effect on machine operation since other factors in the machine system require greater delay upon reversal.

Aperture belt 50 is a thin metallic belt which is provided with spaced apertures 66 and spaced perforations 67 for engaging the teeth on drive sprocket 35 and idler sprocket 68. Each aperture 66 is provided with spaced marginal lips 69 which lie in the plane of the belt for supporting the card on the belt and with vertically extending edge guides 70 which serve to retain the card in proper position when placed on the belt. As shown in FIG. 4, belt 50 encircles both of sprockets 35 and 68 and the upper portion thereof lies close to and extends parallel to the bottom of magazines 13, 14, 15, 24 and 19. As belt 50 is driven intermittently through Geneva 34 and sprocket 35 on shaft 48, at each dwell period or period of rest of belt 50, an aperture 66 is aligned with the open end of each magazine across the entire machine to permit insertion or withdrawal of a card into any magazine and to position each card successively with respect to reading station 16.

For the purpose of moving the magazines out of their normal position with respect to belt 50 to permit inspection of said belt or cards thereon, reject magazine 13, fixed on intermediate magazines 14, reading station 16 and supply magazine 15 are mounted as a unit on plate 72 which is elevated by means of handle 73. Each of the magazines have a rectangular central aperture corresponding in size to that of the cards, both ends of the magazines being open and the lower end being provided with marginal lips 74 for supporting a stack of cards. Cards 25 are inserted into and withdrawn from the magazines by means of a "stick" or "rod" which is inserted through aperture 28 in said cards. In order to maintain said cards flat and in contiguous relation, a weight 75 is inserted in each magazine on top of the cards and each weight is provided with a tab 76 which serves to indicate a full magazine, when said tab extends beyond the top of its respective magazine, by interrupting the light beam directed across the tops of the magazines by a lamp mounted within housing 77 which is mounted on plate 72 above reading station 16. Photocells 439 mounted within the housing on brackets 78 fixed to reject magazines 13 and 19 are aligned with the light beam, as shown in FIG. 4, so that with the elevation of a tab 76 in any magazine on either side of reading station 16 to a position in which it intercepts the light beam it will function to limit the height of the card stack in a receiving magazine by controlling the feed plunger operation, to provide manual overriding of its automatic feed control and to disable the magazine stepping circuit until the full magazine condition is corrected. The two photocells, in the absence of light, have a high resistance and by this action tab 76 on breaking the light beam causes a signal to be generated which is used to fire thyratron TD506 which actuates relay T2. Relay T2, as shown in FIGS. 28 and 48, has a twofold purpose in that it cuts the current return to all plunger solenoids, which stops all feeding of cards, and it disables the magazine stepping circuit so that feeding the cards from a particular magazine is not disrupted after the extraction of a full magazine of cards.

The reading station 16, or code reading station, is arranged between intermediate magazines 14 and supply magazine 15, as shown in FIGS. 1, 4 and 4A. In reading station 16, belt 50 positions a card 25 which is aligned with an aperture 80 provided in plate 81. Above card 25, reflector 82, lamp 83, mirror 84 and lens system 85 are mounted within housing 79 which, in turn, is mounted on plate 72, see FIG. 8. By means of the aforementioned illuminating system, concentrated light coverage of the code area 27 of each card positioned in reading station 16 is provided. The light directed through the card being scanned is reflected by fixed mirror 86 to oscillating mirror 87 which, in turn, reflects the light to fixed mirror 88 for reflection onto the photocell array 89. Mirrors 86 and 88 are mounted in block 90 which is secured to plate 91 directly below aperture 80. As shown in FIG. 9, mirror 87 is mounted on and fixed to shaft 92 which is mounted in the block 93. To the right of mirror 87, an arm 94 is fixed to shaft 92 and carries a follower 95 which is biased by spring 96 against cam 97, which, in turn, is fixed to shaft 98 journaled in block 90 directly below shaft 92. Gear 99 is rotatable with cam 97 and meshes with gear 100 which is freely rotatable on stud 101 and is driven by gear 102 on timing shaft 59. Mirror 87, therefore, sweeps the card longitudinally or lengthwise thereof to reflect the bit array on the card onto the respective cells in the array 89.

Cell array 89 is mounted in block 103, as shown in FIGS. 11 and 12, said block being mounted on plate 104 and aligned with aperture 105 therein. Plate 104 is adjustable mounted on plate 106 which is mounted on plate 107. Plate 107, in turn, is secured to horizontal plate 108 which is adjustable axially with respect to mounting plate 109 by means of tongue 110 on plate 108 and recess 111 in plate 109. Cylindrical lens 112 is mounted on plate 107 between mirror 88 and cell array 89. As shown in FIGS. 8 and 10, plate 104 carries a pin 113 which extends into a recess 114 in plate 106 and is urged against spring 115 by set screw 116. Also, plate 104 is urged against spring 117 by set screw 118. These two adjustments permit the cell array to be adjusted transversely and angularly so as to match the projected bit array.

Rocker shaft 56 which has one end thereof journaled in casing 36 for Geneva drive 34 is also journaled in spaced plates 120 which are secured to plate 121, as shown in FIG. 7. This shaft extends parallel to belt 50 and carries a plurality of arms 122 and a single arm 123 for actuating the card hold-down means 124 which is arranged in the reading station, as shown in FIG. 8. Card hold-down means 124 comprises an arm 125 of the shape best shown in FIG. 13 and which is pivotally mounted on pintle 126 journaled in U-shaped bracket 127 which is secured to plate 91. Arm 125 is provided at the free end 128 with an aperture 129 and with three pins 130 having tapered ends 131 which extend beyond the lower face of arm 125 to straddle the card in the reading station and to position it accurately with respect to aperture 129 and the optical scanning system arranged above and below said card. Spaced from pintle 126, arm 125 carries a follower 132 which engages the cam surface 133 on arm 123, as best shown in FIG. 8. As shaft 56 is oscillated, as described above, arm 123 is also oscillated to move arm 125 with respect to the card in reading station 16, arm 125 being lifted during movement of belt 50 and lowered to accomplish positioning of the card when the belt is stationary. The card is clamped in its aligned position during the reading cycle and is then released at the end of the cycle. Stripping spring 134 which is fixed to arm 125 adjacent to the aligning pins provides positive separation of the card from arm 125.

Rocker shaft 56 has twenty-three arms 122 fixed thereto and oscillatable therewith, arms 122 being spaced along said shaft in accordance with the arrangement of the two reject magazines 13 and 19, the single supply magazine 15, the ten intermediate magazines 14 and the ten magazines in each row of blocks 17 and 18. The function of rocker shaft 56 is to supply oscillatory rotary motion derived from Geneva 34 for the operation of the card plungers and the card hold-down means 124. Shaft 56 is provided with opposed flats 135 and spaced apertures 136 for receiving the shanks 137 of arms 122 and which are retained thereon by nuts 138, as shown in FIG. 14.

With reference to FIGS. 4A and 14, during each dwell period of belt 50, the apertures therein are aligned with the open ends of the magazines in the relationship shown in FIG. 4A. As shown in FIG. 4, a plunger assembly 140 is arranged beneath belt 50 and aligned with each of the twenty-three magazines. All of the plunger assembly are exactly the same structurally and function exactly the same. The purpose of the plunger assemblies associated with the reject magazines 13 and 19, however, is different from that of the others in that these two assemblies serve only to insert cards in their respective magazines whereas all the other plunger assemblies function either to insert or withdraw cards.

Each of arms 122 is provided at the free end thereof with a plate 141 which is secured to arm 122 by means of rivets 142 and has a formed-over end 143 which extends through slot 144 in lever 145. Plunger assembly 140 comprises plunger 146 which includes head 147 and shank 148 to which lever 145 is pivotally mounted at 149, sleeve 150 in which shank 148 is slidably mounted, and mounting bracket 151 on which solenoid 152 is mounted. Sleeve 150 is mounted in block 153 which is secured to plate 91. Block 153 is provided with a plurality of recesses 154 which are covered by plate 155 provided with vertical apertures 156 which align with said recesses. Plate 157 is also secured to the bottom block 153. A casing 158 encloses the ends of block 153 and plates 155 and 157 and is provided with an aperture 159 to which a low vacuum system is connected. Strips 160 which are secured in spaced relation to plate 155 from a guide and support for belt 50 so that with a card over an aperture 66, the low vacuum created through the space 161 under belt 50, aperture 156 and recess 154 serves to retain the card in position on said belt during movement thereof.

Head 147 is provided with a concave surface 173 to which a soft rubber pad is secured and an aperture 162 which is aligned with blind aperture 163 in shank 148, aperture 163 being extended to the periphery of said shank by radial aperture 164. Sleeve 150 is provided with an elongated aperture 165 which is aligned with apertures 166 and 167 in block 153 and plate 91, respectively, a high vacuum line having a solenoid valve 172 being connected to the aperture 167 in plate 91. Radial aperture 168 and axial recess 169 in sleeve 150 are provided as an atmospheric exhaust to be described hereinafter.

In FIG. 14, end 143 is shown in engagement with notch 170 at the bottom and extreme right of slot 144. In this position, solenoid 152 has been energized and has pulled lever 154 to the left against the action of spring 171. As shaft 56 is oscillated in a clockwise direction, arm 122 will, due to its engagement with notch 170, raise lever 145, shank 148 and head 147 vertically upward. This action occurs during the interval belt 50 is stationary and head 147 will be moved through aperture 66 in said belt and into the bottom of its respective magazine. If it is assumed that the function of plunger assembly 140 at this time is to insert the card overlying aperture 66 into the magazine, then no vacuum is applied and head 147 engages the card during its upward movement and carries it toward the magazine. The travel of head 147 is sufficient to permit bowing of the card past lips 74 to insure retention of the card by said lips as the plunger is withdrawn to return to its original position below belt 50. If it is now assumed that the function of plunger assembly 140 is to withdraw a card from its respective magazine, then the high vacuum is applied to apertures 165, 166 and 167. However, said vacuum is not applied to plunger assembly 140 until radial aperture 164 becomes aligned with aperture 165. This occurs as head 147 is moved beyond belt 50 and toward the bottom of the stack of cards in the magazine. Since head 147 is moved beyond the plane of lips 74 and the lowermost card, intimate contact with the lowermost card is assured. As head 147 is moved downwardly, the vacuum applied through aperture 164 and 163 serves to retain the card on head 147 as it is bowed past lips 74 and moved toward belt 50. As the card approaches belt 50, the vacuum is broken because aperture 164 is moved beyond aperture 165 and past aperture 168 to permit atmospheric pressure to release the card. This occurs at the instant the card contacts lips 69 on said belt so that the card is removed from the plunger assembly and retained on the belt. As will be more fully described hereinafter, solenoid 152 is then de-energized and spring 171 pivots arm 145 to the right so notch 170 is disengaged from end 143. In this position end 143 is freely oscillated in slot 144 without actuating plunger assembly 140 so that head 147 remains below belt 50 and this is the normal position of each plunger assembly with the exception of the assemblies associated with reject magazines 13 and 19. Since these magazines have the sole function of only receiving cards, the arms 122 of these two plunger assemblies are permanently fixed to their respective levers 145. The difference between the feed (card withdrawal) and receive (card insertion) cycles depends upon the presence or absence of high vacuum as applied to plunger assemblies. The vacuum is applied in accordance with the direction of movement of belt 50. When the belt moves to the left, as viewed in FIG. 4, the vacuum is applied to the plunger assemblies associated with blocks 17 and 18 since the cards must be withdrawn from these magazines and inserted in intermediate magazines 14. When the direction is reversed, that is, belt 50 is moved to the right, then the vacuum is applied to the plunger assemblies 140 associated with the intermediate magazines 14. Distribution of the vacuum, or switching thereof, is controlled by solenoid operated air valve 172 in the high vacuum system. Supply magazine 15 is utilized only for card extraction or withdrawal and the operation of its plunger assembly 140 will be described in detail hereinafter in connection with specific sort problems. It is to be understood, the structure and function described above with respect to plunger assembly 140 and solenoid 152 is the same for all the magazines 14, 15, and 17.

Cam or timing shaft 59 has one end journaled in casing 36, as described above and shown in FIGS. 6 and 17, and the other end journaled in plate 175 fixed to plate 91. Adjacent Geneva 34, shaft 59 has a disc 176 fixed thereto, see FIGS. 15 and 16, which supplies the positive polar timing pulse, the start-read timing pulse and the negative polar timing pulse. Disc 176 is provided with a notch 177 and is rotated between three exciter lamps 178a, 178b and 178c mounted on plate 179 and on one side of disc 176 and three phototransistors 180a, 180b and 180c mounted on brackets 181a, 181b and 181c and aligned with lamps 178. In operation, disc 176 is rotated by shaft 59 and presents notch 177 successively and briefly to the three sets of pulsing elements (lamp and transistor combination) to produce the timing pulses. Lamps 178a and 178b together with their respective transistors 180a and 180b are in a fixed relation of 180° apart to produce the positive and negative polar pulses. The third set, that is, lamp 178c and transistor 180c, is located on adjustable bracket 181c and can be varied from the positive polar set through a range of 51° to 71° to produce the start-read pulse. In the absence of light the transistors are virtually insulators in that they present a high resistance whereas in the presence of light they are a moderate conductor (low resistance). The output signal which occurs at the time of light on the transistors is positive in polarity and approximately eight volts in amplitude. These signals are taken from contact points 182 on plate 183 and applied to TM synchronization circuit as described hereinafter with respect to FIG. 36.

A plurality of cams 185—189 are also mounted on shaft 59 and operate corresponding contact switches P1—P5. Cam 185 through switch P1 operates relays A3, A7, A10 and A11, as shown in FIG. 35. Relay A3 generates a gate pulse which is applied to the input cores 476 of memory unit 472. Relay A7 generates a negative reset pulse which is applied to the empty magazine counter flip-flop circuits FF101—FF105. Relays A10 and A11 are used as functional generators for the 1P memory pulse. Cam 186 operates relays A5 and A6 to generate the 2P memory pulse. Cam 187 actuates switch P3 which is in the ground return circuit of relay A8 and the normally open contacts of relay A8 are in turn, in the common return circuit of the intermediate and block solenoids 152 and control the length of the voltage pulse applied to said solenoids, see FIG. 35. Cam 188 actuates switch P4 to control the ground return circuit of TRD603B which operates relay E to control operation of the card counter. Cam 189 actuates switch P5 to operate relay A9 and the normally closed contacts of this relay break the cathode return of all thyratron driver circuits for a definite time to permit operation of the card plunger solenoids 152.

Figure 32:
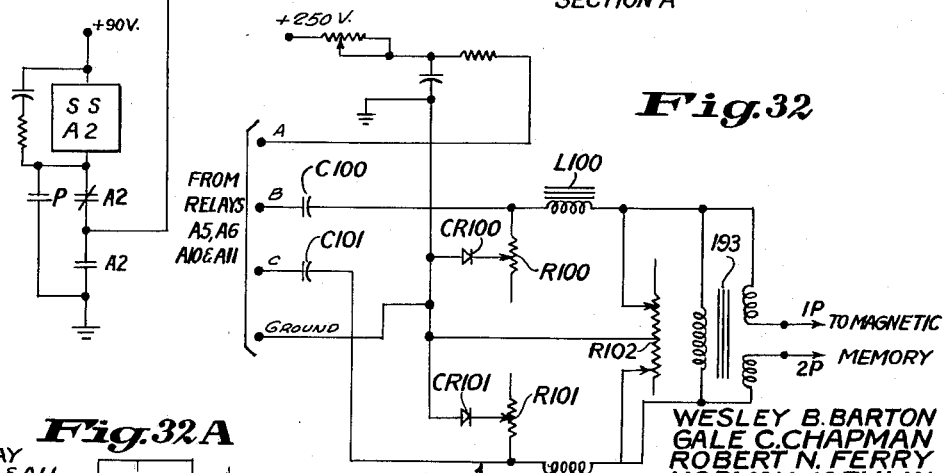
FIGS. 32 and 32A are schematics of the memory unit power supply and the input and output pulses, respectively.
Figure 32A:
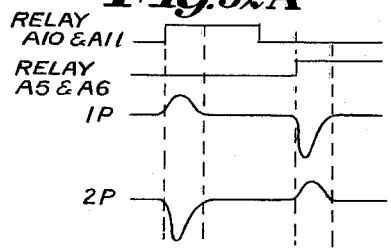

With reference to FIGS. 32 and 35, the 1P and 2P shift pulses to drive the magnetic cores are derived from the LCR generator broadly designated by the numeral 119 in FIG. 32 and fully disclosed in U.S. Patent 2,838,692. When cam 185 actuates switch P1 to a closed position, relays A10 and A11 are energized, relay A10 applying a a D.C. voltage to charge capacitor C100 and relay A11 discharging capacitor C101. This action causes the positive portion of the 1P pulse and the negative portion of the 2P pulse to be generated, as shown in FIG. 32A. When switch P2 is closed by cam 186, relays A5 and A6 are energized, relay A5 applying a D.C. voltage to charge capacitor C101 and relay A6 discharging capacitor C100. This action causes the negative portion of the 1P pulse and the positive portion of the 2P pulse to be generated. Diode CR100 and resistor R100 form the 1P pulse to the required wave form and diode CR101 and resistor R101 perform the same function with respect to the 2P pulse. Choke L100 and part of resistor R102 and choke L101 and part of resistor R102 shape and determine the amplitude of 1P and 2P pulses, respectively. The magnetic core 193 gives the required amplitude and phase reversal characteristics to the 1P and 2P pulses.

As stated hereinabove, magazine blocks 17 and 18 each comprise fifty magazines arranged in a 10 x 5 rectangle, that is, the rows of ten magazines extend in the same direction as belt 50 whereas the rows of five magazines extend in a direction transversely of said belt. Blocks 17 and 18 together form a 10 x 10 unit to provide one hundred magazines into which cards can be inserted or from which cards can be drawn, and are supported on block indexing assembly 195 which indexes said blocks to sequentially position each row of ten magazines in precise location above belt 50 as required by the sort problem, see FIGS. 1, 4, 18, 19 and 20. By replacing magazines 14 with a second set of magazines 17 and 18 and providing an indexing mechanism the same as that about to be described, the number of categories into which the elements can be divided can be increased still further with only minor changes in the actual circuitry.

The block indexing assembly 195 comprises a framework, a carriage drive mechanism and various electrical controls. The framework 196 comprises two rails 197 and 198 which are retained in spaced parallel relation by the plates 199 and 200. At the forward end and near the rear end of rails 197 and 198 bracket 202 comprising side plates 203 and 204 and bottom plate 205 and bracket 206 comprising plates 207 and 208 and bottom plate 209 serve to support said rails on a plate not shown, on the top of cabinet 11 in proper spaced relation to belt 50, plates 203, 204, 207 and 208 being secured to said rails as shown by the partial section in FIG. 20. Plates 205 and 209 are provided with adjustable extending studs 201 for locating said framework on said cabinet. Rails 197 and 198 are provided with races 210 for receiving balls 211 on which carrier 212 is mounted for movement relative to framework 196, said balls being retained in a well-known manner in fixed relation to carrier 212. Carrier 212 comprises two vertical plates 213 and 214 which are maintained in spaced relation by tie bars 215. Each of plates 213 and 214 is provided along the edge thereof with races 210' similar to those in rails 197 and 198 for engaging balls 211. Microswitch 216 is fixed to bracket 217 which, in turn, is secured to rail 198 to position said switch in the path of carrier 212. As shown in FIG. 19, plate 213 is provided with a plurality of spaced open-end notches 218 for a purpose to be presently described. At the forward end of framework 196, microswitch 219 is fixed to rail 198 to position said switch in the path of carrier 212. At this same end, formed plate 221 is secured to framework 196 and supports a plurality of button switches 222 and a corresponding number of toggle switches 223, switches 222 being associated with the re-insertion memory circuit and switches 223 being in the lamp circuit therefor. Similar switches 224 and 225 for the same purpose are associated with the intermediate magazines 14, as shown in FIG. 1. A third bracket 226 comprising plates 227 and 228 and bottom plate 229 is secured to the plate supporting framework 196.

Bracket 226 supports the drive means 230 for carrier 212, as shown in FIGS. 18 and 19. Motor 231 is secured to bottom plate 229 and its shaft 232 is connected to shaft 233 which is journaled in plates 234 and 227 by coupler 236. Clutch collar 237 is keyed to shaft 233 and urged against sleeve 238 having pinion 239 fixed thereto by spring 240, friction plate 241 being arranged between said clutch collar and the flange on sleeve 238. Bracket 242 which is mounted on framework 196 has idler gear 243 journaled thereon as well as gear 244. Gear 243 meshes with both pinion 239 on shaft 233 and gear 244 which carries two diametrically opposed rollers 245 which engage notches 218 in plate 213. Stud 246 on which gear 243 is mounted also carries two cams 247 and 248 for limiting gear 243 to only one-half of a revolution. With reference to FIG. 19, it will be noted that the cam surfaces are in opposite relation to permit limitation in either direction depending on the direction of rotation of reversible motor 231. This limitation is imposed by the armatures of solenoids 249 and 250 which are mounted on plate 203, these solenoids being designated by K2 and K, respectively, see FIGS 28 and 58.

Due to the friction drive between shaft 233 and gear 243, solenoids 249 and 250 will prevent rotation of gear 243 in either direction as long as the armatures thereof engage cams 247 and 248. Upon energization of either solenoid, its respective cam is released and rotation of gear 243 for one-half a revolution occurs in the corresponding direction, the armature of the unenergized solenoid being cammed out of position due to the relation of the cam surfaces. Accordingly, gear 244 is also rotated one-half revolution and rollers 245 move carrier 212 along rails 197 and 198 in the required direction. In order to properly locate blocks 17 and 18 on carrier 212, plate 213 is provided with two spaced upstanding lugs 251 and plate 214 is provided with two correspondingly spaced apertures 252 for reception by a corresponding recess and pin on each block, only one of said apertures and lugs being shown in FIG. 18.

Microswitch 219 is normally open and when carrier 212 is indexed to the front, i.e. when the tenth row of magazines is aligned with belt 50, this switch is mechanically operated to a closed position in which relay K3 is energized to reverse motor 231, see FIG. 58, relay K3 being retained in an energized state by switch 216. Block position switch 253 is a transfer contact arrangement which is in the common ground return for all of plunger solenoids 152, see FIG. 28. Its prime purpose is to break this ground return connection during the indexing of carrier 212, thus acting as a safety device. When carrier 212 is indexed, relay K4 is energized so that the indexing is limited to one position at a time. Relay K4, in turn, actuates solenoids 249 and 250 automatically during a block filing sort problem.

From the foregoing description of the mechanical and optical components of the sorting apparatus, it is evident that Geneva 34 provides means for intermittently moving belt 50, for actuating plunger assemblies 140, for operating card hold-down means 124 and for rotating cams 185—189 in coordination with movement of the aforementioned elements and oscillating mirror 87. The photocell array 89 is the junction of the optical and electrical elements and at this point the type of sort operation determines the direction of card movement and number of passes of the cards with respect to reading station 16 to provide the desired sort. Reference is now made to FIGS. 21–58 for description of the electrical and electronic components of the apparatus.

Assuming that a card 25 is positioned in reading station 16, each column of code thereon together with the corresponding timing mark 29 is projected onto cell array 89 in successive order by mirror 87. This means that each column of code presents forty-two bits plus a timing mark to the cell array 89, which, therefore, contains forty-three cells. These photoconductors are virtually insulators in darkness and in the presence of light become moderate conductors. The input signal consists of a synchronizing polarization voltage which sensitizes the cells in a predetermined direction. In effect, the polarization voltage acts as a supply voltage for the cell and its associated ballast resistor. Each cell gives an additional output signal and offers a high resistance in the absence of light and a low resistance in the presence of light. Thus, the cell acts as a variable resistor in accordance with the light conditions directed onto the cell. The signals generated by each bit and the timing mark are of a sine wave nature and superimposed on the polarization voltage, as shown in FIG. 36. The bit signal outputs (42 in number) are transmitted to amplifiers 255 and the timing mark output is transmitted to amplifier 256 in synchronizing circuit 257, as more fully described hereinafter.

Figure 22:
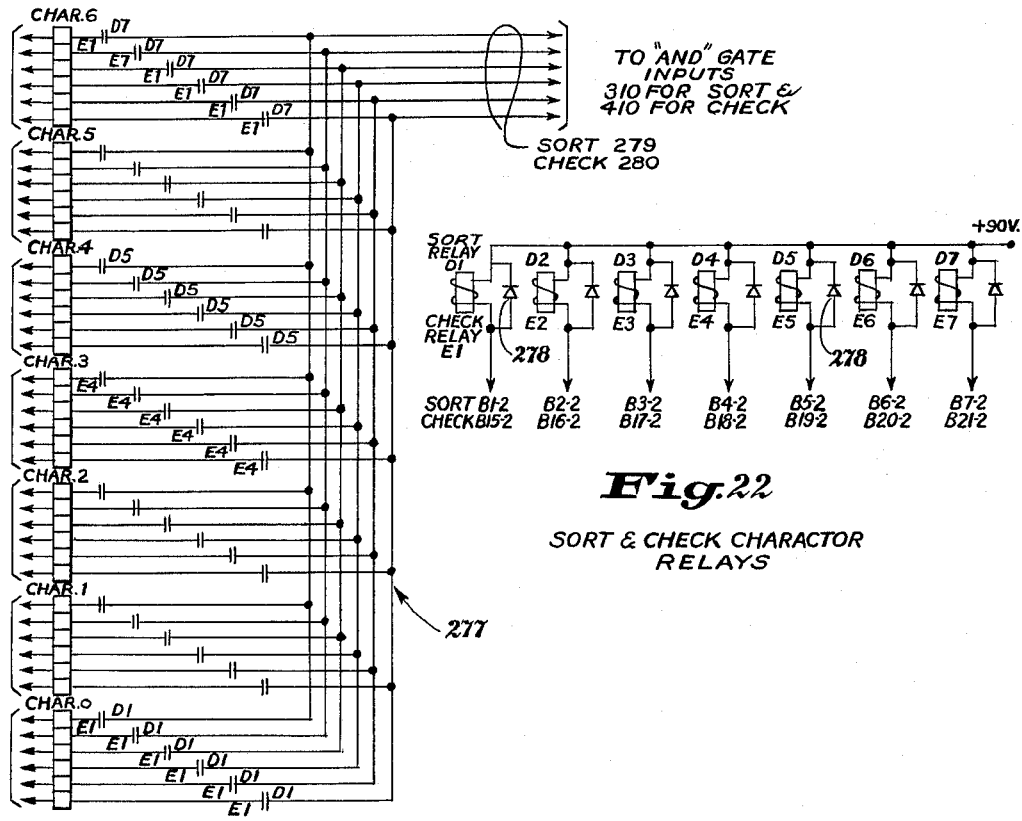
FIG. 22 is a schematic of the sort and character selector relay circuits and the contacts actuated thereby.

Bit amplifier 255, as shown in FIGS. 46 and 46A, comprises two, two-stage amplifiers 258 and 259 consisting of input stages 260 and 261 and output stages 262 and 263. Each of amplifiers 255 receive signals from two cells in array 89 so that twenty-one such units are required for the complete cell array. The polar voltage signal is applied to pin N of each input stage and the input signal from one of the two cells associated with each amplifier 255 is applied to pin P and the input signal from the other cell is applied to pin L, see FIG. 46A. The input stages 260 and 261 are normally conducting (zero bias) and the cell signals are applied to the grids through coupling capacitors 264 and 265. The input signal to each stage is clamped by diodes 266 and 267 which are junction diodes, and the positive-going output signals from input stages 260 and 261 are coupled respectively to output stages 262 and 263 through capacitors 268 and 269, the grids being held clamped by the action of diodes 270 and 271 shunting grid resistors 272 and 273, respectively. The forty-two output signals delivered at pins C and D of the twenty-one amplifiers 255 are connected to the sort and check character relay circuits 275 and 276, as seen in FIGS. 21 and 22.

The function of character selector relay circuits 275 and 276 is to connect the appropriate amplifier units 255 to the sort and check channels of the program console 20. This is accomplished by two contact networks 277 in which each bit of each character is commoned by the character selector relays D1–D7 for the sort channel and relays E1–E7 for the check channel. In order to eliminate mere duplication only one network and one set of relays have been shown in FIG. 22. For this reason, only one set of relays have been shown with designations for both relays D1–D7 and E1–E7. It is to be understood, therefore, that for the sort character relay circuit, energization of any one of relays D1–D7 will cause its six corresponding contacts to be closed and for the check character relay circuit any one of relays E1–E7 will be energized, the energization of the appropriate relay or relays (one for each channel) being determined from plugboard 21 and by connection to the positions indicated with respect to section B thereof designated below each of relays D1–D7 and E1–E7 in FIG. 22. The relays are energized one at a time for each pass of the cards. Thus, it is possible to sort one character and check on one character for each pass of the cards. The relays will remain energized for the entire pass of a sort in one direction and will change to another character during each machine reversal and stepping of stepping switch relay A1. Each of the fourteen relays D1–D7 and E1–E7 have a shunt diode 278 for arc suppression of the stepping switch contact which energizes it. Since the corresponding bits of each character are commoned by network 277, only the output signals corresponding to the six bits from any one of the seven characters in a word, as determined by one of relays D1–D7 or E1–E7, are delivered to the output lines 279 and 280 of circuits 275 and 276. In other words, from the forty-two signals delivered to each of circuits 275 and 276 only six output signals are ultimately derived, these six signals corresponding to the same character or different characters in the sort and check channels.

Figure 23:
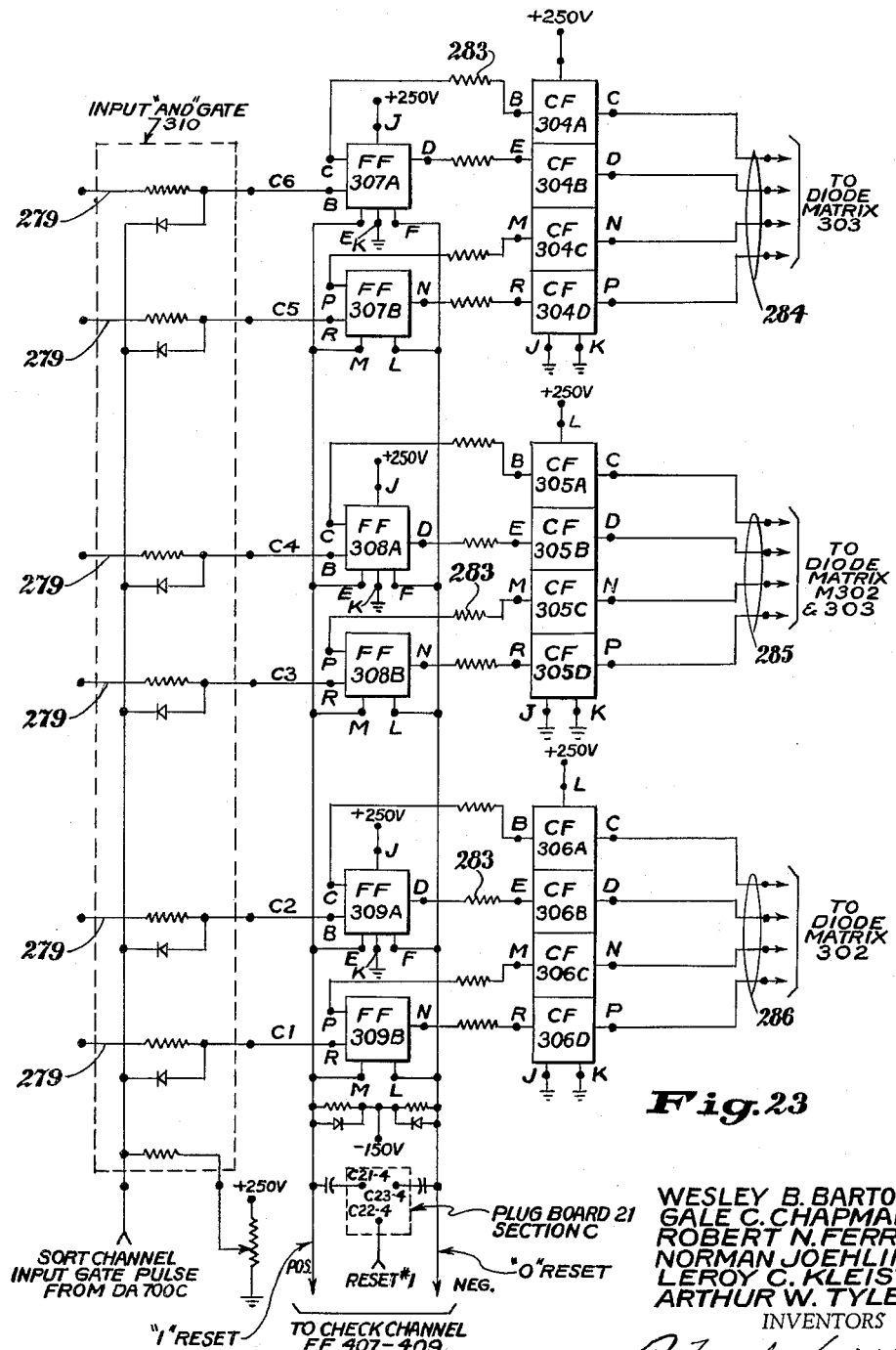
FIG. 23 is a schematic of the "AND" gate, decode flip-flop and cathode follower circuits for the sort channel.
Figure 24:
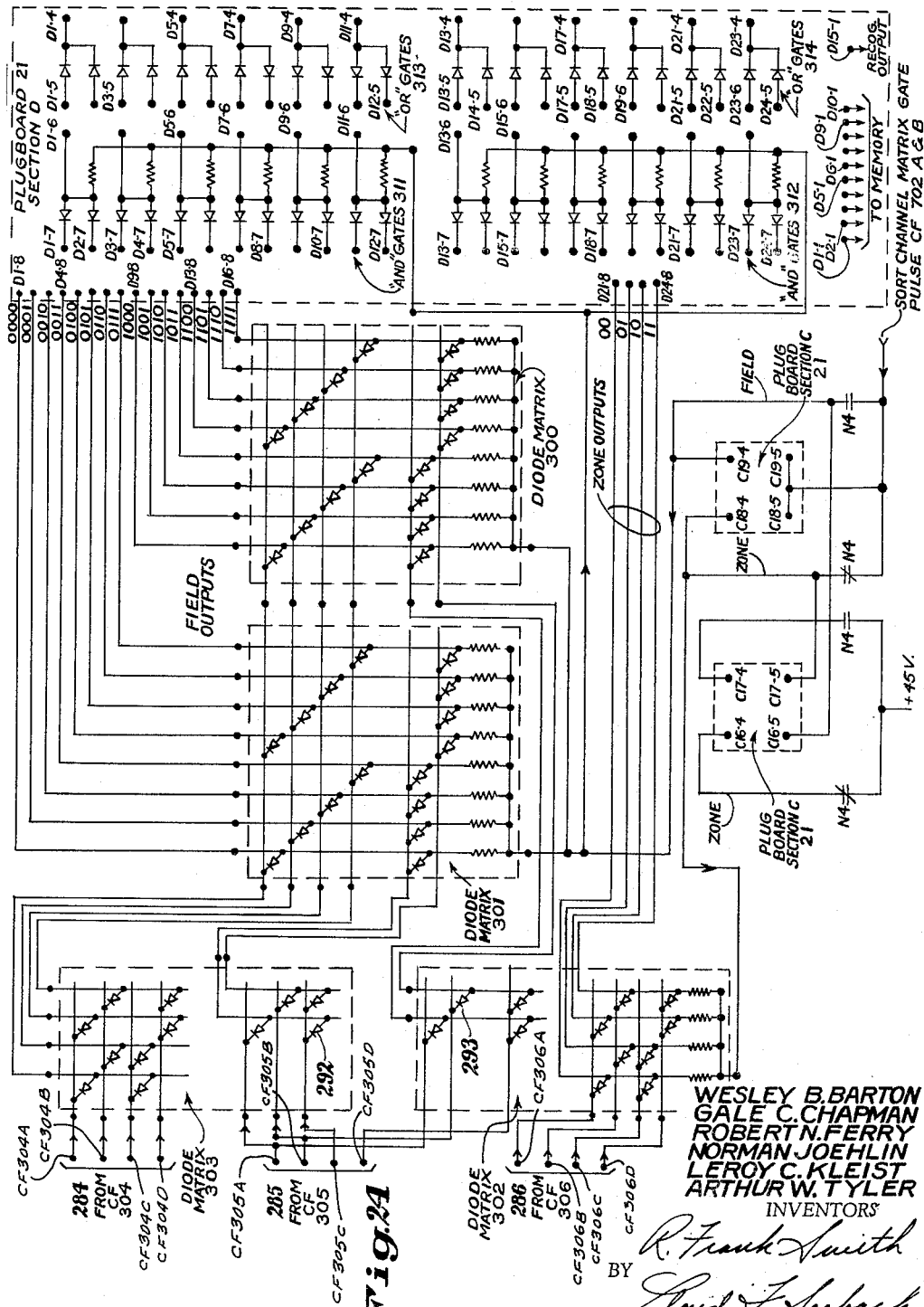
FIG. 24 is a schematic of the decode matrix circuit and the connections thereof to the section of the plugboard for the sort channel.
Figure 25:
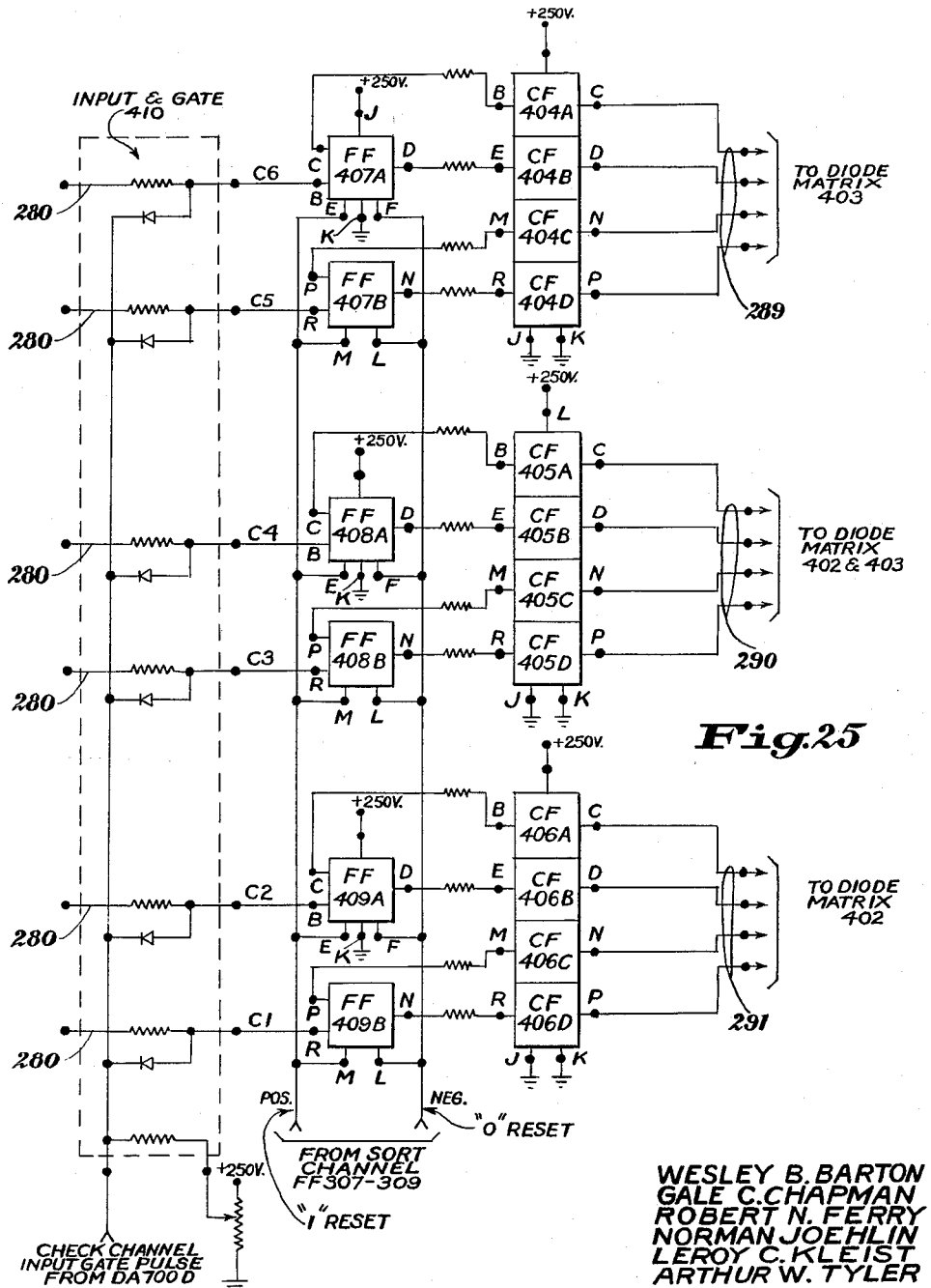
FIG. 25 is a schematic of the "AND" gate, decode flip-flop and cathode follower circuits for the check channel.
Figure 26:
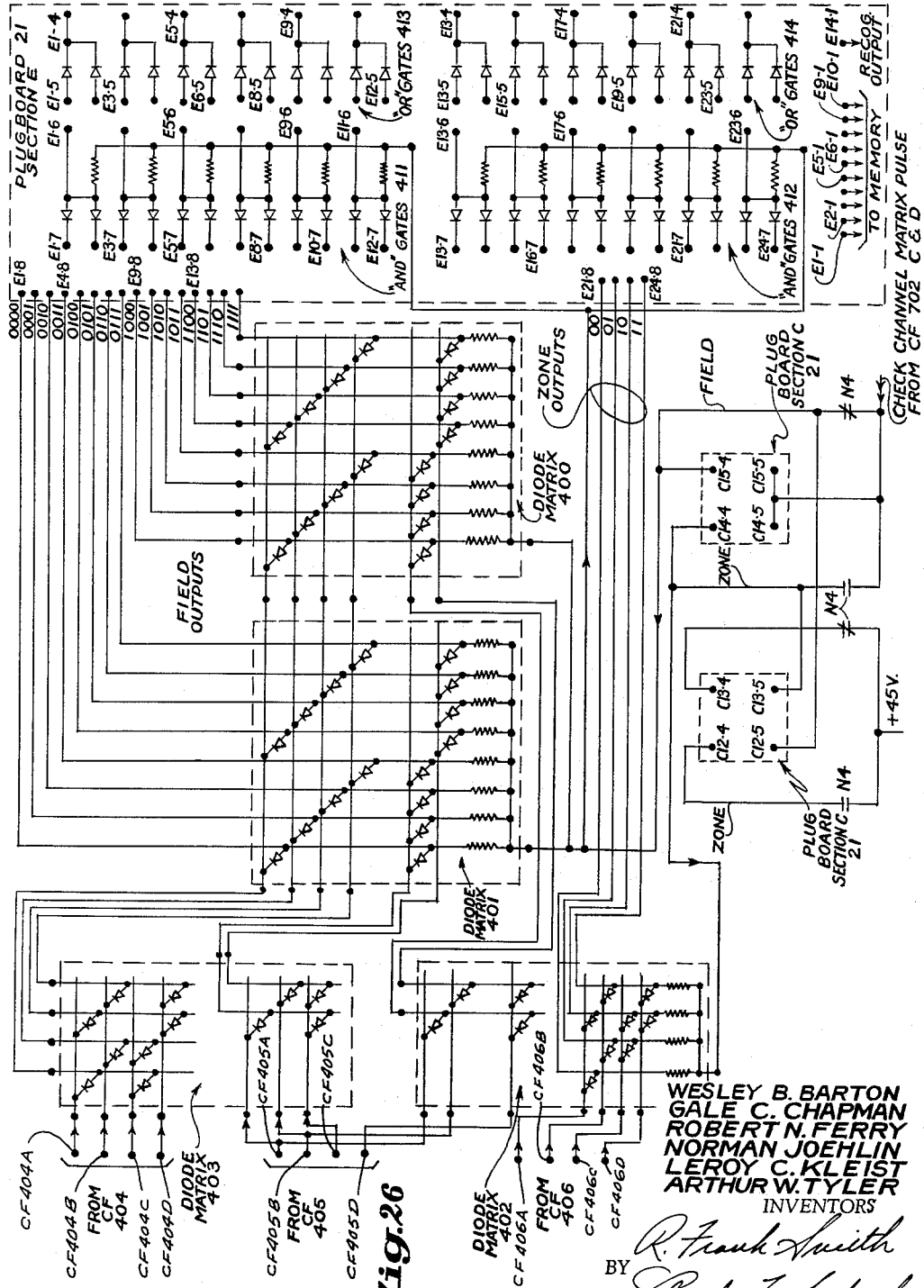
FIG. 26 is a schematic of the decode matrix circuit and the connections thereof to the section of the plugboard for the check channel.

The input signals from bit amplifiers 255, as determined by relay circuits 275 and 276 on lines 279 and 280 are connected to "AND" gates 310 and 410 in the sort channel circuit 281 and check channel circuit 282, see FIGS. 21, 23 and 25. Circuits 281 and 282 are identical from the standpoint of components and function and only the sort channel circuit will, therefore, be described. The input signals on lines 279 are applied with the gate pulse in "AND" circuit 310 to the decode flip-flop circuits FF307—FF309 which are reset to a prescribed state by reset #1 pulse applied to the left grid returns when reading positive cards and to the right grid returns when reading negative cards. Flip-flops FF307—FF309 change state if a "1" is present at its input or remain in the reset state if a "0" is present at its input. The output square wave is directly coupled through resistors 283 to suitable cathode follower stages CF304—CF306. The outputs from cathode follower stages CF304—CF306 are connected by lines 284, 285 and 286 to diode decode matrices 302 and 303, as seen in FIGS. 24 and 26. The "1" or "0" signal amplitude from cathode follower stages CF304—CF306 controls the operation of matrices 302 and 303.

Figure 50:
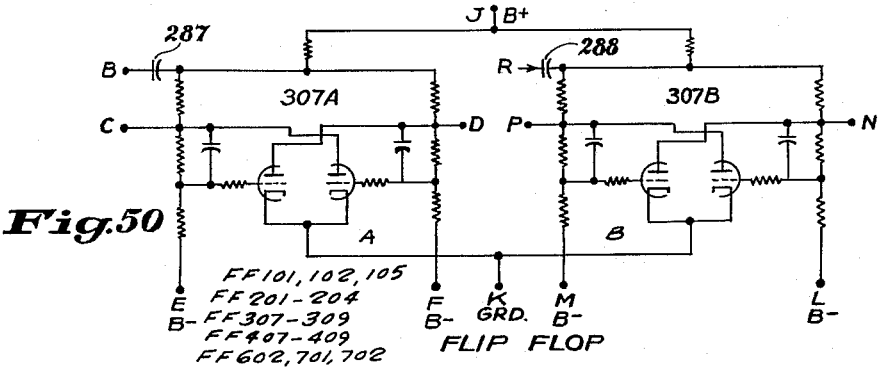

With reference to FIG. 50, each of flip-flops FF307—FF309 comprise a package of two flip-flop circuits in which signals on a pair of lines 279 are applied to pins B and R through coupling capacitors 287 and 288, the output signals being taken off at pins C, D, N and P and being in the form of a square wave. Inasmuch as these are conventional circuits, no further description is believed necessary. The cathode follower circuits CF304—CF306 are shown in detail in FIG. 54 and comprise a group of four such circuits in a common package. These circuits are also of conventional design and require no further explanation. It is to be understood, of course, that signals are applied to matrices 302 and 303 via flip-flops FF307—FF309 and cathode followers CF304—CF306 only when the signals from character selector relay circuit 275 occur simultaneously with sort channel input gate pulse from DA700C at "AND" gate 310. The signals on lines 289, 290 and 291 for check channel circuit 282 are connected to matrices 402 and 403 as shown in FIGS. 25 and 26.

Matrices 300, 301, 302 and 303 for the sort channel have the sole function of converting the input binary signal data, as derived from each sort character on card 25, back to output numeric data. The same function is performed by check channel matrices 400, 401, 402 and 403. The diodes 292 of matrix 303 and some of the diodes 293 of matrix 302 form series injection circuits to the diode decode matrices 300 and 301. The zone decode matrix 302 contains no series injection diodes inasmuch as automatic biasing is obtained through suitable programming. The output signal from the matrices is determined by the gate pulse as generated in the matrix gating circuit 294, see FIGS. 21 and 29. The matrix field output is a positive square wave pulse delivered to any one of the lines to plugboard 21, section D, at D1–8 through D16–8, only ten of these lines D4–8 through D13–8 being used as noted in the table at the beginning of the specification. The zone output is made available at positions D21–8 through D24–8 also in the same section of said plugboard. Up to this point the sort channel circuit 281 and check channel circuit 282 are the same and the outputs are connected, respectively, to sections D and E of plugboard 21 which will be described more fully hereinafter.

In addition to the forty-two bits of code in each column, cell array 89 contains a single cell for driving a signal from each timing mark 29. As in the case of each bit signal, the timing mark signal is superimposed on the square wave of the polarization voltage. The timing mark signal is delivered to the timing mark synchronizing circuits 257 which serve to modify the timing mark signals to a desirable and usable form to supply polarizing voltage to the cell array 89 and to supply the gating signal for starting and stopping the card reading cycle. These functions are obtained by the use of suitable amplifier, multivibrator and flip-flop circuits.

With reference to FIGS. 21, 36 and 37–45, the synchronizing circuit 257 has four inputs: the timing mark pulse from cell array 89 which is delivered to pin R of amplifier P2006; the positive and negative polar pulses derived from slot 177 in disc 176; and the start-read pulse which is also derived from slot 177, as described above in conjunction with FIGS. 15 and 16. The input signal to amplifier P2006, as received from the timing mark 29, is developed at the junction of ballast resistor 296 and input coupling capacitor 297, see FIG. 37. The polar voltage D.C. level is lost at the grid of the amplifier 298 and only the sinusoidal is, therefore, present. Resistor 299, see FIG. 36, provides a level control bias and is set to eliminate any small variation of transient signals which may be due to dirt particles in the optical system. Amplifier 298 is a conventional high gain amplifier and amplifier 315 is a high degenerative amplifier, this latter stage being used as a phase inverter since outputs are taken from the plate and cathode, as selected by the Pos-Neg card relay K2001. Relay K2001 is energized when reading positive cards and is not energized when reading negative cards, selection being made via plugboard 21 at C21–4, C22–4 and C23–4.

The input signal for amplifier P2007 and received from amplifier P2006 via the contacts of relay K2001, is capacitor-coupled through capacitor 316 to the grid input of amplifier stage 317. This stage is normally conducting and the negative-going input signals drive this stage into a cut-off state. The positive-going output pulses are coupled to the second stage 318 through capacitor 319 to the grid circuit. Resistor 320 acts as a grid leak while diode 321 is a clamper for negative-going signals. Stage 318 is a grounded plate amplifier and fast cathode voltage is obtained through the voltage divider resistors 323 and 324. The output signal is derived from the plate circuit having resistor 325 and is coupled to the timing mark control gate P2009.

Figure 40:
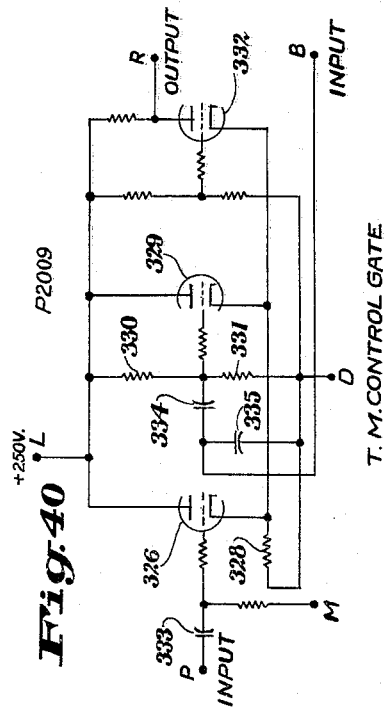

Timing mark control gate circuit P2009, as shown in detail in FIG. 40, functions as a gated amplifier in which two inputs are necessary to obtain an output. The two input signals are derived from amplifier P2007 and flip-flop circuit P2013 which is discussed hereinafter. The input stage 326 in the absence of timing marks is normally held conducting by the bias control 327, see FIG. 36. The plate current of this normally conducting stage develops a bias voltage across the common cathode resistor 328. Stage 329 is normally held conducting by the positive bias from the voltage divider network comprising resistors 330 and 331. The plate current from this stage through the common cathode resistor 328 further adds to the bias voltage which is of sufficient amplitude to keep stage 332 in a cut-off state. When timing marks 29 present a signal to stage 326 and the control gate signal is present at stage 329, the cathode bias is decreased sufficiently to permit stage 332 to conduct and an output signal is taken from the plate of this stage. Capacitor 333 couples the timing mark signal to stage 326 and capacitor 334 couples the control gate to stage 329. Capacitor 335 provides a short time lag which is necessary to slow up the gate. The output signal from stage 332 is applied to trigger circuit P2008.

Figure 39:
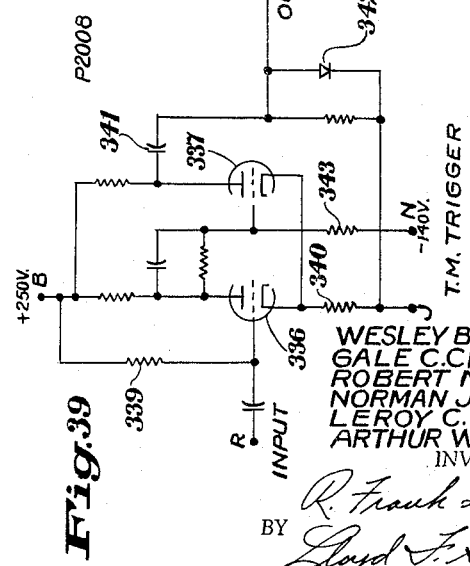
Figure 38:
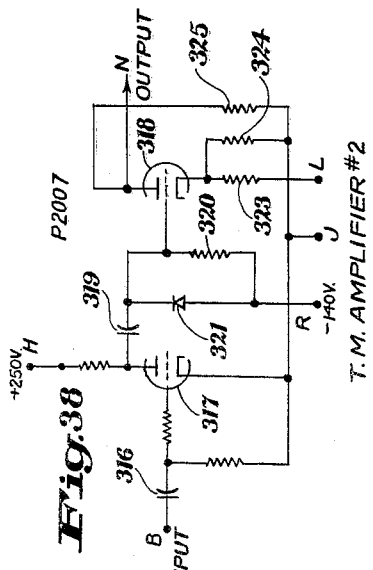
Figure 37:
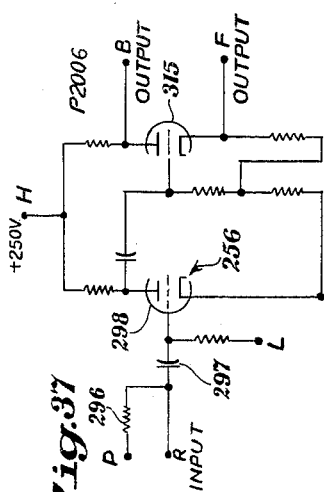

Trigger circuit P2008, as shown in FIG. 39, comprises a duo-triode tube forming stages 336 and 337 which are utilized as an inverted Schmitt trigger circuit. The wave form of the output signal from stage 332 of P2009 is not usable because its rise time is not fast enough to operate the next stage and the delay control circuit. It is the purpose of this circuit, therefore, to provide a sharp trigger pulse for operating the input stage 338 of shaper circuit P2010. Input stage 336 is normally held conducting by resistor 339. The plate current flow through the common cathode resistor 340 keeps stage 337 normally cut off. Direct interstage coupling is utilized to increase time use. The output signal from stage 337 is decoupled by capacitor 341 and clamped to ground by diode 342. The bias on the grid of stage 337 is maintained through voltage divider resistor 343. The output signal is delivered to pin R of shaper circuit P2010.

Shaper circuit P2010 consists of two duo-triode tubes, the input stage 338 being a high degenerative amplifier which receives its input signal from trigger circuit P2008 and is normally in a conducting state. The negative-going input signal cuts this stage off and the positive-going signal is coupled to clamp diode 344 and pull-up voltage divider 345, and then to a single-shot multivibrator comprising stages 346 and 347 which serves as a variable time delay, being set by potentiometer 348, see FIG. 36. The output pulse from stage 346 is differentiated by capacitor 349 and resistor 350 and applied to amplifier stage 351. Stage 351 is normally cut-off by the voltage divider comprising resistors 352 and 353. The output signal is taken from the plate of stage 351 and is connected to signal-shot multivibrator SSMV702 in the column counter circuit 354, see FIGS. 21 and 47.

Each of the pulses generated by disc 176 is connected to a one-shot cathode follower amplifier circuit, as designated by P2005, P2011 and P2012 in FIG. 36 and of the type shown in detail in FIG 42. Amplifiers P2005, P2011 and P2012 each comprise an input stage 355 having a resistor 356 which is utilized as a load resistor for the respective phototransistor which generates the positive-going input pulse. Input stage 355 is a conventional self-biased amplifier which is normally cut-off by the voltage developed across the cathode resistor 357. The output signal from stage 355 is coupled by capacitor 358 to a single-shot multivibrator comprising stages 359 and 360, stage 359 being held positive and conducting by resistor 361. Single shot action is obtained by means of timing circuit resistor 361 and capacitor 362. The output signal from stage 360 of P2005 is plate-coupled to pin D of flip-flop circuit P2013 to initiate the leading edge of the polarizing voltage, the output signal from stage 360 of P2011 is plate-coupled to pins F and L of flip-flop circuit P2013 to initiate the trailing edge of the polarizing voltage and the output signal from stage 360 of P2012 is plate-coupled to pin N of flip-flop circuit P2013 to initiate the control gate pulse applied to circuit P2010.

Flip-flop circuit P2013 comprises two flip-flops having stages 363, 364, 365 and 366 and has a two-fold purpose. Stages 363 and 364 generate the signals from the polarizing voltage and stages 365 and 366 generate the timing mark control gate pulse applied to circuit P2010. The flip-flops are of the conventional bistable type and capacitor 367 and resistor 368 form a voltage divider and decoupling network. The resistors in the grid circuits are parasitic suppressing elements to prevent self-oscillations. Disc 176, as described above, provides three signals with each rotation thereof and these signals are presented to amplifiers P2005, P2011 and P2012. The first signal, that is, the positive polarization voltage signal which is amplified by P2005, after amplification is delivered as an output signal from stage 360 to stage 364 of P2013 causing stages 363 and 364 to switch conduction and thereby producing a signal which is delivered to stage 370 of polarization supply circuit P2014. The second or start-read signal which follows the first signal is amplified and the output signal from stage 360 of P2012 is transmitted to stage 366 of P2013 to switch conduction of stages 366 and 365. The output signal from stage 365 is returned to cathode-follower amplifier stage 371 of P2005 via pin F and the negative-going square wave output signal is transmitted to stage 329 of P2009 to provide the second signal which with the timing mark signal applied to stage 326 is necessary to provide an output signal to P2008. The negative polarization signal follows the start-read signal and after amplification by P2011, the output signal from stage 360 is transmitted to stages 363 and 365 of P2013 to revert stages 363, 364, 365 and 366 to their normal state, thereby cutting off the polarization voltage to cell array 89, stopping the start-read signal and conditioning the circuitry for the next machine cycle.

Polarization supply P2014 is used to generate the polarization voltage applied to cell array 89. The square wave input signal, as received from stage 363 of P2013 at pin N, see FIG. 43, drives the normally conducting stage 370 into a cut-off state. This positive-going signal is coupled by capacitor 372 to stage 373 which is normally held cut off by the voltage drop across resistor 374. The amplitude of the polarizing voltage is controlled by potentiometer 375, see FIG. 36, which applies a positive bias to the cathode of stage 370 to control the gain thereof. The output stage 376 is a grounded grid amplifier which is normally conducting and this stage is used to set the zero level point of the polar voltage. Resistor 377 applies a negative bias to the plate circuit of stage 376 to fix its point of conduction.

Demodulation filter P2015 is a two stage RC filter which fixes the D.C. level at the junction of resistors 378 and 379, see FIG. 44, at zero level. Diode 380 serves to prevent signals tending to rise above the zero level and diode 381 serves to prevent signals tending to drop below the zero level. The net function of P2015 is to act as an automatic gain control circuit. The change in voltage at the junction of resistors 378 and 379 is returned to stage 376 to P2014 via pin B and acts as a variable bias to change the zero level point of the polar supply. Stabilization of the polar voltage is essential for correct operation of the cell array 89. The output or polarization voltage from stage 373 of P2014 is connected to pin M of P2015, through a contact of relay K2002 to pin P of P2006 (stage 313), and to each of the cells in array 89, as simply shown in FIG. 36, through a ballast resistor 382. Relay K2002 is continuously energized as long as the machine is in operation.

With reference to FIGS. 21 and 47, the column counter 354 is an electric device for counting the number of columns of data on any one card. Prior to the reading of a card positioned in reading station 16, the tens counter 385 is reset to zero and the units counter 386 is reset to one by a signal called the reset #1 pulse. This pulse is generated by relay A4 which is energized by relay A11 which, in turn, is energized by cam switch P1, as described above and shown in FIG. 35. The count is in the form of a signal voltage present in plugboard 21 where a column is preselected by plugging prior to running the sort problem. If the count is less than ten, the tens counter 385 is plugged to zero. Electrically the two counters are identical having two states; that is, conduction and nonconduction, so that the count is accomplished by the binary system, flip-flop circuits FF201—FF204 being the same as those described above and shown in FIG. 50. These binary conditions are converted to a step voltage function by the resistor matrices 388 and 387, as is well known, and are available at plugboard 21, section C, by pins C1–5 through C10–5 for the units counter 386 and C1–1 through C10–1 for tens counter 385. For a count less than ten, counter 385 must be plugged to zero and for a count greater than 9, counter 385 is plugged to the appropriate number.

Figure 51:
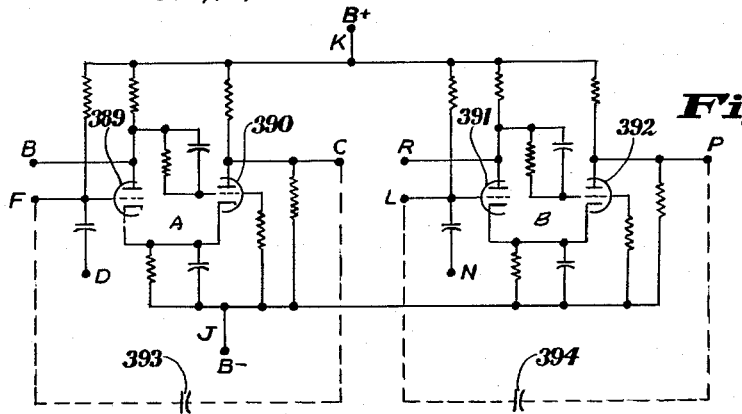
Figure 52:
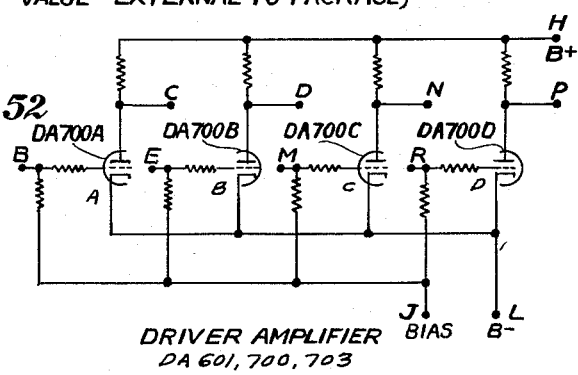
Figure 53:
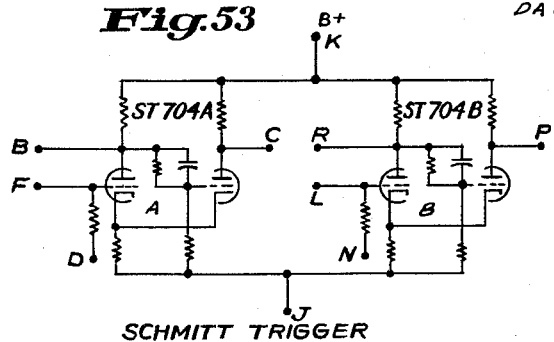

The successive output signals from P2010 which are derived from the timing marks 29 are connected to pin D of single shot multivibrator SSMV702A. As shown in FIG. 51, the package contains two such circuits comprising stages 389 and 390 as unit A and 391 and 392 as unit B which are identified with SSMV205, 206, and 702. Capacitors 393 and 394 are supplied externally to provide the required time delay. These circuits are conventional single-shot multivibrator circuits. The input signal at pin D of SSMV702A results in an output signal at pin B which is coupled to SSMV206. This circuit provides a 40 millisecond delay and an output signal to flip-flop 201A at pin B, see FIG. 50, as well as a negative-going square wave signal to gated amplifier GA207 at pin C and to GA600 in the multiple card counter circuit 395, see FIGS. 21 and 49. Gated amplifier 207 is shown in detail in FIG. 56 and comprises stages 396, 397, 398 and 399, an output signal being derived from stage 399 at pin R only with coincidence of both counter signals with one of the gate pulses supplied by the timing marks via SSMV702A and SSMV206A, said counter signals being derived from plugboard 21, section C at C10–3 and C9–3 and indicating the code column to be read by cell array 89. The operating bias for stage 399 is obtained by adjusting potentiometer 415. The output pulse delivered by stage 399 of GA207 is utilized for distribution to sort and check channels 281 and 282 and to the input AND gates 310 and 410 of the data input channels. The primary purpose of gating control circuit 294 is to apply a GO signal to the sort channel data which is occurring at the input of the sort decode flip-flop circuits FF307—FF309, to the check channel decode flip-flop circuits FF407–FF409 and to decode matrices 300, 301, 400 and 401.

In FIG. 29, control gating circuit 294 is shown schematically and it will be noted that unless plugboard 21 has C12–1 plugged to C12–2, the open contact of relay R serves to bypass the checking feature on the first pass of the cards. Relay R, see FIG. 58, is not normally actuated on the first pass and to facilitate checking a tag recognition character on the first pass, the plugboard 21 must be plugged to provide the required GO signal to the check channel. On all other passes relay R is actuated and the checking feature is normal. The negative output signal from column counter 354 is applied to pin B of driver amplifier DA700A which is shown in detail in FIG. 52 together with stages 700B, 700C, and 700D. Stage DA700A, see FIG. 29, is normally conducting due to the positive grid bias through resistor 416. The output pulse is applied to driver amplifier stage DA703C, which is normally cut off, through capacitor 417. The negative-going output pulse is applied to DA703D, which is normally conducting, through coupling capacitor 418. The positive-going output pulse is applied through capacitor 419 to DA700C and to DA700D, both of these stages being normally cut-off. The negative pulse from each of these two amplifier stages is applied as a gating pulse to input AND gates 310 and 410 through capacitors 420 and 421, respectively. The negative-going output pulse from DA700A is also applied to plugboard 21 through capacitor 422 at C12–2. If it is desired to use the check channel on the first pass to check the tag character then C12–2 is plugged to C12–1. If it is desired to drive the sort channel only on the first pass of the cards, C12–2 is then plugged to C13–1. If it is desired to drive the sort channel on the first pass and the check channel on subsequent passes, then C12–2 is plugged to C13–2. Routing of the gate pulse is thus accomplished by these possible pluggings of board 21 and by relay R. If C12–2 is plugged to C12–1, the negative-going pulse is sent to AND gate 423 via diode 424 and resistor 425 on to the Schmitt trigger circuit ST704B, which is shown in detail in FIG. 53 and discussed hereinabove. Resistors 426 and 427 serve as a bias voltage divider to bias the input stage of this circuit to the required voltage to hold it normally conducting. The positive-going output pulse is further amplified and shaped in amplifier DA703B which is normally nonconducting. Capacitor 428 couples this signal to DA703B. The negative-going output pulse is applied to flip-flop FF701B whose input stage is normally conducting. The same reset pulse which is applied to FF201—FF204 in the column counter circuit 354 is also applied to FF701 in this gating circuit for setting the flip-flops to the correct state for each machine cycle. Diode 429 insures stability of the flip-flop circuit in the absence of a reset pulse. The square wave output is directly coupled to two parallel cathode follower stages CF702C and CF702D and the positive-going square wave output gate pulse is applied to matrices 400 and 401 via plugboard 21, C14–5, to perform the checking function. Similar action takes place if the pulse from the amplifier DA700A is to drive the sort channel diode decode matrices 300 and 301. AND gate 430 comprising diode 431 and resistor 432 couples the signal to ST704A and this signal then proceeds through DA703A, FF701A and CF702A and B. The positive-going square wave output gate pulse is sent to the matrices via C18–5 on plugboard 21 to perform the sorting function. If the checking feature is used on all passes except the first, the sort channel matrix gate pulse is obtained from the signal present at E15–1 through E24–1 on plugboard 21 in accordance with the character read. Since relay R is actuated on all passes except the first, this signal proceeds through the contacts of relays N1 and R to AND gate 430. If the checking feature is to be used on the first pass, the tag character must be read and this signal is obtained from plugboard 21 at E14–1 and is applied through the normally closed contact of relay R to AND gate 430.

The first character in each column of code is known as the tag recognition character and it is this character which is used as a check for the first sorting operation. This character can be either a letter or a number and if a letter, an AND gate is needed to combine the zone and field signal which is present at the output of the check channel decode matrices 400 and 401. Assuming that the tag character is the letter "S" which is denoted in the binary code by the bit arrangement 110101, the bits "11" are the zone and the bits "0101" are the field. Since the tag recognition character always appears as the first character of a column, it is necessary to make the following connections on plugboard 21. The connection of B15–2 to B15–3 actuates check character selector relay E1, see FIG. 22, to close the seven contacts E1 associated with the first character; of E6–8 to E2–3 provides a commoning point; of E1–3 to E1–7 applies the field input to one of AND gates 411 and of E24–8 to E2–7 connects the zone input to the same AND gate. Since relay R is actuated on all passes except the first, the signal proceeds to AND gate 430 and as described above, if the checking feature is to be used on the first pass, the tag character must be read for each card and E1–6 is plugged to E14–1 on plugboard 21 to provide a common output for the AND gates 411 and 412, the signal then being applied to AND gate 430 through the closed contact of relay R to diode 433. This procedure can only be realized if the tag character read and producing the gating signal is correct. If not correct, the card is then moved by belt 50 past the magazines and is inserted in one of the reject magazines. A positive-going signal derived from SSMV205A, see FIG. 47, is coupled by capacitor 435 to DA700B which is normally cut off. The negative-going output pulse from this amplifying stage is applied to the reset line of empty magazine counter circuit 436 through coupling capacitor 437.

As shown in FIGS. 21 and 48, the empty magazine counter circuit 436 is utilized to indicate the presence of an empty magazine and step the sequence of magazine selection automatically to the next magazine. When a card is being read, the timing marks 29 generate a reset pulse which is derived from DA700B and which maintains this counter reset to a count of zero. When cards are not being read which is the condition when a magazine becomes empty, no reset pulse is generated. This allows the counter to be pulsed negative each time that relay A7 is energized by cam switch P1, see FIG. 35. The counter comprising flip-flop circuits FF101A–105A is a revision of the normal $2^5$ binary count to obtain a total count of "23" instead of the possible "32" count which could be obtained. Thus, the counter circuit is triggered each time relay A7 is energized by cam switch P1. If no cards are presented to reading station 16 in order to provide the reset pulse and a count of "22" is obtained, then resistor matrices 438 present a signal at pin P of TRD103B and at pin P of TRD104B. TRD103A and B and TRD104A and B are thyratron drivers for relays M1—M4, respectively, and comprise a thyratron tube circuit of the type shown in detail in FIG. 48A. With reference to FIG. 4A, it will be noted that the last card positioned in reading station 16 for a sort moving the card in either direction must be inserted in a designated magazine before machine reversal. As a result, a count of "22" permits the card to be moved in either direction to the farthest magazines which in each instance is the reject magazine 13 or 19 before machine reversal or stepping of the feed to another magazine. In some of the sort problems discussed hereinafter, the sort is started by placing the cards in any one of the intermediate magazines 14 or in any one of the magazines in block 24 arranged over belt 50. Since no cards are in reading station 16, circuit 436 provides for the automatic stepping of the stepping switch G until the magazine having cards therein is located. For example, in a fine sort which will necessitate that the stack of cards be first positioned in one of the intermediate magazines 14 for movement to the right past reading station 16 to blocks 17 and 18, let it be assumed that the cards are placed in the "3" magazine. The sort cycle starts with actuation of plunger 146 associated with the "∅" magazine. Upon completion of twenty-three actuations, a signal is present at pin C of TRD103A to complete the ground return for the thyratron which is fired and energizes relay M1 which actuates stepping switch G and steps magazine selection to the "1" magazine. This same procedure follows for magazines "1" and "2." When the selection has been stepped to the "3" magazine, the count again continues; however, before a count of "23" can be reached the first card from the "3" magazine has been positioned in reading station 16 and the reset pulse from timing marks 29 causes the counter to be automatically reset to zero. If during a sort problem, any one of the magazines should become full, a signal is derived from either of photocells 439 by breaking of the light beam by tab 76 on weight 75. This signal causes actuation of relay T2, thereby breaking the cathode return to TRD103A at pin E to prevent actuation of relay M1 by the "23" count. If this signal from either of cells 439 is present with removal of the last card from reading station 16, and a count of "22," the actuation of relay T2 returns the cathode return of TRD104B at pin M to ground thereby firing the thyratron and energizing relay M4. Energization of relay M4 allows TRD603A, see FIG. 49, to fire and pull in relay M5 which, in turn allows relay M7 to become energized, see FIG. 55. This relay sequence delays belt steppage for approximately one second and permits multiple card detection and single card feeding to keep all multiple card groups in order.

If a full hopper is not present with a "22" count, the counter continues until the count of 23 is reached. At this time a signal is provided at pin C of TRD103A and since relay T2 is not energized, the ground return for TRD103A is completed to energize relay M1 which actuates stepping switch G and steps magazine selection to the next magazine. Another function at the count of "22" can occur if any one of the reinsertion switches 224 (intermediate magazines) or 222 (block magazines) is operated. These normally open switches, when operated, return the cathode circuit of TRD103B to ground.

When a count of "22" is reached, the thyratron fires and relay M2 is energized to prevent relay M1 from being actuated and, consequently, stepping switch G will not step selection to the next magazine. At this time another stack of cards can be inserted into the magazine on which switch G has stopped. A normally closed contact of relay M2 in the circuit of relays S1#2 and S2, see FIG. 57, stops movement of belt 50 prior to insertion of the additional cards. Automatic reset of empty magazine counter 436 is obtained at the time start button 442 is actuated. Relay S2 picks up at this time and a contact thereof applies a negative pulse to the common reset line of flip-flops FF101A—FF102B and FF105A. Resistor 443 serves as grid return to the bias supply for the flip-flops as well as an injection point for the reset pulse. Neon indicators 444 have been included so that the counting action can be observed. Resistors 445—452 comprise the resistor matrices 438 from which the counts of "22" and "23" are derived. Resistor 453 and diode 454 form an AND gate 455 to feed back a signal to reduce the total count to "23" instead of "32". Resistors 456—460 and diodes 461 and 462 form a clamper arrangement for the "22" and "23" signal voltages. Grid by-pass capacitors 463 and 464 serve to bypass transient signals to ground thereby keeping the thyratron unfired until the input signal is received.

If a document comprises a large number of pages to be reproduced as document images on a card and therefore requires more than one card, it is then essential that these multiple cards of the same document be kept in proper order, be contained on the same stick, and be filed in the same magazine. For these reasons, multiple card indicator circuit 395 is necessary in order that such multiple cards can be identified during the process of card scanning or reading. Negative cards are identified as follows: single cards have a dark bit in both the seventh and eighth bit positions counting from the timing mark side of the card and in the tenth column of the fixed field; the start of a multiple card group has a dark bit in the eighth bit position of the tenth column and the seventh bit is clear; the end of a multiple card group has a dark bit in the seventh position of the tenth column with the eighth bit clear; and all cards within a multiple group have both the seventh and eighth bits clear in the tenth column.

Gating of multiple card circuit 395 is accomplished from column counter circuit 354, see FIGS. 21, 47 and 49. Since multiple card code always appears in the tenth column of the fixed field, plugboard 21 is plugged to receive this signal when the tenth column is being scanned. This is accomplished by plugging C1–3 (unit counter) to C1–5 and C2–3 (ten counter) to C2–1. By this plugging of plugboard 21, the necessary input signals together with a gate pulse are applied to gated amplifier GA600. The signal from GA600 is amplified by driver amplifiers DA601A and DA601B and applied to the input of FF602A and FF602B at pins B and R, respectively. It will be noted with reference to FIG. 58 that relay J1 and J2 are energized with actuation of reset switch 465. A contact of relay J2, see FIG. 49, then provides a reset pulse to FF602A and B to place both of these circuits in an in-phase relationship, that is, in which both output stages are nonconducting and both input stages are conducting, this condition being indicated by neon lamps 466 and 467. The start of a multiple group, as indicated by the eighth bit, generates a signal which is applied to flip-flop 602A at pin B, no signal being present at FF602B. Thus, an out-of-phase condition exists between the two flip-flop circuits. Biasing of the output AND gates 468 and 469 is such as to assure that no signal is presented to TRD603A at pin C until the end of a multiple card group is reached. The end of a multiple card group, as indicated by the seventh bit of the tenth column generates a signal which is applied to FF602B at pin R. This signal then puts FF602A and B in an in-phase condition so that the output signals therefrom together with the gate pulse delivered by SSMV206B at gates 468 and 469 causes thyratron relay driver TRD603A to fire thereby energizing relay M5 to stop the machine, drivers TRD603A and TRD603B being the same as TRD103A and B disclosed in FIG. 48A. This is accomplished by the contact of relay M5 in the circuit of relays S1#2 and S2, see FIG. 57. However, the contact of relay M7 maintains the circuit to insure that the last card is removed from belt 50 before the machine actually stops. Energization of relay M5 closes its contact in the circuit of relay M7, see FIG. 55, and resistor 470 and capacitor 471 serve to delay the pull-in time of relay M7. With energization of relay M7, relay S1#2 is deenergized and the machine is stopped. To use the multiple card circuitry on all passes of cards, it is necessary that the plugging of C20–1 to C20–2 be made and for use in just the last pass of a fine sort, C20–2 must be plugged to 20–3 on plugboard 21.

Figure 57:
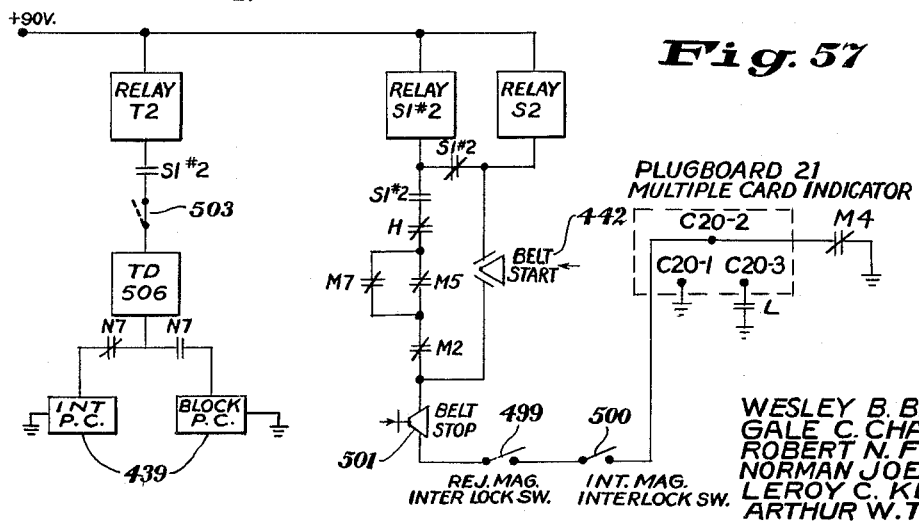
Figure 30:
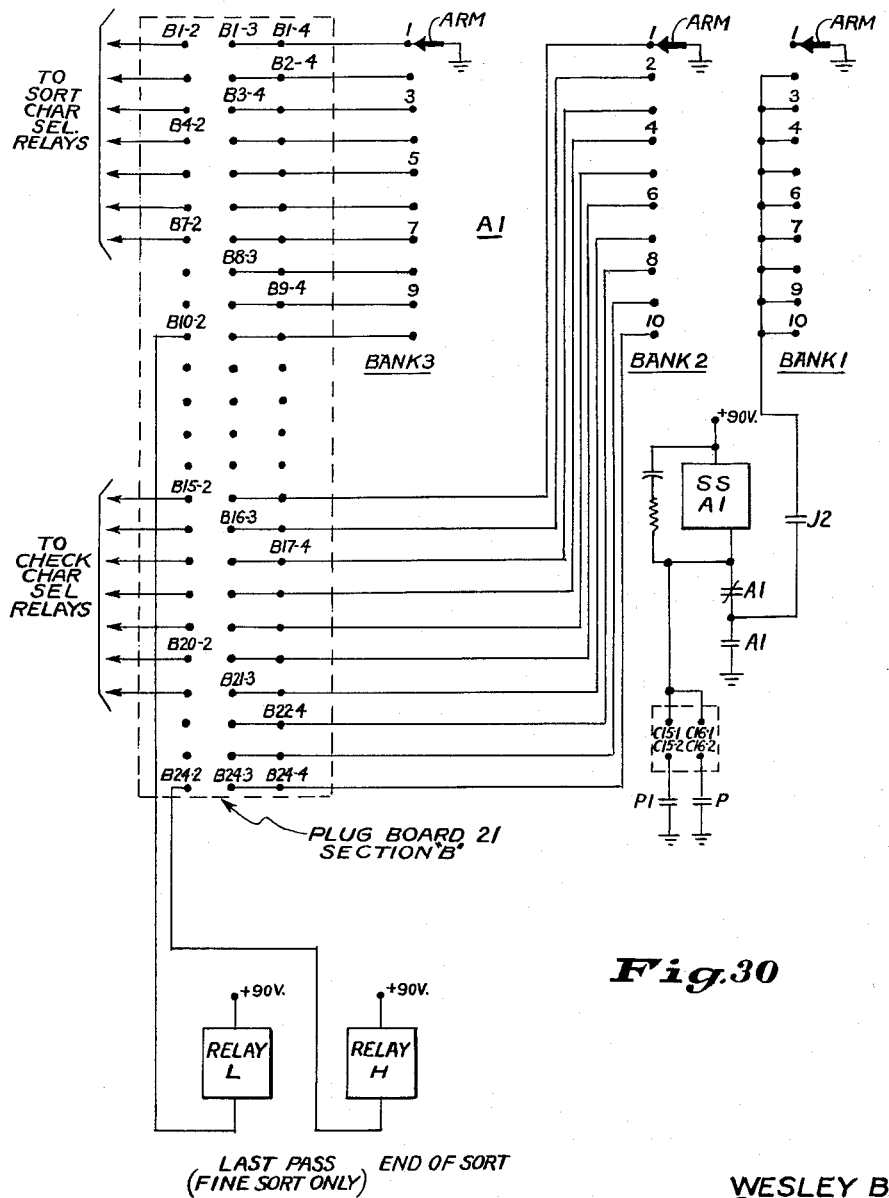
FIG. 30 is a schematic of the "A1" stepping switch circuit and the connection thereof to the plugboard.

Stepping switch A1, see FIG. 30, is a commercially available item consisting essentially of a plurality of wiper springs or arms which are rotated by a pawl and ratchet mechanism which, in turn, is actuated by an electromagnet SSA1 in response to current pulses. This electromagnet SSA1 is energized by energization of relay P or P1 depending on a predetermined plugboard connection. Stepping switch A1 performs the functions of energizing character selector relays D1–D7 and E1–E7, of energizing last pass relay L, and of energizing end of sort relay H to stop the machine by means of its contact in the circuit of relays S1#2 and S2, as shown in FIG. 57. The sequence of these functions is determined by the connections made in section B of plugboard 21. Relay P is energized each time the arm for bank 1 of stepping switch G is in the number one or homing position, see FIG. 28. Relay P1 may be used on the special function alpha-numeric sort using two passes per character and is controlled by contacts of bank 3 of stepping switch A2; however, checking cannot be accomplished at the same time. Only three banks of the switch A1 are utilized; bank 1 being used for homing purposes, bank 2 being a nonbridging bank used to complete the coil circuits of the check channel character selector relays E1–E7 and the end of sort relay H, and bank 3 also being used as a nonbridging bank to complete the coil circuit of the sort channel character selector relays D1–D7 and last pass relay L. The function of banks 2 and 3 are controlled as to sequence of operation by connections in section B of plugboard 21.

Figure 31:
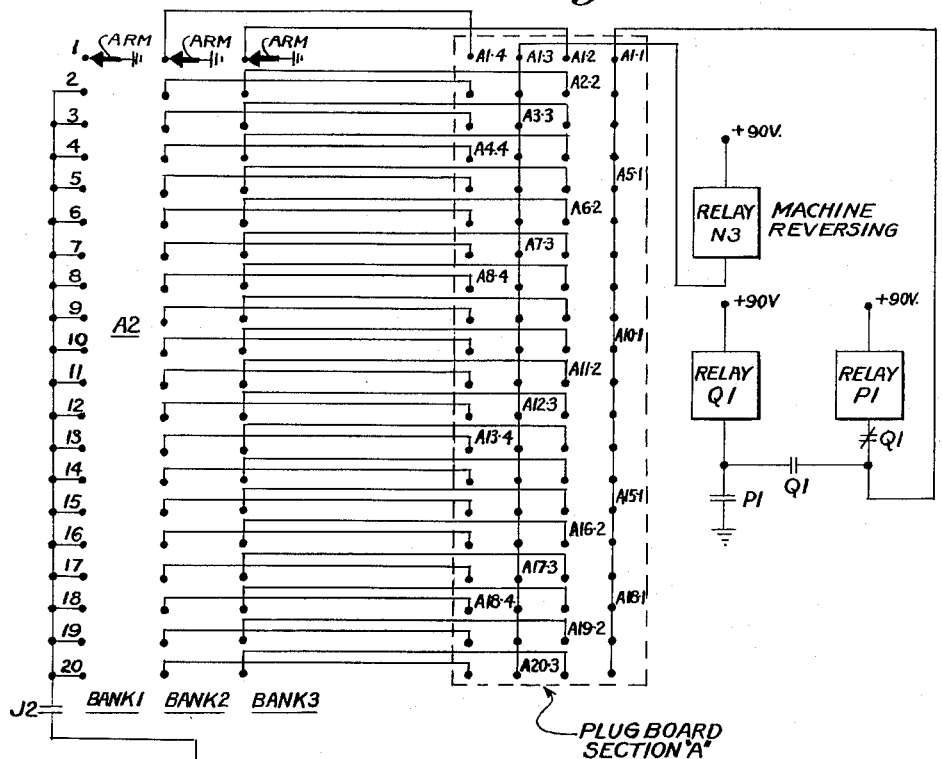
FIG. 31 is a schematic of the "A2" stepping switch circuit and the connection thereof to the plugboard.

Stepping switch A2, see FIG. 31, also performs two functions: the first being energization of relay N3 for machine reversing and the second being energization of pulser relays P1 and Q1. Switch A2 is also a commercially available switch of the type described above with respect to switch A1. The pulses to the electromagnet SSA2 are supplied by the closing of an external contact of relay P which is energized by the closing of a contact whenever magazine selector switch G is reset to its #1 position. Bank 1 of switch A2 is used for homing purposes, bank 2 completes the coil circuit of relay N3 for machine reversing, and bank 3, which is in the coil circuit of relay P1, is used only in the case of an alpha-numeric sort requiring two passes per character and in which the check feature is not used.

The signals from diode matrices 300—303 and 400—403 are connected through the medium of plugboard 21 to a memory device 472. The purpose of memory 472 is to delay the operation of the respective plunger solenoid 152 until the card is moved into a position below its designated receiving magazine. Memory 472 comprises a plurality of magnetic core shift registers 473, each stage of which comprises an input core 474 and an output core 475. In FIG. 33 the complete number of stages is shown diagrammatically with the stages for D1–9 and E1–9 or the "8" register being shown in detail. The shortest register, i.e., the "9" register, comprises three stages and each successive register increases by one stage until the "0" register has a total of twelve stages. Cores 474 and 475 are of square-loop material and have a primary winding 476 and a secondary winding 477 the dots above the coils in FIG. 23 indicating the coils are in phase. If the condition of a core is designated as "one" or "zero" depending upon the direction of saturation, the sense of windings on core 474 is such that a positive pulse applied to winding 476 will set it to the "zero" state while a positive pulse to winding 477 will set core 474 to the "one" state. Similarly, a positive pulse applied to winding 476A of core 475 tends to set core 475 to "zero" whereas a positive pulse to winding 477A tends to set output core 475 to "one." When a core is set to the "zero" state, a positive pulse applied to the secondary winding is inhibited from developing a voltage at the output terminal because the core supports the voltage. A core set to the "one" condition will permit a voltage to appear at the output terminal because the core is already saturated in the same direction as the pulse is tending to drive it and, hence, will support no voltage. If a positive-going signal is introduced, for example at E1–9, pulses 1P and 2P cause this stored pulse to be shifted from the first stage to the second stage and thence to thyratron drivers 501A—501B. With reference to FIG. 4A, it will be noted that if a card is to be moved from reading station 16 to the "8" magazine in block 24, the equivalent of five machine cycles is required to position the card with respect to the "8" magazine. If the card is moving toward intermediate magazines 14, then three machine cycles will be necessary to position the card with respect to the "8" magazine. For this reason, the last two stages of memory 472 provide a fixed delay of two cycles and are cut out when the card moves from right to left by the contacts of relays N5 and N6 which are actuated upon machine reversal. From the schematic representation of memory 472 shown in FIG. 33, it is evident that an input signal to any register must be stepped through a number of cores to provide sufficient delay for the card to reach its respective magazine. In addition memory circuit 472 has a delay of one cycle due to the timing of pulses 1P and 2P. As a result, a maximum delay of three cycles is obtained for movement of cards from right to left and a minimum delay of one cycle upon movement from right to left.

Pulse 2P occurs during the read portion of the cycle and comprises a positive and negative-going pulse, as shown in FIG. 32A. If a signal is present at E1–9, core 474 will switch states and when this occurs a voltage will develop on secondary winding 477 and current would flow through diode 478 and core 475. This forward current in diode 478 is inhibited, however, by the negative portion of pulse 2P. It is for this reason that the input pulse must occur in coincidence with and within the boundaries of the negative portion of pulse 2P. The positive portion of pulse 2P causes the input pulse to be shifted to core 477 and during this pulse core 474 supports voltage so that core 475 does not receive adequate current to cause switching. When the positive portion of 1P occurs, core 475 will not support voltage and the succeeding input core 474 will be reset. The occurrence of the next positive portion of 2P causes the second stage input core to support voltage and the output core does not receive resetting current. With the output core of the second stage in this state, it can offer no opposition to the next positive portion of pulse 1P and causes the original input signal to appear at the first input core of the second last stage or to be applied to its respective thyratron driver circuit 479, as seen in FIG. 34.

Thyratron driver circuit 479 comprises the ten thyratron units 501A–505B, each unit being associated with one of the outputs from memory 472 and banks 5 and 6 of stepping switch G. Stepping switch G, see FIGS. 28 and 28A, is a commercially available item and is similar to stepping switches A1 and A2. Bank 1 provides a ground return for pulser relays P and Q when in the homing or "1" position and for relays B2, K1#5, K and K4 for controlling the functioning of stepping switch G when a block sort is to be made. Banks 3 and 4 are used for the checking portion of magazine selection. Banks 5 and 6 are used for energizing the magazine plunger solenoids 152 and are interconnected for reversal by contacts of relays N1 and N2. Banks 7 and 8 provide a ground return for reinsertion switches 224 and 222, respectively, and bank 9 provides a ground return for relay W3. Only ten thyratron circuits TD501A–505B are needed even though twenty magazines are involved in that reversing relays N1–N7 select the mode of operation. When relay N1 is not energized, solenoid 152 for the "9" magazine in the block is energized and cards are withdrawn from this magazine.

If there is no input to the memory 472, thyratrons 501A–505B cannot be fired and the cards are moved past reading station 16, past intermediate magazines 14 and are inserted in reject magazine 13. Since no thyratron is fired, the solenoid 152 for the "Ø" magazine of intermediate group 14 is not energized even though the contacts of relay N2 are closed. Likewise, even though relay E may be energized, the "Ø" counter coil is not energized. Stepping switch G on position 1 creates the condition whereby the Ø counter coil is selected and either the Ø magazine solenoid 152 for the intermediate side or the "9" magazine solenoid 152 for the block side is selected depending upon the condition of the N reversing relays. When relay N1 is energized, intermediate "Ø" magazine solenoid 152 is energized and cards are extracted from this magazine. Inputs to the thyratron 501A from memory 472 will then fire the tube and the "Ø" counter coil will be energized for input. In this condition relay N2 is also energized and the thyratron firing causes block solenoid 152 for the "Ø" magazine to be energized. This plunger then operates to insert the card into the "Ø" magazine of block 24.

The card counter circuit 480 is used when it is desired to count the number of cards inserted into individual magazines or the total number of cards handled in a sort problem. A counter is associated with each of thyratrons TRD501A–505B. Each counter coil 481 is connected in the cathode circuit of its respective thyratron and is energized when the thyratron is conducting. Capacitor 482 is used to store a charge while the thyratron is non-conducting, the stored charge being applied to its respective coil 481 at the beginning of the conduction period to give a fast pick up of the counter armature. After the initial surge, the charge drops to a value determined by the RC resistance of the circuit which is somewhat lower than the rated operating current of the counter and thereby allows faster flux decay when the coil is de-energized and faster recovery of the armature between strokes. The thyratron is cut off and the coil is deenergized by the opening of the contacts of relay A8 which are connected in series with the common ground return of all counter coils 481, relay A8 being actuated by cam switch P3.

Figure 27:
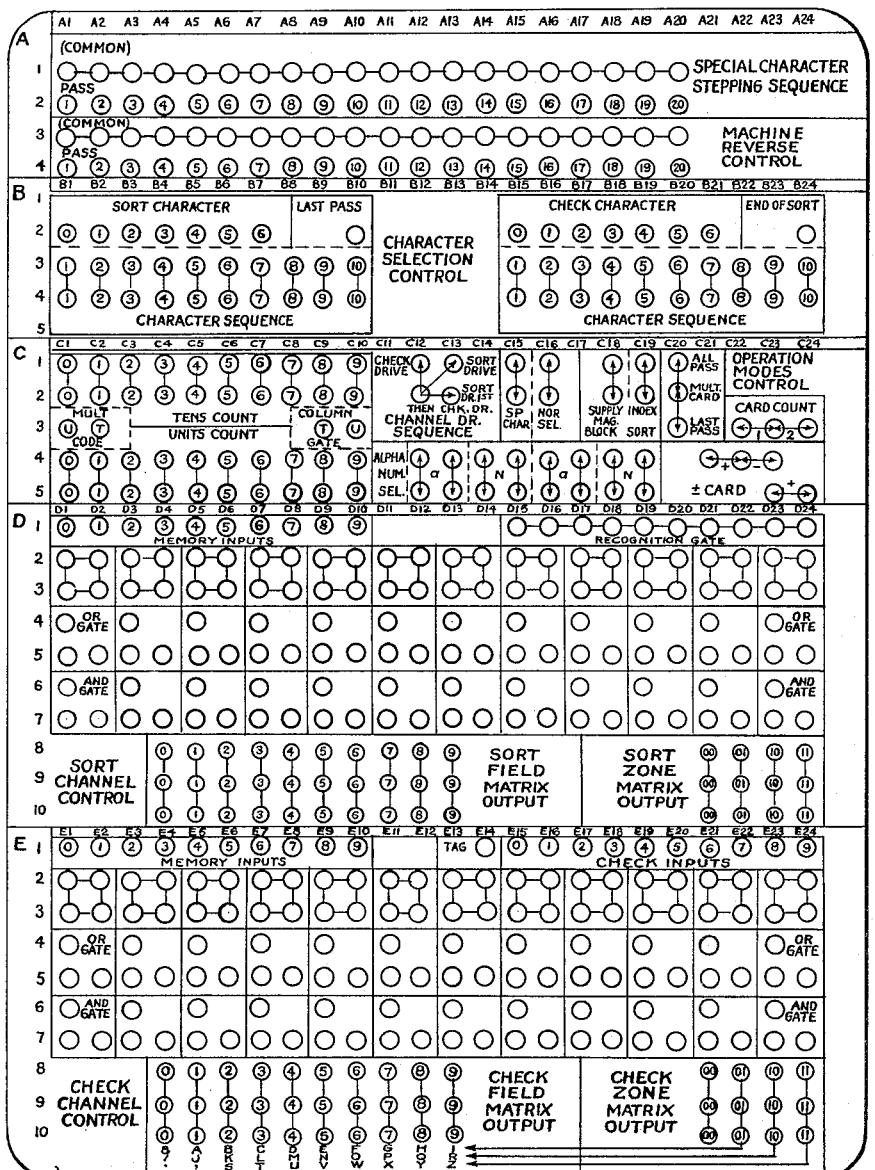
FIG. 27 is a front elevation view of the plugboard.

Plugboard 21, as seen in FIG. 27, is the junction of stepping switches A1, A2 and G, the various control relays, the counters which includes both the card counter circuit 480 and empty magazine counter circuit 436, memory 472, thyratron circuit 479 as well as machine control switches and other circuits which control the operation for a predetermined sort program. Plugboard 21 comprises five principal sections; namely section A in which special character stepping sequence and machine reverse control are plugged, section B which provides for character selection control, section C which provides for the operation mode control, section D in which the sort channel control is plugged and section E for the check channel control.

In section A, A1–1 through A20–1 are used as a common ground return for pulse relays P1 and Q1 which are utilized to control the stepping switch A2. Likewise A1–3 through A20–3 are used as a common ground return for reversing relay N3 which, in turn, operates, reversing relay N1, N2 and N4–N7. As seen in FIG. 31, banks 2 and 3 of switch A2 are connected to A1–4 through A20–4 and to A1–2 through A20–2, respectively.

In section B, B1–3 and –4 through B10–3 and –4 and B15–3 and –4 through B24–3 and –4 are used as ground returns for sort and check character relays D1–D7 and E1–E7, respectively, see FIGS. 30 and 22. B10–2 and B24–2 serve as ground return for last pass relay L and end of sort relay H. These connections are made via banks 1, 2 and 3 of stepping switch A1.

In section C, C1–1 and –2 through C10–1 and –2 receive the ten outputs of the tens decode flip-flops FF203A–FF204B through matrix 387, see FIG. 47. One of these ten outputs should always be plugged to C9–3 which feeds the gated amplifier GA207. C1–4 and –5 through C10–4 and –5 are used to receive the ten outputs from units decode flip-flops FF201A–FF202B through matrix 386. One of these outputs should always be plugged to C10–3 which also feeds GA207. C1–3 and C2–3 are used for multiple card indicator circuit 395 to feed GA600, see FIGS. 47 and 49. C12–4 and C15–4 are used to supply a bias voltage matrices 400 and 401 of the check channel, see FIG. 26. C13–4 and C14–4 are used to supply bias voltage to the zone matrix 402 of the check channel, C12–5 and C13–5 are used to supply a bias, voltage to the zone matrix (C13–4) and the field matrix (C12–4) of the check channel. C14–5 and C15–5 contain the matrix gate pulse to be applied to the zone matrix (C14–4) and the field matrix (C15–4) of the check channel. In a like manner, C16–4, C19–4, C17–4, C18–4, C16–5, C17–5, C18–5 and C19–5 are utilized for the sort channel, see FIG. 24. C12–1, C13–1, C12–2 and C13–2 are associated with tag recognition, C12–1 being used to apply the check channel gate pulse to AND gate 423, C13–1 being used to apply the sort channel gate pulse to AND gate 430, C12–2 having the gating pulse from DA700A applied thereto, and C13–2 being connected to a contact of relay R, as shown in FIG. 29. C15–1 and C16–1 are connected by the former to stepping switch SSA1. C15–2 is connected to a contact of relay P1 and C16–2 is connected to a contact of relay P to provide for an alpha-numeric sort. C18–1 and –2 and C19–1 and –2 provide for a block sort with C18–1 connected to relay B2, C19–1 connected to relays K and K1, C18–2 connected to a contact of relay J2, and C19–2 connected to a contact of relay N3, as shown in FIG. 28. C20–1 through C20–3 are associated with the multiple card indicator circuit 395, C20–1 being connected to ground, C20–2 being connected to a contact of relay M4, and C20–3 being connected to a contact of relay L, as shown in FIG. 57. C22–3 is connected to A1–2 of plugboard 21, C23–3 is connected to relay E and C24–3 is connected to A2–2 of plugboard 21, see FIG. 34. For positive or negative cards C21–4 is connected to left grid returns of FF307A—309B and FF407A—409B, C22–4 is connected to reset No. 1, C23–4 is connected to right grid return of the same flip-flop circuits, C23–5 is connected to one side of the polar relay and C24–5 is connected to the 90 volt source, see FIGS. 23 and 25.

Section D of plugboard 21 has D1–1 through D10–1 connected to the E1–1 through E1–10 of section E which are, in turn, connected to memory 472. D15–1 through D24–1 are interconnected and provide a common output at D15–1, see FIG. 24, for the recognition gate output. D1–2 and –3 and D2–2 and –3 through D23–2 and –3 and D24–2 and –3 are multiple points for the purpose of placing AND gates 311, 312 and OR gates 313, 314 into the circuit for the sort channel. D1–4, D1–5 and D2–5 through D23–4, D23–5 and D24–5 are the connection points for OR gates 313, 314 and D1–6, D1–7 and D2–7 through D23–6, D23–7 and D24–7 are the connection points for AND gates 311 and 312. D4–8, –9 and –10 through D13–8, –9 and –10 contain the ten used outputs of the field decode matrices 300—303 of the sort channel. D21–8 –9 and –10 through 24–8, –9 and –10 contain the four outputs (00, 01, 10, 11) of the zone decode matrix 302 of the sort channel.

Section E of plugboard 21 has E14–1 connected to relay R for tag recognition on first pass only and E15–1 through E24–1 are connected to bank 3 of stepping switch G, see FIG. 28. E1–2 and –3 and E2–2 and –3 through E23–2 and –3 and E24–2 and –3 are multiplied points for placing AND gates 411 and 412 and OR gates 413 and 414 into the circuits for the check channel. E1–4, E1–5 and E2–5 through E23–4, E23–5 and E24–5 are connection points for OR gates 413 and 414 and E1–6, E1–7 and E2–7 through E23–6, E23–7 and E24–7 are connection points for AND gates 411 and 412. E4–8, –9 and –10 through E13–8, –9 and –10 contain the ten outputs of field decode matrices 400—403 of the check channel and E21–8, –9 and –10 through E24–8, –9 and –10 contains the four outputs (00, 01, 10, 11) of the zone decode matrix 402 of the check channel.

For all numerical fine and block sorting and for one pass per character alpha-numerical sorting plug C14–4 to C14–5, C15–4 to C15–5, C18–4 to C18–5 and C19–4 to C19–5. By this plugging the matrix gate pulse from CF702A and B is connected to the sort channel field and zone matrices 300—303 and from CF702C and D is connected to check channel field and zone matrices 400—403. For two passes per character alpha-numerical sorting, plug C12–4 to C12–5, C13–4 to C13–5, C16–4 to C16–5 and C17–4 to C17–5. By this plugging the +45 volt potential is applied to the sort channel matrices 300—303 and to the check channel matrices 400—403.

For sort and check channel sequencing and tag recognition C12–1 is plugged to C12–2 to directly gate the check channel by the matrix gate output pulse derived from DA700A. The tag is checked on the first pass and the sort channel checked on all other passes. The sort channel is gated only when the check is correct for each card. The sort channel is always directly gated even though the check feature or the check channel is not used by plugging C12–2 to C13–1. By plugging C12–2 to C13–2 the sort channel is directly gated on the first pass with the tag check omitted and the check channel is directly gated on all other passes to drive the sort channel. C16–1 is plugged to C16–2 for all sorting operations except an alpha-numerical sort requiring two passes per character and for which the check feature is omitted, i.e., only the sort channel is used or the check channel is used for sorting, this plugging connecting relay P to selector stepping switch SSA1. For an alpha-numerical sort C15–1 is plugged to C15–2 which connects relay P1 to SSA1. For a block filing sort C18–1 is plugged to C18–2 which selects supply magazine 15 for initial card feeding with card movement from right to left by means of relay B2. C19–1 to C19–2 enables relays K and K1 through relay N3 for automatic block indexing, these connections being omitted for all other sorting operations. To count the number of cards inserted into each receive magazine plug C23–3 to C22–3 for the first pass only and C23–3 to C24–3 for second pass only. When positive cards are being sorted, C22–4 is plugged to C21–4 which applies the reset #1 pulse to the left grid return of the decode flip-flops FF307A–309B and FF407A—409B and C23–5 is plugged to C24–5 to apply the +90 v. to the polar relay. For negative cards C22–4 is plugged to C23–4 which applies the reset #1 pulse to right grid return of the same flip-flops. To enable the multiple card indicator 395 on the last pass of a fine sort, plug C20–2 to C20–3 and on all passes plug C20–1 to C20–2, thereby providing a connection between contacts of relay M4 and relay L and connecting the contact of relay M4 to ground, respectively.

The direction of belt movement for each pass is determined by section A of plugboard 21. A pass can be defined as the movement of all cards from one side of the machine to the other and past the reading station. The machine is made to start with a pass from left to right or right to left, the direction of the pass being alternated thereafter. If the pass is to start from right to left then A2–4 is plugged to A2–3, A4–4 to A4–3, A6–4 to A6–3, etc., and if the pass is to start left to right then A1–4 is plugged to A1–3, A3–4 to A3–3, A5–4 to A5–3, etc. On any specific program it is necessary to plug in only the specific number of passes required. A block sort always starts right to left, i.e. from supply magazine 15 to intermediate magazines 14 on the first pass. Numerical fine sorting normally will start left to right but can start either way. An alpha-numerical fine sort must normally start from right to left. Section A has a second function for use in making an alpha-numerical sort requiring two passes per character and for which the check feature is not used. In this case the character selection is changed only after every second pass, C15–1 being plugged to C15–2 with C16–1 and C16–2 being omitted. The following plugs must also be made: for the first and second passes, none; for the third pass A3–2 to A3–1; for the fourth pass, none; for the fifth pass A5–2 to A5–1; for the sixth pass, none; for the seventh pass A7–2 to A7–1, etc. By this plugging of section A, character selection is stepped at the beginning of each plugged pass.

Section B of the plugboard 21 is used to select the character to be read on each pass of the sort to a maximum of seven characters if the entire column is involved. Ordinarily, seven passes can be made, i.e. one for each character in which case C16–1 is plugged to C16–2. However, with C15–1 plugged to C15–2, as described above for an alpha-numerical sort in which the check feature is omitted, fourteen passes will be made, i.e. two passes for each of the seven characters. For each pass the pass outlet (B1–4 or B1–3 through B10–4 or B10–3) must be plugged to the terminal representing the character to be read. For a block sort only two passes are required, whereas for a numeric fine sort up to seven passes may be required for a complete sort on one column. Following the last sort pass on a fine sort, B10–2 must be plugged to the next successive outlet which serves to collect all cards in the "3" magazine on the next pass.

For an alpha-numerical sort using two passes per character and also using the check feature, the character selection must be plugged for each individual pass. Hence, in this case each character will be plugged to two pass outlets. Under this condition, the present plugboard can be arranged for a maximum of eight passes for four characters and a second plugboard must be arranged for sorting the remaining three characters in the column.

The check channel is arranged similarly to the sort channel and is plugged in much the same manner for the various types of sort problems. During a card pass, each magazine on the receiving side is filled with cards having a specific value of the character being sorted. On the next pass, when the cards are withdrawn from these magazines, each card can be read to see if it belonged in that magazine. Hence, the check channel, when used for checking, reads the same character which the sort channel read on the previous pass. The check channel can be by-passed by plugging C12–2 to C13–1 and can be used to read the tag character by plugging C12–2 to C12–1. Plugging C12–2 to C12–1 also permits the check channel to be used for sorting on all passes. In an alpha-numerical sort requiring two passes per character and for which the check feature is required, each character is read in part. The check channel will read that part of the character which was sorted on during this sequence. The zone portion of the character is always read by the sort channel with the cards moving right to left.

Sections D and E contain the decode matrix outputs for sort and check channels, respectively. For the sort channel, the OR gates are used only when more than one matrix output is to go into the same magazine. The AND gates are to be used only when an alpha-numerical sort is required using one pass per character. Each alphabetical character is decoded by combining one field output and one zone output. In an alpha-numerical sort of two passes per character and with card movement from right to left the zone outputs are gated and with card movement from left to right the field outputs are gated. This is accomplished automatically with the plugging described hereinbefore and for the memory input, a field output must be OR gated with a zone output. The tag recognition output is used for a special case of a two character sort on one pass only. A specific alpha-numerical symbol output, if plugged into this terminal will drive the check channel which is then plugged to look at a second character and route the card according to this character thereby necessitating the plugging of C12–2 to C13–1. In section E, the check field and zone matrix outputs are plugged to the check inputs, when using the check feature, in exactly the same manner as the sort decode matrix outputs are plugged to the memory inputs. The check feature of the field or zone portion of a character is always made on the next pass. The check feature functions only after the first pass, unless a tag character check is made which can only be done on the first pass. If on the first pass the tag character is to be checked, the appropriate code matrix is plugged into E14–1 (tag recognition).

If it is assumed that a numerical fine sort is to be made with respect to the #5 character in the fifth column of negative cards using the sort channel for sorting, then the following connections must be made in plugboard 21. In section A, A1–3 is plugged to A1–4 for the first pass and the card movement will be from left to right. Accordingly, the cards to be sorted are placed in any one of the intermediate magazines 14. Since the machine is not plugged to automatically stop after the first pass, the problem requires two passes. On the first pass of the cards past reading station 16, #5 character is to be read as determined by plugging B1–3 to B6–2. This connection energizes sort channel character selector relay D5. The second pass (right to left) is the last or collect pass so that B2–3 is plugged to B10–2, which energizes relay L, and all cards are collected in the #9 magazine of intermediate magazines 14. At the beginning of the third pass the machine will automatically stop due to energization of relay H by plugging B17–3 to B24–2. Since the sort is on the #5 character in the fifth column, the tens counter is plugged to zero by plugging C1–1 to C9–3 and the units counter is plugged to 5 by C6–4 to C10–3. Since no checking is to be used, the sort channel is gated directly for sorting by connecting C12–2 to C13–1. For a numerical sort, the sort will be concerned only with the field portion of the character so that the following connection must be made: C14–4 to C14–5, C15–4 to C15–5, C18–4 to C18–5 and C19–4 to C19–5. The problem is of the numerical fine sort type (one pass per character) and C16–1 is plugged to C16–2. For negative cards C22–4 is plugged to C23–4. Since all reading is to take place in the sort channel, all "0" cards read will be inserted in the "0" magazine on the block side, all "1" cards will be inserted in the "1" magazine of the block, etc., as determined by plugging D1–1 to D4–8, D2–1 to D5–8, etc.

If it is now assumed that a numerical fine sort is to be made with respect to the same character in the same column but the check channel is to be used for sorting, then plugboard 21 will have to be plugged as follows: A2–3 is plugged to A2–4 and because A1–3 is not plugged to A1–4 for the first pass, card movement will be from right to left and the cards to be sorted must be placed in any one of the magazines on the block side and which are over belt 50. Two passes will be required, as in the previous example, the first being a sort pass and the second a collect pass. The first pass of the cards past reading station 16 will result in reading the #5 character by plugging B15–3 to B20–2 which energizes relay E5 of the character selector relays. The second pass is the last or collect pass, as determined by plugging B2–3 to B10–2 which results in relay L being energized and all cards being collected in the "9" magazine on the block side positioned over belt 50. Plugging B17–3 to B24–2 results in relay H becoming energized at the beginning of the third pass to automatically stop the machine after two complete passes. Since the check channel is to be gated directly for sorting and no checking is to be used, C12–2 is plugged to C12–1. The other connections in section C will be the same as those described in conjunction with the previous problem. No connections are made in section D inasmuch as all reading is to take place in the check channel. By plugging E1–1 to E4–8, E2–1 to E5–8, E3–1 to E6–8, etc., all "0" cards will be inserted in the "0" magazine of the intermediate group 14, all "1" cards will be inserted in the "1" magazine, etc. for all magazines in the group 14.

Let it now be assumed that a numerical fine sort is to be made with respect to the same character in the same column using the sort channel and tag character (S) checking using the check channel. A1–3 and A1–4 will be plugged to provide card movement from right to left and the cards can be placed in any block magazine positioned over transport belt 50. As in the previous examples, two passes (sort pass and collect pass) will be made. On the first pass, the sort will be on the #5 character (B1–3 to B6–2) and the check on the #0 character (B15–3 to B15–2). The second pass is the last pass (B2–3 to B10–2) and the machine will automatically stop at the beginning of the third pass (B17–3 to B24–2). The connections in section C are identical to those for the immediately previous problem. The sort channel will be used for normal selection of all cards containing numbers 0 through 9 and distribute them accordingly into intermediate magazines 0 through 9 on the first pass, as determined by the pluggings D1–1 to D4–8, D2–1 to D5–8, D3–1 to D6–8, etc. The tag character is S and the check channel is used to read this tag, as determined by plugging E6–8 to E1–7 and E24–8 to E2–7, which combines the zone and field signals in one of AND gates 411 and which is distributed to the sort channel by plugging E1–6 to E14–1 for the tag feature. The #5 character will not be read until the tag character S produces the necessary gating signal and if not generated correctly, the card will proceed to the reject magazine.

If a numerical fine block sort is to be made with respect to the #1 and #2 characters in the seventh column using the check feature, then the cards must move on the first pass from right to left (A2–4 to A2–3), the cards being placed in supply magazine 15. In section B, B2–2 is plugged to B1–3 for the #1 character and B3–2 is plugged to B2–3 for the #2 character in the sort channel for character selection. In addition, the check feature is utilized on the second pass with respect to the #1 character so that B16–2 is plugged to B16–3 and B17–3 is plugged to B24–2 to stop the machine with the third pass. To select column seven, the tens counter is plugged for zero, C9–3 to C1–1 and the units counter is plugged for a count of seven by C10–3 to C8–4. The sort channel drive is desired on the first pass, since no checking feature is being used and then check channel drive on all other passes which requires C12–2 being connected to C13–2. To energize the plunger assembly associated with supply magazine 15, C18–1 is plugged to C18–2 and for obtaining automatic indexing of the block magazines C19–1 is plugged to C19–2. Since only a numeric sort is to be made with negative cards, the following connections are made as in the previous example: C16–1 to C16–2, C14–4 to C14–5, C15–4 to C15–5, C18–4 to C18–5, C19–4 to C19–5, and C22–4 to C23–4. Normal sort channel distribution will exist with the sort field matrix output connected to the memory input in normal order, i.e., D1–1 to D4–8, D2–1 to D5–8, etc. The check channel drive is used on the second pass only so that the characters "0" through "9" are plugged directly to the check channel inputs 0 through 9, i.e. E4–8 to E15–1, E5–8 to E16–1, etc.

The following description relates to the logical sequence of actuation of the various elements to make a block sort as described above in connection with the plugging of plugboard 21. It should be pointed out, however, that reference should also be made to each of the circuits described hereinabove for a detailed description thereof which will not be included hereinbelow. Let it be assumed that a group of cards 0–99 are to be block sorted and such cards are arranged in random order and positioned in supply magazine 15. The first pass from the supply magazine 15 to the group of intermediate magazines 14 will be based on the most significant character (#1 character) which, in this case, will be the tens character of each card (9 in 97). Accordingly, with the first pass the cards with a 0 in the #1 character position will be inserted in random order into the #0 magazine of the intermediate group. The cards having a 1 in the tens position will be arranged in random order in the #1 magazine of the intermediate group and this procedure will be continued until all of the cards are distributed in the #0–#9 magazines of the intermediate group 14. The cards will then be withdrawn from the intermediate group 14 starting with the #0 magazine and will be distributed into the magazines comprising block 24. With this pass from group 14 to block 24, the cards in the #0 magazine of the group 14 will be sorted according to the least significant character (#2 character—7 in 97) into the first row of the magazines in block 24. As presented above in connection with the plugboard 21, the characters on which the sort is to be based are located in column 7 of each card. To accomplish this sort, therefore, the following operations and circuit actions take place.

With the magazines of the intermediate group 14 and the block 24 in proper position, switches 499 and 500 in FIG. 57 will be closed. The plugboard 21 will be inserted and the operator will then actuate reset switch 465 to place the various circuits in phase relationship. As shown in FIG. 58, the actuation of switch 465 results in relays J1 and J2 being energized which, in turn, causes relay B2 in FIG. 28 to be energized, thereby causing stepping switch G to be energized for placing it in the #11 position whereby the plunger solenoid for supply magazine 15 is placed in the circuit for removal of the cards from this magazine and positioning them on the belt 50. With the stepping of switch G to its proper position, relays P and Q are also energized. The belt start switch 442 is then closed and relays S2 and S1#2 are energized, at which time relays J1 and J2, as well as relay B2, are cut out due to the opening of the contact S1#1. Relay S1#1 is energized due to closing the contact of relay W which is energized through the relay K1304 which is cut in with the energization of relay S1#2. S1#1 also results in the belt clutch relay 498 being energized to start intermittent movement of belt 50 by Geneva 34.

The supply plunger solenoid is connected to ground through switch 253 in FIG. 28 and with each closure of contacts A8 a card is withdrawn from the supply magazine 15 and deposited on belt 50. The cards are moved into and out of reading station 16 and during each stationary period of belt 50, the card in reading station 16 is scanned for successively projecting each row of 42 bits of information onto the cell array 89. As described above, the signals derived from each row of 42 bits is applied to amplifiers 255 and the timing mark signal is applied to the TM sync circuit 257. On the first pass (right to left) relay D2 permits only the signals derived from the #1 character to be transmitted to AND gate 310 and only the signals derived from the #1 character in the seventh column will be passed by AND gate 310 upon coincidence of these signals with the TM sync signal input gate pulse from DA700C, FIG. 29, which is derived from the column counter, FIG. 47. The signals passed into matrices 300 and 301, FIG. 24, are passed to the memory register, FIG. 33, under control of pulses 1P and 2P.

When a card is in registry with its proper magazine in group 14, the signal released from the memory circuit causes the respective thyratron driver to be rendered conducting, FIG. 34. At the same time relay E is energized to close its contact so as to register a count for a card being entered into the respective magazine. The signal from the memory is also transmitted to the respective magazine plunger solenoid via bank 6 of stepping switch G to actuate the plunger for inserting the card into the magazine.

The procedure outlined above is repeated with each card until all the cards have been removed from supply magazine 15 and inserted in the proper magazine of group 14. At the time the last card to be withdrawn from magazine 15 is moved out of reading station 16, the signals derived from the timing marks are no longer received and the column counter, FIG. 47, supplies a signal to reset the empty magazine counter, FIG. 48, which is then actuated by the periodic pulses derived from relay A7, FIG. 35, to provide a count of "23" which permits this last card to be inserted into its respective magazine. The "23" count energizes relay M1 and hence, stepping switch G, FIG. 28.

With the energization of relay M1, switch G is moved to the #1 position and bank 1 places relay P to ground through its arm and relay P causes energization of stepping switch SSA2, FIG. 31, and advancement of this switch to the next position. With each energization of relay P, Q is then energized and cuts out relay P. When stepping switch SSA2 is advanced to the next position, it results in energization of relay N3 through the plugboard connection A2–3 to A2–4. Relay N3 causes energization of relay 497 which results in the belt motor being reversed and in energization of relay N1 which causes transfer of magazine solenoids 152 in banks 5 and 6; of relay N2 which also causes reversal of the magazine solenoids 152; of relay N4 which results in energization of relays K1303 and W; of relays N5 and N6 in the memory register circuit; and of relay N7 which controls the vacuum solenoid and, hence, application of the vacuum to the group of plungers under intermediate magazines 14 as well as switching actuation of the full hopper cells 439. Relay N3 remains energized until stepping switch SSA2 is again pulsed and also conditions the circuits for relays K1, K, and K4 for indexing the block 24. Since relay M1 is de-energized before relay N3 is energized, completion of the pass from right to left has no effect on relays K, K1, and K4, but this relay circuit is maintained in condition by relay N3.

As described above the cards are withdrawn first from #0 magazine, then the #1 magazine and so forth, the cards being placed on belt 50 and moved from left to right through the reading station 16. The sort is now made on the basis of the #2 character in column 7 and at this time both relays D3 and E2 are energized. The sort is based on the #2 character and the check is made with respect to the #1 character. The cards in the #0 magazine will be distributed in the ten magazines of the first row in block 24. When the last card in #0 magazine has passed through reading station 16, a count of "23" will again be obtained from A7 and with this count relay M1 will be energized. Stepping switch G will be energized to position it for feeding the cards from the #1 magazine and since relay N3 is still energized a circuit to ground is provided with energization of relay M1 for relays K1 and K. Relays K and K1 are first energized, the circuit to ground being maintained by the contact of K1 upon de-energization of relay M1. Relay K results in solenoid 250 being energized to index the block 24 for movement in a forward direction to position the next row of magazines in block 24 over belt 50. With the forward movement of block 24, the arm of switch 253 is transferred to its other contact so as to energize relay K4 and remove the ground connection to the plunger solenoids 152, thereby preventing any actuation of the plungers. With energization of relay K4 relays K1 and K are dropped out, relay K2 is energized but has no effect since the movement of the block is in a forward direction, and switch 253 is maintained until movement of block 24 is arrested by the armature of the solenoid 250 engaging its respective cam 248. At this time, switch 253 will be transferred to its other contact to again place the plunger solenoids to ground so as to commence feeding of the cards from the #1 magazine onto belt 50 for movement through the reading station and into the proper magazine in block 24. This advancement or indexing of the block 15 occurs after the last card has been removed from each of the magazines in the intermediate group for movement towards the block. When the last card has been removed from the #9 magazine and moved past the reading station 16, the initial movement of the block is toward the front due to energization of relays K1 and K; however, a complete index is not obtained because the block engages and closes switch 219, relay K4 being energized with movement of the block and switch 253 again transferring its contact. Switch 219, in FIG. 58, causes energization of relay K3, which, in turn, causes reversal of the block motor 231 so as to move the block 24 rearwardly until it contacts switch 216 and actuates it to an open position, thereby cutting out relay K3. During the forward and then rearward movement of block 24, switch 253 maintains K4 energized, which, in turn, maintains solenoid K2 energized so movement of the block is not arrested by the armature of solenoid 249 until switch 216 is opened. When relay K3 is cut out by switch 216 being opened and the armature of solenoid 249 engages its cam 247, the block will be positioned with the first row of magazines again arranged over belt 50. With the last "23" count signal, relay H is connected to ground, FIG. 30, and this results in cutting out relays S1#2 and S1#1 to release the belt clutch 498 thereby stopping the machine. At this time the cards will then be arranged in block 24 with one card in each of the 100 magazines comprising the block, cards 0–9 being in the first row, 10–19 in the second row, etc. Since the drive for the belt 50 is independent of the drive for block 24, the belt movement can be stopped even though the block has not yet returned to a position for actuating switch 216.

For an alpha-numerical fine sort to be made with respect to #3, #2 and #1 characters in the seventh column using the check channel, seven passes of the cards must be made, card movement for the first pass being left to right with the cards in any one of the intermediate magazines 14. This requires the plugging of A1–3 to A1–4, A3–3 to A3–4 and A5–3 to A5–4. For the order of characters noted above two passes are required for each character, the first on the basis of field and the second on the basis of zone for each character, with the last pass collecting all cards in the "9" magazine of the block and then automatic stoppage of the machine. Character selection control will then be plugged by the following connections for the sort channel: B1–3 to B2–4, B2–3 to B4–2, B3–3 to B4–4, B4–3 to B3–2, B5–3 to B6–4, B6–3 to B2–2 and for the last pass B7–3 to B10–2; and for the check channel B16–3 to B17–4, B17–3 to B18–4, B18–3 to B19–4, B19–3 to B17–2, B20–3 to B21–4 and B21–3 to B16–2, and for the end of sort B22–3 to B24–2. With these connections, the sort and check channels drive as follows:

| Pass | Sort Channel | Check Channel |
| --- | --- | --- |
| 1. L to R | #3 Character (field) | None. |
| 2. R to L | #3 Character (zone) | #3 Character (field). |
| 3. L to R | #2 Character (field) | #3 Character (zone). |
| 4. R to L | #2 Character (zone) | #2 Character (field). |
| 5. L to R | #1 Character (field) | #2 Character (zone). |
| 6. R to L | #1 Character (zone) | #1 Character (field). |
| 7. L to R | last pass to block magazines | |

The tens and units counters are plugged the same as in the previous example for the seventh column. With no check on the first pass but having the checking feature on subsequent passes, C12–2 is plugged to C13–2. Since the problem is an alpha-numerical sort (two passes per character) C12–4 is connected to C12–5, C13–4 to C13–5, C16–4 to C16–5 and C17–4 to C17–5. C16–1 to C16–2 and C22–4 to C23–4 are connected as in the previous problems for normal selection and negative cards. OR gates in section D combine field and zone bits to place both alpha and numeric characters in the same magazine in the left to right passes based on the field and to place the numeric characters in the "6" magazine and the alpha characters in the "7," "8," and "9" magazines in the right to left passes in the order shown in the table above numeric characters are plugged directly on the left to right passes the sort field matrix output is active and the sort zone matrix output is inactive, whereas on the third and fifth passes, the check field matrix output is inactive and the check zone matrix output is active. On the passes from right to left the outputs from the sort channel control and the check channel control are active in the opposite respect. In the example being described by plugging D1–1 through D6–1 to D4–8 through D9–8, respectively, all the numeric and alpha characters having a field corresponding to the "0," the "0" through "5" characters will be distributed into the same number magazines, respectively, in the left to right passes. In the left to right passes numeric and alpha characters having fields corresponding to the 6, 7, 8 and 9 characters will then be distributed to the remaining magazines. If the selected OR gates correspond to the numerals 6, 7, 8, and 9, then the following connections through the OR gates must be made: D10–8 to D9–5, D21–8 to D10–5 and D9–4 to D7–1 for placing numeral 6 or letter F, O or W in the "6" magazine; D11–8 to D11–5, D22–8 to D12–5, and D11–4 to D8–1 for placing numeral 7 or letter G, P or X in the "7" magazine; D12–8 to D13–5, D23–8 to D14–5, and D13–4 to D9–1 for placing numeral 8 or letter H, Q or Y in the "8" magazine; and D13–8 to D15–5, D24–8 to D16–5, and D15–4 to D10–1 for placing the numeral 9 or letter I, R or Z in the "9" magazine in the left to right passes based on the field. It is to be understood, of course, that the selection of OR gates, field and zone, and magazines has been made arbitrarily and any combination can be selected. The check channel drive is used on all passes except the first and for the alpha-numerical selection chosen for the sort channel the following connection must be made for placing the same characters into the check inputs, the OR gates combining field and zone bits as in the sort channel: E4–8 through E9–8 to E15–1 through E20–1, respectively for numerals 0–5 in the letters having fields corresponding thereto; E10–8 to E17–5, E21–8 to E18–5 and E17–4 to E21–1 for numeral 6 or letter F, O or W; E11–8 to E19–5, E22–8 to E20–5 and E19–4 to E22–1 for numeral 7 or letter G, P or X; E12–8 to E21–5, E23–8 to E22–5 and E21–4 to E23–1 for numeral 8 or letter H, A or Y; and E13–8 to E23–5, E24–8 to E24–5, and E23–4 to E24–1 for numeral 9 and letter I, R or Z.

With reference to FIG. 58, the various motors and control relays are shown schematically herein. Numerals 485 and 486 designate conventional circuit breakers for the voltage supply and motor circuits, respectively. 487 designates a conventional power pack for providing several 6.3 v. sources for the heater elements of the various tubes in the sorter circuitry. Relays V1 and V2 are energized with the manual closing of switch S1403 to close their respective contacts in the output leads of the +250 v. power supplies 488 and 489, in the output lead of the −150 v. bias power supply 490 and in the output lead of the +90 v. relay power supply 491 for providing the necessary voltages to the various sorter circuits, the power supplies being conventional and commercially available items. The intensity of lamp 83 can be varied by variable inductor 492 and is energized with the closure of the contact of relay S1#1 in its circuit, relay S1#1 being energized with the energization of relays S1#2 and W by closure of start switch 442, see FIG. 57. Numeral 493 indicates the high and low vacuum motors and vacuum control solenoid 172 controls the application of the high vacuum to plunger assemblies 140 by means of the contact of relay N7 in its circuit, the high vacuum being normally applied to the plunger assemblies of the intermediate magazines 14 with the contact of relay N7 closed. Block motor 231 is reversed by the contacts of relay K3 which is energized by closure of switch 219 when the block is in its forward position and is deenergized by the opening of switch 216 in its fully rearward position. The block assembly can be manipulated manually by switches 494 and 495, if for any reason manual manipulation is necessary. Belt motor 496 normally drives the belt left to right and is reversed by relay 497 in the circuit of said motor by the contact of relay N3. The magnetic clutch 498 which connects motor 496 to Geneva 34 is energized by the closure of the contact of relay S1#1 which is energized by closure of start switch 442, as described above.

With reference to FIG. 57, reject magazine switch 499 and intermediate magazine switch 500 are normally closed provided these magazines are properly positioned with respect to belt 50. Upon closure of switch 442, relays S2 and S1#2 are energized, with relay S1#2 being held in by the various contacts in series with switches 499 and 500 and being deenergized at any time by manually-actuated switch 501. Relay S1#2 pulls in relay K1304, see FIG. 58, which in turn pulls in relays X and W, both relays being held in by the common contact of relay K1304. With the energization of relays S1#2 and W, relay S1#1 is energized which energizes clutch 498 to start intermittent movement of belt 50 by Geneva 34, rotation of shaft 59 and oscillatory movement of shaft 56, as well as energizing relay 502 which applies the polarizing voltage to cell array 89. Relay S1#2 by means of its contact in the circuit of relay T2 conditions relay T2 for energization by TD506, upon receipt of a signal indicating a full magazine to stop card feeding. When it is desired, however, to feed a few cards to complete a pass relay T2 can be deenergized by operating override switch 503.

The various relays disclosed in FIG. 28 are associated with stepping switch G. Relay B2 is connected and utilized only for a block fine sort problem and during indexing of the block, switch 253 breaks the ground connection to all of solenoids 152. Relay N1, N2 and N4–N7 are energized only upon energization of relay N3 which occurs when card movement changes from left to right and relay K1303 is then energized to hold in relays X and W.

Inasmuch as each sort problem presents a different combination of the various functions of the sorter herein described, as evidenced by the above examples, it is believed that the individual circuits and mechanical elements have been sufficiently described so that anyone skilled in the art can readily comprehend the operation of the machine. To attempt to describe the operation of each relay, switch, tube circuit, etc. as well as the cooperation therewith of the mechanical element would necessitate repetition of most of the description already set forth but in a different manner, i.e., from the function of each element rather than with respect to groups of elements as an assembly or circuit as already described above. Since various modifications of the illustrated embodiment of the invention will be apparent to those skilled in the art, the invention is not to be limited to the disclosure but is of a scope as defined by the appended claims.

Having now particularly described our invention, what we desire to secure by Letters Patent of the United States and what we claim is:

1. A device for sorting a plurality of elements having code arranged thereon in a number of rows and columns and a control mark associated with each column of code, the code of each column being representative of at least two characters and the code of each character comprising a first code portion common to numerical and alphabetical characters and a second code portion to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark, associated with each of said code columns, means including an endless conveyor provided with a plurality of apertures and arranged below said groups of magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means including means for imparting intermittent motion to said conveyor, means for imparting reciprocatory motion to said transfer means and means for imparting rotary motion to said pulse generating means, means for operatively connecting said transfer means in said one group of magazines to said reciprocatory means in a predetermined order to withdraw the elements individually from the respective magazine and position each element on said conveyor over the aligned aperture, when said conveyor is stationary, a plurality of relays equivalent in number to the characters in a column and individually and selectively actuatable for permitting transmission of only the digital signals corresponding to the sortation character, plugboard means for establishing the sortation column and sortation character position in the sortation column for each movement of the elements past said scanning means, the direction of movement of said transporting means and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count and to one of said cyclic pulses for resetting of said counter means to a zero state, means responsive to said counter output pulse and the synchronizing pulse derived from the sortation column for generating two gating pulses, a sort channel including circuit means responsive concurrently to the digital signals of the sortation character and one of said gating pulses for decoding said digital signals, a first matrix network responsive concurrently to said decoded digital signals of the first code portion and the other of said gating pulses for converting said decoded digital signals to an electrical signal, a second matrix network responsive concurrently to said decoded digital signals of the second code portion and the other of said gating pulses for converting said decoded digital signals to an electrical signal, and circuit means for combining the electrical signals derived from each of said code portions for providing an output pulse on a sort channel line corresponding to the magazine and the sortation characters receivable by that magazine, memory means including a plurality of registers equivalent in number to the magazines comprising a group, each register being associated with one of said magazines and connected to its respective sort channel line for receiving and storing said electrical signals and providing an output pulse in timed relation and coincident with positioning of the element corresponding to the stored electrical signal with respect to the respective magazine, and means responsive to said last-mentioned output pulse for connecting the transfer means of said second group and associated with said respective magazine to said reciprocatory means to move the element from said conveyor and into said magazine.

2. A device for sorting a plurality of elements having code arranged thereon in a number of rows and columns and a control mark associated with each column of code, the code of each column being representative of at least two characters and the code of each character comprising a first code portion common to numerical and alphabetical characters and a second code portion to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark associated with each of said code columns, means including an endless conveyor provided with a plurality of apertures and arranged below said groups of magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means including means for imparting intermittent motion to said conveyor, means for imparting reciprocatory motion to said transfer means and means for imparting rotary motion to said pulse generating means, means for operatively connecting said transfer means in said one group of magazines to said reciprocatory means in a predetermined order to withdraw the elements individually from the respective magazine and position each element on said conveyor over the aligned aperture, a plurality of relays equivalent in number to the characters in a column and individually and selectively actuatable for permitting transmission of only the digital signals corresponding to the sortation character, plugboard means for establishing the sortation column and sortation character position in the sortation column for each movement of the elements past said scanning means, the direction of movement of said transporting means and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count and to one of said cyclic pulses for resetting to a zero state, means responsive to said counter output pulse and the synchronizing pulse derived from the sortation column for generating two gating pulses, a sort channel including circuit means responsive concurrently to the digital signals of the sortation character and one of said gating pulses for decoding said digital signals, a first matrix network responsive concurrently to said decoded digital signals of the first code portion and the other of said gating pulses for converting said decoded digital signals to an electrical signal, a second matrix network responsive concurrently to said decoded digital signals of the second code portion and the other of said gating pulses for converting said decoded digital signals to an electrical signal, and circuit means for combining the electrical signals derived from each of said code portions for providing an output pulse on a sort channel line corresponding to the magazine and the sortation character receivable by the magazine, memory means including a plurality of registers equivalent in number to the magazines comprising a group, each register being associated with one of said magazines and connected to its respective sort channel line for receiving and storing said electrical signals and providing an output pulse in timed relation and coincident with positioning of the element corresponding to the stored electrical signal with respect to the respective magazine, means responsive to said last-mentioned output pulse for connecting the transfer means of said second group and associated with said respective magazine to said reciprocatory means to move the element from said conveyor and into said magazine, means actuated in response to the absence of an element with respect to said scanning means, after a predetermined interval, for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

3. A device for providing a numeric sortation of a plurality of elements having code arranged thereon in a number of rows and columns and a control mark associated with each column of code, each code column being representative of at least two characters with each character represented by a six bit binary code including a field portion designated by the four least significant bits and common to numerical and alphabetical characters and a zone portion designated by the two most significant bits to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark, associated with each of said code columns means including an endless conveyor provided with a plurality of apertures spaced in accordance with the spacing of said magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means including means for imparting intermittent motion to said conveyor, means for imparting reciprocating motion to said transfer means, and means for imparting rotary motion to said pulse generating means, means for operatively connecting said transfer means in said one group of magazines to said reciprocating means in a predetermined order to withdraw the elements individually from the respective magazine and position each element on said conveyor over the aligned aperture, a plurality of sortation relays equivalent in number to the characters in a column and individually and selectively actuatable for permitting transmission of only the digital signals corresponding to the sortation character, a plurality of checking relays equivalent in number to the characters in a column and individually and selectively actuatable for permitting transmission of only the digital signals corresponding to the check character, plugboard means for establishing the sortation column and sortation and check character positions in the sortation column for each pass of said elements past said scanning means, the direction of movement of said transporting means, and the function of said transfer means with respect to each group of magazines, synchronizing means responsive to each of said control mark signals for deriving a series of synchronizing pulses therefrom, a counter means preset to a count corresponding to the sortation column and responsive to said synchronizing pulses for providing an output pluse upon reaching said count and reset by one of said cyclic pulses to a zero state, a sort channel circuit including circuit means responsive concurrently to the digital signals of the sortation character transmitted by one of said sortation relays and a gating pulse for decoding said digital signals, a first matrix network responsive concurrently to said decoded digital signals of said field portion and a second gating pulse for converting said decoded digital signals to an electrical signal, a second matrix network responsive concurrently to said decoded digital signals of said zone portion and said second gating pulse for converting said decoded digital signals to a second electrical signal, and circuit means for combining the electrical signals derived from each of said code portions for providing an output pulse on a sort channel line corresponding to the magazine and the character receivable by the magazine, a check channel circuit including circuit means responsive concurrently to the digital signals of the check character, as represented by the sortation character of the prior pass, transmitted by one of said checking relays and said gating pulse for decoding said digital signals, a first matrix network responsive concurrently to said decoded digital signals of said field portion and a second gating pulse for converting said decoded digital signals to an electrical signal, a second matrix network responsive concurrently to said decoded digital signals of said zone portion and said second gating pulse for converting said decoded digital signals to an electrical signal, and circuit means for combining the electrical signals derived from each of said code portions for providing an output pulse on a check channel line corresponding to the magazine and the characters receivable by the magazine, a gating circuit responsive to said counter output pulse and the synchronizing pulse derived from the sortation column for generating a first gating pulse for simultaneous application to the circuit means of said sort channel circuit and to the circuit means of said check channel circuit and a second gating pulse delayed with respect to said first gating pulse for selective application to the matrices of said sort channel and said check channel, memory means including a plurality of registers equivalent in number to the magazines comprising a group, each register being associated with one of said magazines and connected to its respective sort and check channel line for receiving and storing said electrical signals and providing an output pulse in timed relation and coincident with positioning of the element corresponding to the stored electrical signal with respect to the respective magazine, and means responsive to said last-mentioned output pulse for connecting the transfer means of said second group and associated with said respective magazine to said reciprocating means to move the element from said conveyor and into said magazine.

4. A device for providing a numeric sortation of a plurality of elements having code arranged thereon in a number of rows and columns and a control mark associated with each column of code, each code column being representative of at least two characters with each character represented by a six bit binary code including a field portion designated by the four least significant bits and common to numerical and alphabetical characters and a zone portion designated by the two most significant bits to distinguish among the different assigned characters, comprising a first group of magazines aligned in a row, a second group of magazines aligned in a row and coextensive with said first group of magazines, said magazines in each group being equivalent in number and adapted to have said elements inserted into and withdrawn from the same open end, means arranged between said first and second group of magazines for scanning the code on each of said elements presented thereto to derive digital signals representative of only a predetermined column of code and a signal from each control mark, means including an endless conveyor provided with a plurality of apertures spaced in accordance with the spacing of said magazines for transporting said elements from any magazine in one of said groups past said scanning means to any magazine in the other group, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a drive means including means for imparting intermittent motion to said conveyor, means for imparting reciprocating motion to said transfer means, and means for imparting rotary motion to said pulse generating means, means for operatively connecting said transfer means in said one group of magazines to said reciprocating means in a predetermined order to withdraw the elements individually from the respective magazine and position each element on said conveyor over the aligned aperture, a plurality of sortation relays equivalent in number to the characters in a column and individually and selectively actuatable for permitting transmission of only the digital signals corresponding to the sortation character, a plurality of checking relays equivalent in number to the characters in a column and individually and selectively actuatable for permitting transmission of only the digital signals corresponding to the check character, plugboard means for establishing the sortation column and sortation and check character for each pass of said elements past said scanning means, the direction of movement of said transporting means, and the function of said transfer means with respect to each group of magazines, synchronizing means responsive to each of said control mark signals for deriving a series of synchronizing pulses therefrom, a counter means preset to a count corresponding to the sortation column and responsive to said synchronizing pulses for providing an output pulse upon reaching said count and reset by one of said cyclic pulses to a zero state, a sort channel circuit including circuit means responsive concurrently to the digital signals of the sortation character transmitted by said sortation relays and a gating pulse for decoding said digital signals, a first matrix network responsive concurrently to said decoded digital signals of said field portion and a second gating pulse for converting said decoded digital signals to an electrical signal, a second matrix network responsive concurrently to said decoded digital signals of said zone portion and said second gating pulse for converting said decoded digital signals to a second electrical signal, and circuit means for combining the electrical signals derived from each of said code portions for providing an output pulse on a line corresponding to the magazine and the character receivable by the magazine, a check channel circuit including circuit means responsive concurrently to the digital signals of the sortation character of the prior pass transmitted by said checking relays and said gating pulse for decoding said digital signals, a first matrix network responsive concurrently to said decoded digital signals of said field portion and a second gating pulse for converting said decoded digital signals to an electrical signal, a second matrix network responsive concurrently to said decoded digital signals of said zone portion and said second gating pulse for converting said decoded digital signals to an electrical signal, and circuit means for combining the electrical signals derived from each of said code portions for providing an output pulse on a check channel line corresponding to the magazine and the characters receivable by the magazine, a gating circuit responsive to said counter output pulse and the synchronizing pulse derived from the sortation column for generating a first gating pulse for simultaneous application to the circuit means of said sort channel circuit and to the circuit means of said check channel circuit and a second gating pulse for selective application to the matrices of said sort channel and said check channel, memory means including a plurality of registers equivalent in number to the magazines comprising a group, each register being associated with one of said magazines and connectable to its respective sort or check channel line for receiving and storing said electrical signals and providing an output pulse in timed relation and coincident with positioning of the element corresponding to the stored electrical signal with respect to the respective magazine, means responsive to said last-mentioned output pulse for connecting the transfer means of said second group and associated with said respective magazine to said reciprocating means to move the element from said conveyor and into said magazine, means actuated in response to the absence of an element with respect to said scanning means, after a predetermined interval, for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

5. A device for providing an alpha-numeric sortation by two passes of a plurality of elements having code arranged thereon in a number of rows and columns and a control mark associated with each column of code, each column being representative of at least two characters with each character represented by a six bit binary code including a field portion designated by the four least significant bits and common to numerical and alphabetical characters and a zone portion designated by the two most significant bits to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark associated with each of said code columns, means including an endless conveyor provided with a plurality of apertures spaced in accordance with the spacing of said magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means including means for imparting intermittent motion to said conveyor, means for imparting reciprocating motion to said transfer means and means for imparting rotary motion to said pulse generating means, a plurality of sort relays equivalent in number to the characters in a column and individually and selectively actuatable for permitting transmission of only the digital signals corresponding to the sortation character, a plurality of check relays equivalent in number to the characters in a column and individually and selectively actuatable for permitting transmission of only the digital signals corresponding to the check character as represented by the previous sortation character, synchronizing means responsive to each of said control mark signals for deriving a series of synchronizing pulses therefrom, counter means preset to a count corresponding to the sortation column and responsive to said synchronizing pulses for providing an output pulse upon reaching said count and reset by one of said cyclic pulses to a zero state, a sort channel circuit including circuit means responsive concurrently to the digital signals of the sortation character transmitted by one of said sort relays and a gating pulse for decoding said digital signals, a first sort matrix network responsive concurrently to the decoded digital signals of said field portion and a second gating pulse for converting said decoded digital signals to an electrical signal, a second sort matrix network responsive concurrently to said decoded digital signals of said zone portion and a second gating pulse for converting said decoded digital signals to a second electrical signal, and circuit means for combining said electrical signals for providing an output pulse on a sort channel line corresponding to the magazine and the character receivable by the magazine, a check channel circuit including circuit means responsive concurrently to the digital signals of the check character transmitted by the corresponding check relay and a gating pulse for decoding said digital signals, a first check matrix network responsive concurrently to the decoded digital signals of said field portion and a second gating pulse for converting said decoded digital signals to an electrical signal, a second check matrix network responsive concurrently to said decoded digital signals of said zone portion and a second gating pulse for converting said decoded digital signals to a second electrical signal, and means for combining said electrical signals to provide an output pulse on a check channel line corresponding to the magazine and the character receivable by the magazine, a gating circuit responsive to said counter output pulse and the synchronizing pulse derived from the sortation column for generating a first gating pulse for simultaneous application to the circuit means of said sort channel circuit and to the circuit means of said check channel circuit on each pass of said elements past said scanning means to release said decoded digital signals in said sort channel circuit with respect to said field when said elements are moved in one direction and with respect to said zone when said elements are moved in the other direction and to release said decoded digital signals, after the first pass of said elements past said scanning means, in said check channel circuit with respect to said field when said elements are moved in said other direction and to said zone when said elements are moved in said one direction, a second gating circuit responsive to said counter pulse and the synchronizing pulse derived from the sortation column, after the first pass of said elements in said one direction, for generating a second gating pulse for application to the check matrix of the check channel circuit to release the electrical signal corresponding to the field when said elements are moved in said other direction and corresponding to the zone when said elements are moved in said one direction, a third gating circuit responsive only to said counter output pulse and the synchronizing pulse derived from the sortation column on the first pass of said elements past said scanning means in said one direction for generating a second gating pulse for application to the sort matrix of the sort channel circuit to release the electrical signal corresponding to the field of the sortation character and responsive to the output pulse from said check channel circuit on each subsequent pass of said elements, when said output pulse corresponds to the station from which said elements are being withdrawn, for generating a second gating pulse for application to the sort matrix of said sort channel circuit to release the electrical signal corresponding to the field of the previous sortation when said elements are moved in said other direction and corresponding to the zone of the previous sortation character when said elements are moved in said one direction, memory means including a plurality of registers equivalent in number to the magazines comprising a group, each register being associated with one of said magazines and connectable to its respective sort channel line, for receiving and storing said electrical signals and providing an output pulse in timed relation and coincident with positioning of the element corresponding to the stored electrical signal with respect to the respective magazine means for operatively connecting said transfer means in said one group of magazines to said reciprocating means in a predetermined order to withdraw the elements individually from the respective magazine and position each element on said conveyor over the aligned aperture, means responsive to the output pulse of said memory means for operatively connecting the transfer means of said second group and associated with said respective magazine to said reciprocating means to move the element from said conveyor and into said magazine, plugboard means for establishing the direction of movement of said transporting means, the order of sortation characters, the order of check characters, the sortation column, and the sort and check channel drive sequence, means actuated in response to the absence of an element with respect to said scanning means, after a predetermined interval, for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

6. A device for providing an alpha-numeric sortation by two passes of a plurality of elements having code arranged thereon in a number of rows and columns and a control mark associated with each column of code, each column being representative of at least two characters with one of said characters being a tag character and each character being represented by a six bit binary code including a field portion designated by the four least significant bits and a common to numerical and alphabetical characters and a zone portion designated by the two most significant bits to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark associated with each of said code columns, means including an endless conveyor provided with a plurality of apertures spaced in accordance with the spacing of said magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means including means for imparting intermittent motion to said conveyor, means for imparting reciprocating motion to said transfer means, and means for imparting rotary motion to said pulse generating means, a plurality of sort relays equivalent in number to the characters in a column and individually and selectively actuatable for permitting transmission of only the digital signals corresponding to the sortation character, a plurality of check relays equivalent in number to the characters in a column and individually and selectively actuatable for permitting transmission of only the digital signals corresponding to the check character as represented by the previous sortation character, synchronizing means responsive to each of said control mark signals for deriving a series of synchronizing pulses therefrom, counter means preset to a count corresponding to the sortation column and responsive to said synchronizing pulses for providing an output pulse upon reaching said count and reset by one of said cyclic pulses to a zero state, a sort channel circuit including circuit means responsive concurrently to the digital signals of the sortation character transmitted by one of said sort relays and a gating pulse for decoding said digital signals, a first sort matrix network responsive concurrently to the decoded digital signals of said field portion and a second gating pulse for converting said decoded digital signals to an electrical signal, a second sort matrix network responsive concurrently to said decoded digital signals of said zone portion and said second gating pulse for converting said decoded digital signals to a second electrical signal, and circuit means for combining said electrical signals for providing an output pulse on a sort channel line corresponding to the magazine and the character receivable by the magazine, a check channel circuit including circuit means responsive concurrently to the digital signals of the check character transmitted by the corresponding check relay and a gating pulse for decoding said digital signals, a first check matrix network responsive concurrently to the decoded digital signals of said field portion and a second gating pulse for converting said decoded digital signals to an electrical signal, a second check matrix network responsive concurrently to said decoded digital signals of said zone portion and a second gating pulse for converting said decoded digital signals to a second electrical signal, and means for combining said electrical signals to provide an output pulse on a check channel line corresponding to the magazine and the character receivable by the magazine, a gating circuit responsive to said counter output pulse and the synchronizing pulse derived from the sortation column for generating a first gating pulse for simultaneous application to the circuit means of said sort channel circuit and to the circuit means of said check channel circuit on each pass of said elements past said scanning means to release said decoded digital signals in said sort channel circuit with respect to said field when said elements are moved in one direction and with respect to said zone when said elements are moved in the other direction and to release said decoded digital signals, after the first pass of said elements past said scanning means, in said check channel circuit with respect to said field when said elements are moved in said other direction and to said zone when said elements are moved in said one direction, a second gating circuit responsive to said counter output pulse and the synchronizing pulse derived from the sortation column on each pass of said elements for generating a second gating pulse for application to the check matrix of the check channel circuit to release the electrical signal corresponding to said tag character on only the first pass of said elements and on subsequent passes to release the electrical signal corresponding to the field when said elements are moved in said other direction and corresponding to the zone when said elements are moved in said one direction, a third gating circuit responsive to the electrical signal corresponding to said tag character only on the first pass of said elements for generating a second gating pulse for application to the sort matrix of the sort channel circuit to release the electrical signal corresponding to the field of the sortation character and responsive to the output pulse from said check channel circuit on each subsequent pass of said elements, when said output pulse corresponds to the magazine from which said elements are being withdrawn, for generating a second gating pulse for application to the sort matrix of said sort channel circuit to release the electrical signal corresponding to the field of the previous sortation when said elements are moved in said other direction and corresponding to the zone of the previous sortation character when said elements are moved in said one direction, memory means including a plurality of registers equivalent in number to the magazines comprising a group, each register being associated with one of said magazines and connectable to its respective sort channel line, for receiving and storing said electrical signals and providing an output pulse in timed relation and coincident with positioning of the element corresponding to the stored electrical signal with respect to the respective magazine, means for operatively connecting said transfer means in said one group of magazines to said reciprocating means in a predetermined order to withdraw the elements individually from the respective magazine and position each element on said conveyor over the aligned aperture, means responsive to the output pulse of said memory means for operatively connecting the transfer means of said second group and associated with said respective magazine to said reciprocating means to move the element from said conveyor and into said magazine, plugboard means for establishing the direction of movement of said transporting means, the order of sortation characters, the order of check characters, the tag character, and the sort and check channel circuit drive sequence, means actuated in response to the absence of an element with respect to said scanning means, after a predetermined interval, for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

7. A device for providing a sortation with respect to two characters by one pass of a plurality of elements having code arranged thereon in a number of rows and columns and a control mark associated with each column of code, each column being representative of at least two characters with one of said characters designated as a tag character and each character being represented by a six bit binary code including a field portion designated by the four least significant bits and common to numerical and alphabetical characters and a zone portion designated by the two most significant bits to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark associated with each of said code columns, means including an endless conveyor provided with a plurality of apertures spaced in accordance with the spacing of said magazines for transporting said elements from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means for imparting intermittent motion to said conveyor, for imparting reciprocating motion to said transfer means and for imparting rotary motion to said pulse generating means, a plurality of sort relays equivalent in number to the characters in a column and individually and selectively actuatable for permitting transmission of only the digital signals corresponding to said tag character, a plurality of check relays equivalent in number to the characters in a column and individually and selectively actuatable for permitting transmission of only the digital signals corresponding to the sortation character, synchronizing means responsive to each of said control mark signals for deriving a series of pulses therefrom, counter means preset to a count corresponding to the sortation column for providing an output pulse upon reaching said count and reset by one of said cyclic pulses to a zero state, a sort channel circuit including circuit means responsive concurrently to the digital signals of said tag character transmitted by one of said sort relays and a gating pulse for decoding said digital signals, and a sort matrix network responsive concurrently to the decoded digital signals of said tag character and a second gating pulse for converting said decoded digital signals to an electrical signal on a sort channel line corresponding to the magazine and character receivable by the magazine, a check channel circuit including circuit means responsive concurrently to the digital signals of the sortation character transmitted by the corresponding check relay and a gating pulse for decoding said digital signals, and a check matrix network responsive concurrently to the decoded digital signals of said sortation character and a second gating pulse for converting said decoded digital signals to an electrical signal on a check channel line corresponding to the magazine and character receivable by the magazine; a gating circuit responsive to said counter output pulse and the synchronizing pulse derived from the sortation column for generating a first gating pulse for simultaneous application to the circuit means of said sort channel circuit and said check channel circuit, a second gating circuit responsive to said counter pulse and the synchronizing pulse derived from the sortation column for generating a second gating pulse for application to the sort matrix of the sort channel circuit to release the electrical signal corresponding to the tag character, a third gating circuit responsive to the electrical signal of the tag character for generating a second gating pulse for application to the check matrix of the check channel circuit to release the electrical signal corresponding to the sortation character, memory means including a plurality of registers equivalent in number to the magazines comprising a group, each register being associated with one of said magazines and connectable to its respective check channel line, for receiving and storing said electrical signals and providing an output pulse in timed relation and coincident with positioning of the element corresponding to the stored electrical signal with respect to the respective magazine, means for operatively connecting said transfer means in said one group of magazines to said drive means in a predetermined order to withdraw the elements individually from the respective magazine and position each element on said conveyor over the aligned aperture, means responsive to the output pulse of said memory means for operatively connecting the transfer means of said second group and associated with said respective magazine to said drive means to move the element from said conveyor and into said magazine, and plugboard means for establishing the direction of movement of said transporting means, the tag character, the sortation character, the sortation column, and the sort and check channel drive sequence.

8. A device for sorting a plurality of elements having code arranged thereon in a number of rows and columns and a control mark associated with each column of code, each column being representative of at least two characters with each character represented by a six bit binary code, comprising a first group of magazines aligned in a row, a second group of magazines arranged in a plurality of adjacent rows and columns, one row of said magazines being aligned with said magazines of the first group, a single magazine between said first and second group of magazines and arranged in alignment with said row of magazines in each of said groups, said magazines in a row for each group being equivalent in number and adapted to have said elements inserted into and withdrawn from the same open end, means arranged between said first group of magazines and said single magazine for scanning the code of each column simultaneously and the columns of code successively on each of said elements presented thereto to derive digital signals representative of only a predetermined column of code and a signal from each control mark associated with each of said code columns, a reversible synchronous drive means having a first output shaft for imparting intermittent motion, a second output shaft for imparting oscillatory motion, and a third output shaft for imparting rotary motion, an endless conveyor operatively connected to said first output shaft, provided with a plurality of apertures spaced longitudinally thereof, and arranged below the aligned row of said magazines for transporting said individual elements intermittently in one direction from said single magazine past said scanning means to the magazines of the first group and in the other direction from the magazines of said first group past said scanning means to the magazines of said second group, said apertures being spaced so as to be aligned with the open ends of the magazines when said conveyor is stationary, a pair of spaced members arranged transversely of said conveyor and extending in both directions therefrom, a carrier movably mounted on said members for supporting said second group of magazines in relation to and over said conveyor with the first row of said magazines normally aligned with said first group, a second reversible drive means, means operatively connecting said second drive means to said carrier for intermittently and normally moving said carrier transversely of said conveyor in a forward direction to successively position each row of magazines in alignment with the magazines of said first group and, upon reversal of said second drive means, for intermittently moving said carrier means transversely of said conveyor in a rearward direction, transfer means arranged with respect to said conveyor and to each magazine in said aligned row for movement through the aperture aligned therewith, when said conveyor is stationary, means operatively connected to said third output shaft for generating a plurality of cyclic pulses in timed relation to positioning of each of said apertures with respect to said scanning means, a plurality of sort relays equivalent in number to the characters in a column and individually and selectively actuatable for permitting transmission of only the digital signals corresponding to the sortation character, a plurality of check relays equivalent in number to the characters in a column and individually and selectively actuatable for permitting transmission of only the digital signals corresponding to the check character as represented by the sortation character of the previous pass, means operatively connecting the transfer means associated with said single magazine to the said second output shaft for withdrawing said elements individually from said single magazine and positioning each element on said conveyor over the aligned aperture for movement in said one direction, synchronizing means responsive to each of said control mark signals for deriving a series of synchronizing pulses therefrom, counter means preset to a count corresponding to the sortation column and responsive to said synchronizing pulses for providing an output pulse upon reaching said count and reset by one of said cyclic pulses to a zero state, a sort channel circuit including circuit means responsive concurrently to the digital signals of the sortation character transmitted by one of said sort relays and a gating pulse for decoding said digital signals, and a sort matrix network responsive concurrently to the decoded digital signals and a second gating pulse for converting said decoded digital signals to an electrical signal on a sort channel line corresponding to the magazine and the character receivable by the magazine, a check channel circuit including circuit means responsive concurrently to the digital signals of the sortation character transmitted by the corresponding check relay and a gating pulse for decoding said digital signals, and a check matrix network responsive concurrently to the decoded digital signals of the previous sortation character and a second gating pulse for converting said decoded digital signals to an electrical signal on a check channel line corresponding to the magazine and character receivable by the magazine, a gating circuit responsive to said counter output pulse and the synchronizing pulse derived from the sortation column for generating a gating pulse for simultaneous application to the circuit means of said sort channel circuit and said check channel circuit, a second gating circuit responsive to said counter output pulse and the synchronizing pulse derived from the sortation column on movement of said elements in said one direction and responsive to the electrical signals released from said check matrix only when said signals correspond to the magazine from which said elements are being withdrawn and said elements are being moved in said other direction for generating a second gating pulse for application to said sort matrix to release the electrical signals corresponding to the sortation character, a third gating circuit responsive to said counter output pulse and the synchronizing pulse derived from the sortation column on movement of said elements in said other direction for generating a second gating pulse for application to said check matrix to release said electrical signals, memory means including a plurality of registers equivalent in number to the magazines comprising a group, each register being associated with one of said magazines and connectable to its respective sort channel line, for receiving and storing said electrical signals and providing an output pulse in timed relation and coincident with positioning of the element corresponding to the stored electrical signal with respect to the respective magazine, means responsive to the output pulse of said memory means for operatively connecting the transfer means of said first group of magazines and associated with said respective magazine to said second output shaft, upon movement of said elements in said one direction, for operatively connecting the transfer means of said second group of magazines and associated with said respective magazine to said second output shaft, upon movement of said elements in said other direction, to move the element from said conveyor and into the magazine, means for operatively connecting said transfer means in said first group to said second output shaft in a predetermined order to withdraw the elements individually from the respective magazine and position each element on said conveyor over the aligned aperture for movement in said other direction, plugboard means for establishing the direction of movement of said drive means for each pass of said elements, the sortation column, the sortation character order, the check character order, the connection of the transfer means of said single magazine to said second ouput shaft for only the first pass, the indexing of said carrier, and the sort and check channel drive sequence, a second counter means responsive to one of said cyclic pulses for providing an output signal with a predetermined number of said pulses, means responsive to the control marks on each element positioned with respect to said scanning means for generating a signal to reset said second counter means to a zero state, means responsive to the output signal derived from said second counter means for rendering the transfer means of said single magazine inoperative, for controlling the order of connection of the transfer means of the first group of magazines to said second output shaft, and for reversing said drive means to move said elements in the other direction, and means responsive to each output signal derived from said second counter, upon movement of said elements in the other direction, for rendering said carrier moving means operative to successively position said rows in said second group of magazines in relation to said conveyor.

9. A device for providing a numeric sortation of a plurality of elements having code arranged thereon in a number of rows and columns and a control mark associated with each column of code, each code column being representative of at least two characters with each character represented by a six bit binary code including a field portion designated by the four least significant bits and common to numerical and alphabetical characters and a zone portion designated by the two most significant bits to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark associated with each of said code columns, means including an endless conveyor provided with a plurality of apertures spaced in accordance with the spacing of said magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means including means for imparting intermittent motion to said conveyor, means for imparting reciprocating motion to said transfer means, and means for imparting rotary motion to said pulse generating means, means for operatively connecting said transfer means in said one group of magazines to said reciprocating means in a predetermined order to withdraw the elements individually from the respective magazine and position each element on said conveyor over the aligned aperture, a plurality of sortation relays equivalent in number to the characters in a column and individually and selectively actuatable for permitting transmission of only the digital signals corresponding to the sortation character, a plurality of checking relays equivalent in number to the characters in a column and individually and selectively actuatable for permitting transmission of only the digital signals corresponding to the check character, plugboard means for establishing the sortation column and sortation and check character position in the sortation column for each pass of said elements past said scanning means, the direction of movement of said transporting means, and the function of said transfer means with respect to each group of magazines, synchronizing means responsive to each of said control mark signals for deriving a series of synchronizing pulses therefrom, a counter means preset to a count corresponding to the sortation column and responsive to said synchronizing pulses for providing an output pulse upon reaching said count and reset by one of said cyclc pulses to a zero state, a sort channel circuit including circuit means responsive concurrently to the digital signals of the sortation character transmitted by said sortation relays and a gating pulse for decoding said digital signals, a first matrix network responsive concurrently to said decoded digital signals of said field portion and a second gating pulse for converting said decoded digital signals to an electrical signal, a second matrix network responsive concurrently to said decoded digital signals of said zone portion and said second gating pulse for converting said decoded digital signals to a second electrical signal, and circuit means for combining the electrical signals derived from each of said code portions for providing an output pulse on a sort channel line corresponding to the magazine and the character receivable by the magazine, a check channel circuit including circuit means responsive concurrently to the digital signals of the sortation character of the prior pass transmitted by said checking relays and said gating pulse for decoding said digital signals, a first matrix network responsive concurrently to said decoded digital signals of said field portion and a second gating pulse for converting said decoded digital signals to an electrical signal, a second matrix network responsive concurrently to said decoded digital signals of said zone portion and said second gating pulse for converting said decoded digital signals to an electrical signal, and circuit means for combining the electrical signals derived from each of said code portions for providing an output pulse on a check channel line corresponding to the magazine and the characters receivable by the magazine, a gating circuit responsive to said counter output pulse and the synchronizing pulse derived from the sortation column for generating a first gating pulse for simultaneous application to the circuit means of said sort channel circuit and to the circuit means of said check channel circuit and a second gating pulse for selective application to the matrices of said sort channel and said check channel, memory means including a plurality of registers equivalent in number to the magazines comprising a group, each register being associated with one of said magazines and connectable to its respective sort or check channel line for receiving and storing said electrical signals and providing an output pulse in timed relation and coincident with positioning of the element corresponding to the stored electrical signal with respect to the respective magazine, means responsive to said last-mentioned output pulse for connecting the transfer means of said second group and associated with said respective magazine to said reciprocating means to move the element from said conveyor and into said magazine, a second counter means responsive to said cyclic pulses for providing an output pulse with a first predetermined count and with a second and greater predetermined count and reset to a zero state by said synchronizing pulses, means responsive to said second count output pulse for rendering operative the transfer means next in order to withdraw elements from the magazine associated therewith, circuit means including a manually operative switch associated with each magazine in each of said groups, said circuit means being responsive to the first count of said second counter means when the switch corresponding to the magazine from which elements are being withdrawn is in its closed position, for arresting said conveyor and preventing actuation of the transfer means next in order to permit additional elements to be inserted in the respective magazine, reset means for rendering said conveyor operative and setting said second counter means to said zero state to continue withdrawal of said elements from the same magazine, means actuated in response to the absence of an element with respect to said scanning means, after a predetermined interval, for rendering operative the transfer means next in order to withdrawal elements from the magazine associated therewith, and means actuated in response to the absence of an element with respect to said scanning means, after removal of the last element in the last magazine of said one group, for reversing said transporting means and switching the functions of said transfer means with respect to each group of magazines.

10. A device for providing a sortation with respect to two characters by one pass of a plurality of elements having code arranged thereon in a number of rows and columns and a control mark associated with each column of code, each column being representative of at least two characters with one of said characters designated as a tag character and each character being represented by a six bit binary code including a field portion designated by the four least significant bits and common to numerical and alphabetical characters and a zone portion designated by the two most significant bits to distinguish among the different assigned characters, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of only a predetermined column of code and a signal from each control mark associated with each of said code columns, means including an endless conveyor provided with a plurality of apertures spaced in accordance with the spacing of said magazines for transporting said elements individually from any magazine in one of said groups past said scanning means to any magazine in the other group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a plurality of cyclic pulses in timed relation to positioning of each of said apertures with respect to said scanning means, a synchronous drive means for imparting intermittent motion to said conveyor, for imparting reciprocating motion to said transfer means and for imparting rotary motion to said pulse generating means, a plurality of sort relays equivalent in number to the characters in a column and individually and selectively actuatable for permitting transmission of only the digital signals corresponding to said tag character, a plurality of check relays equivalent in number to the characters in a column and individually and selectively actuatable for permitting transmission of only the digital signals corresponding to the sortation character, synchronizing means responsive to each of said control mark signals for deriving a series of pulses therefrom, counter means preset to a count corresponding to the sortation column for providing an output pulse upon reaching said count and reset by one of said cyclic pulses to a zero state, a sort channel circuit including circuit means responsive concurrently to the digital signals of said tag character transmitted by one of said sort relays and a gating pulse for decoding said digital signals, and a sort matrix network responsive concurrently to the decoded digital signals of said tag character and a second gating pulse for converting said decoded digital signals to an electrical signal on a sort channel line corresponding to the magazine and character receivable by the magazine, a check channel circuit including circuit means responsive concurrently to the digital signals of the sortation character transmitted by the corresponding check relay and a gating pulse for decoding said digital signals, and a check matrix network responsive concurrently to the decoded digital signals of said sortation character and a second gating pulse for converting said decoded digital signals to an electrical signal on a check channel line corresponding to the magazine and character receivable by the magazine; a gating circuit responsive to said counter output pulse and the synchronizing pulse derived from the sortation column for generating a first gating pulse for simultaneous application to the circuit means of said sort channel circuit and said check channel circuit, a second gating circuit responsive to said counter pulse and the synchronizing pulse derived from the sortation column for generating a second gating pulse for application to the sort matrix of the sort channel circuit to release the electrical signal corresponding to the tag character, a third gating circuit responsive to the electrical signal of the tag character for generating a second gating pulse for application to the check matrix of the check channel circuit to release the electrical signal corresponding to the sortation character, memory means including a plurality of registers equivalent in number to the magazines comprising a group, each register being associated with one of said magazines and connectable to its respective check channel line, for receiving and storing said electrical signals and providing an output pulse in timed relation and coincident with positionng of the element corresponding to the stored electrical signal with respect to the respective magazine, means for operatively connecting said transfer means in said one group of magazines to said drive means in a predetermined order to withdraw the elements individually from the respective magazine and position each element on said conveyor over the aligned aperture, means responsive to the output pulse of said memory means for operatively connecting the transfer means of said second group and associated with said respective magazine to said drive means to move the element from said conveyor and into said magazine, plugboard means for establishing the direction of movement of said transporting means, the tag character, the sortation character, the sortation column, and the sort and check channel drive sequence, means actuated in response to the absence of an element with respect to said scanning means, after a predetermined interval for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

11. A device for sorting a plurality of elements having code arranged thereon in a number of rows and columns and a control mark associated with each column of code, said elements including multiple related elements having code to identify the first and last of such related elements, and each column of code being representative of at least two characters with each character represented by a six bit binary code, comprising a first group of magazines aligned in a row, a second group of magazines arranged in a plurality of adjacent rows and columns, one row of said magazines being aligned with said magazines of the first group, a single magazine between said first and second group of magazines and arranged in alignment with said row of magazines in each of said groups, said magazines in a row for each group being equivalent in number and adapted to have said elements inserted into and withdrawn from the same open end, means arranged between said first group of magazines and said single magazine for scanning the code of each column simultaneously and the columns of code successively on each of said elements presented thereto to derive digital signals representative of only a predetermined column of code and a signal from each control mark associated with each of said code columns, a reversible synchronous drive means having a first output shaft for imparting intermittent motion, a second output shaft for imparting oscillatory motion, and a third output shaft for imparting rotary motion, an endless conveyor operatively connected to said first output shaft, provided with a plurality of apertures spaced longitudinally thereof, and arranged below the aligned row of said magazines for transporting said individual elements intermittently in one direction from said single magazine past said scanning means to the magazines of the first group and in the other direction from the magazines of said first group past said scanning means to the magazines of said second group, said apertures being spaced so as to be aligned with the open ends of the magazines when said conveyor is stationary, a pair of spaced members arranged transversely of said conveyor and extending in both directions therefrom, a carrier movably mounted on said members for supporting said second group of magazines in relation to and over said conveyor with the first row of said magazines normally aligned with said first group, a second reversible drive means, means operatively connecting said second drive means to said carrier for intermittently and normally moving said carrier transversely of said conveyor in a forward direction to successively position each row of magazines in alignment with the magazines of said first group and, upon reversal of said second drive means, for intermittently moving said carrier means transversely of said conveyor in a rearward direction, transfer means arranged with respect to said conveyor and to each magazine in said aligned row for movement through the aperture aligned therewith, when said conveyor is stationary, means operatively connected to said third output shaft for generating a plurality of cyclic pulses in timed relation to positioning of each of said apertures with respect to said scanning means, a plurality of sort relays equivalent in number to the characters in a column and individually and selectively actuatable for permitting transmission of only the digital signals corresponding to the sortation character, a plurality of check relays equivalent in number to the characters in a column and individually and selectively actuatable for permitting transmission of only the digital signals corresponding to the check character as represented by the sortation character of the previous pass, means operatively connecting the transfer means associated with said single magazine to said second output shaft for withdrawing said elements individually from said single magazine and positioning said elements over the aligned apertures for movement in said one direction, synchronizing means responsive to each of said control mark signals for deriving a series of synchronizing pulses therefrom, counter means preset to a count corresponding to the sortation column and responsive to said synchronizing pulses for providing an output pulse with a first predetermined count and with a second and greater predetermined count and reset by one of said cyclic pulses to a zero state, a sort channel circuit including circuit means responsive concurrently to the digital signals of the sortation character transmitted by one of said sort relays and a gating pulse for decoding said digital signals, and a sort matrix network responsive concurrently to the decoded digital signals and a second gating pulse for converting said decoded digital signals to an electrical signal on a sort channel line corresponding to magazine and the character receivable by the magazine, a check channel circuit including circuit means responsive concurrently to the digital signals of the sortation character transmitted by the corresponding check relay and a gating pulse for decoding said digital signals, and a check matrix network responsive concurrently to the decoded digital signals of the previous sortation character and a second gating pulse for converting said decoded digital signals to an electrical signal on a check channel line corresponding to the magazine and character receivable by the magazine, a gating circuit responsive to said counter output pulse and the synchronizing pulse derived from the sortation column for generating a gating pulse for simultaneous application to the circuit means of said sort channel circuit and said check channel circuit, a second gating circuit responsive to said counter output pulse and the synchronizing pulse derived from the sortation column on movement of said elements in said one direction and responsive to the electrical signals released from said check matrix only when said signals correspond to the magazine from which said elements are being withdrawn and said elements are being moved in said other direction for generating a second gating pulse for application to said sort matrix to release the electrical signals corresponding to the sortation character, a third gating circuit responsive to said counter output pulse and the synchronizing pulse derived from the sortation column on movement of said elements in said other direction for generating a second gating pulse for application to said check matrix to release said electrical signals, memory means including a plurality of registers equivalent in number to the magazines comprising a group, each register being associated with one of said magazines and connectable to its respective sort channel line, for receiving and storing said electrical signals and providing an output pulse in timed relation and coincident with positioning of the element corresponding to the stored electrical signal with respect to the respective magazine, means responsive to the output pulse of said memory means for operatively connecting the transfer means of said first group of magazines and associated with said respective magazine to said second output shaft, upon movement of said elements in said one direction, for operatively connecting the transfer means of said second group of magazines and associated with said respective magazine to said second output shaft, upon movement of said elements in said other direction, to move the element from said conveyor and into the magazine, means for operatively connecting said transfer means in said first group to said second output shaft in a predetermined order to withdraw the elements individually from the respective magazine and position each element on said conveyor over the aligned aperture for movement in said other direction, means for establishing the direction of movement of said drive means for each pass of said elements, the sortation column, the sortation character order, the check character order, the connection of the transfer means of said single magazine to said second output shaft for only the first pass, the indexing of said carrier, and the sort and check channel drive sequence, a second counter means responsive to one of said cyclic pulses for providing an output signal with a predetermined number of said pulses, means responsive to the control marks on each element positioned with respect to said scanning means for generating a signal to reset said second counter means to a zero state, means responsive to the output signal derived from said second counter means for rendering the transfer means of said single magazine inoperative, for controlling the order of connection of the transfer means of the first group of magazines to said second output shaft, and for reversing said drive means to move said elements in the other direction, means responsive to each output signal derived from said second counter, upon movement of said elements in the other direction, for rendering said carrier moving means operative to successively position said rows in said second group of magazines in relation to said conveyor, means responsive to the output signal derived from said second counter means with respect to the last transfer means in each of said groups for reversing said second reversible drive means and switching the functions of said transfer means with respect to each group of magazines, means responsive to the second count output pulse from said first counter means for rendering operative the transfer means next in order to withdraw elements from the magazine associated therewith, means arranged with respect to each group of magazines for providing a signal when any one of said stations has received its full complement of elements, and means responsive to the first count output pulse from said first counter and said last-mentioned signal for delaying stoppage of said transport means for a predetermined interval to permit detection of single elements and of any multiple related elements by said scanning means to retain such elements in order.

12. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, means for transporting said elements individually from any magazine in said first group past said scanning means to any magazine in said second group, transfer means arranged with respect to said transporting means and to each magazine in said row of aligned magazines for withdrawing said elements individually from the respective magazine to position each element on said transporting means and for moving an element from said transporting means into the respective magazine, means for rendering the transfer means in said first group of magazines operative in a predetermined order to withdraw the elements, means responsive to the code on each element positioned with respect to said scanning means for rendering the transfer means in the second group of magazines operative upon movement of the element into position with respect to the magazine designated by the code thereon, and means responsive, after a predetermined interval of time, to the last element withdrawn from the magazine in said first group for indexing the succeeding row of magazines of said second group into alignment with the magazines of said first group to receive the elements withdrawn from the next magazine of said first group.

13. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, means for transporting said elements individually from any magazine in said first group past said scanning means to any magazine in said second group, means for supporting said second group of magazines in relation to said transporting means with one of said rows aligned with the magazines of said first group, means operatively connected to said supporting means for indexing said supporting means to successively position each row of said second group of magazines in alignment with the magazines of said first group, transfer means arranged with respect to said transporting means and to each magazine in said row of aligned magazines for withdrawing said elements individually from the respective magazine to position each element on said transporting means and for moving an element from said transporting means into the respective magazine, means for rendering the transfer means in said first group of magazines operative in a predetermined order to withdraw the elements, means responsive to the code on each element positioned with respect to said scanning means for rendering the transfer means in the second group operative upon movement of the element into position with respect to the magazine designated by the code thereon, and means responsive, after a predetermined interval of time, to the last element withdrawn from the magazine in said first group for rendering said indexing means operative and stepping withdrawal of elements to the next magazine of said first group.

14. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, means for supporting said second group of magazines in relation to said conveyor with the first of said adjacent rows in alignment with the magazines of said first group, a second drive means operatively connected to said supporting means for moving said supporting means transversely of said conveyor to successively position each row of said magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, and means responsive, after a predetermined interval of time, to the last element withdrawn from the magazine in said first group for rendering said second drive means operative to index the next adjacent row into position over said conveyor and for operatively connecting the transfer means next in order to said drive means to withdraw elements from the respective magazine.

15. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, means for supporting said second group of magazines in relation to said conveyor with one of said rows in alignment with the magazines of said first group, a second drive means operatively connected to said supporting means for moving said supporting means transversely of said conveyor to successively position each row of said magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, and means for operatively connecting said second drive means to said supporting means to position any row of magazines in said second group in alignment with said first group.

16. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, means for supporting said second group of magazines in relation to said conveyor with the first of said adjacent rows in alignment with the magazines of said first group, a second drive means operatively connected to said supporting means for moving said supporting means transversely of said conveyor to successively position each row of said magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said second drive means operative to index the next adjacent row into position over said conveyor and for operatively connecting the transfer means next in order to said drive means to withdraw elements from its respective magazine, and means independent of said last-mentioned means for rendering said second drive means operative to index any row of magazines in said second group into alignment with said first group.

17. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, a pair of spaced members arranged transversely of said conveyor and extending in both directions therefrom, a carrier movably mounted on said members for supporting said second group of stations in relation to and over said conveyor, a second drive means, means operatively connecting said second drive means to said carrier for intermittently moving said carrier transversely of said conveyor in one direction to succesively position each row of magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, and means responsive, after a predetermined interval of time, to the last element withdrawn from the magazine in said first group for rendering said connecting means operative to move said carrier for positioning the next adjacent row of magazines in said second group in position over said conveyor and for operatively connecting the transfer means next in order to said drive means to withdraw elements from its respective magazine.

18. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, a pair of spaced members arranged transversely of said conveyor and extending in both directions therefrom, a carrier movably mounted on said members for supporting said second group of magazines in relation to and over said conveyor, a second drive means, means operatively connecting said second drive means to said carrier for intermittently moving said carrier transversely of said conveyor in one direction to successively position each row of magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said connecting means operative to move said carrier for positioning the next adjacent row of magazines in said second group in position over said conveyor and for operatively connecting the transfer means next in order to said drive means to withdraw elements from its respective magazine.

19. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned witth the open ends of the magazines when said conveyor is stationary, a pair of spaced members arranged transversely of said conveyor and extending in both directions therefrom, a carrier movably mounted on said members for supporting said second group of magazines in relation to and over said conveyor, a second drive means, means operatively connecting said second drive means to said carrier for intermittently moving said carrier transversely of said conveyor in one direction to successively position each row of magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said connecting means operative to move said carrier for positioning the next adjacent row of magazines in said second group into position over said conveyor and for operatively connecting the transfer means next in order to said drive means to withdraw elements from its respective magazine, means including switch means arranged on said spaced members adjacent each end thereof and actuated by said carrier in its extreme positions for controlling the direction of movement of said carrier, and means independent of said control means for rendering said second drive means operative to initially position said carrier with respect to said conveyor with any row of magazines in said second group in alignment with said first group.

20. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when the conveyor is stationary, a pair of spaced members arranged transversely of said conveyor and extending in both directions therefrom, a carrier movably mounted on said members for supporting said second group of magazines in relation to and over said conveyor with the first row of said magazines normally aligned with said first group, a second drive means including means for reversing said second drive means, means operatively connecting said second drive means to said carrier for intermittently and normally moving said carrier transversely of said conveyor in a forward direction and, upon reversal of said second driving means for intermittently moving said carrier means transversely of said conveyor in a rearward direction to successively position each row of magazines in alignment with the magazines of said first group transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said connecting means operative to index the next adjacent row of magazines in said second group in relation to said conveyor and for operatively connecting the transfer means next in order to said drive means to withdraw elements from its respective magazine, and means including switch means arranged on one of said spaced member adjacent the forward end thereof and actuated by said carrier, upon movement thereof to move the last row of magazines positioned with respect to said conveyor in said forward direction, for rendering said reversing means operative to move said carrier in said rearward direction.

21. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when the conveyor is stationary, a pair of spaced members arranged transversely of said conveyor and extending in both directions therefrom, a carrier movably mounted on said members for supporting said second group of magazines in relation to and over said conveyor with the first row of said magazines normally aligned with said first group, a second drive means including means for reversing said second drive means, means operatively connecting said second drive means to said carrier for intermittently and normally moving said carrier transversely of said conveyor in a forward direction and, upon reversal of said second driving means, for intermittently moving said carrier means transversely of said conveyor in a rearward direction to successively position each row of magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said connecting means operative to index the next adjacent row of magazines in said second group in relation to said conveyor and for operatively connecting the transfer means next in order to said drive means to withdraw elements from its respective magazine, and means for controlling the direction of movement of said carrier including a first switch means on said spaced members adjacent the forward end thereof and a second switch means on said spaced members adjacent the rear end thereof, said first switch means being actuated by said carrier, upon movement of the last row of magazines positioned with respect to said conveyor in a forward direction, to render said reversing means operative to reverse the direction of movement of said carrier and said second switch means being actuated by said carrier, upon movement thereof in said rearward direction and with alignment of said first row of magazines with said first group, to render said reversing means inoperative.

22. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, a pair of spaced members arranged transversely of said conveyor and extending in both directions therefrom, a carrier movably mounted on said members for supporting said second group of magazines in relation to and over said conveyor with the first row of said magazines normally aligned with said first group, a second drive means including means for reversing said second drive means, means operatively connecting said second drive means to said carrier for intermittently and normally moving said carrier transversely of said conveyor in a forward direction and, upon reversal of said second driving means, for intermittently moving said carrier means transversely of said conveyor in a rearward direction to successively position each row of magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said connecting means operative to index the next adjacent row of magazines in said second group in relation to said conveyor and for operatively connecting the transfer means next in order to said drive means to withdraw elements from its respective magazine, means for controlling the direction of movement of said carrier including a first switch means on said spaced members adjacent the forward end thereof and a second switch means on said spaced members adjacent the rear end thereof, said first switch means being actuated by said carrier, upon movement of the last row of magazines positioned with respect to said conveyor in a forward direction, to render said reversing means operative to reverse the direction of movement of said carrier and said second switch means being actuated by said carrier, upon movement thereof in said rearward direction and with alignment of said first row of magazines with said first group, to render said reversing means inoperative, and means responsive to movement of said carrier for rendering said transfer means inoperative.

23. A device for sorting a plurality of elements having code thereon comprising a first group of magazines in which said elements are arranged, a second group of magazines into which said elements are sorted, the magazines in each of said groups being arranged in at least one aligned row and being adapted to have said elements inserted into and withdrawn from the same open end and the magazines in said second group being arranged in a plurality of adjacent rows, means arranged between said first and second group of magazines for scanning the code on each element positioned with respect thereto, an intermittent drive means including an endless conveyor provided with a plurality of apertures and arranged below said one aligned row of magazines for transporting said elements individually from any magazine in said first group past said scanning means to any magazine in said second group, said apertures being spaced so as to be aligned with the open ends of the magazines when said conveyor is stationary, a pair of spaced members arranged transversely of said conveyor and extending in both directions therefrom, a carrier movably mounted on said members for supporting said second group of magazines in relation to and over said conveyor with the first row of said magazines normally aligned with said first group, a second drive means including means for reversing said second drive means, means operatively connecting said second drive means to said carrier for intermittently and normally moving said carrier transversely of said conveyor in a forward direction and, upon reversal of said second driving means, for intermittently moving said carrier means transversely of said conveyor in a rearward direction to successively position each row of magazines in alignment with the magazines of said first group, transfer means arranged with respect to said conveyor and to each magazine in said aligned row for movement through the aperture aligned therewith, when said conveyor is stationary, to withdraw said elements individually from the respective magazine and position each element on said conveyor over the aligned aperture and to move an element arranged over the aperture into the respective magazine, means for operatively connecting said transfer means in said first group of magazaines to said drive means in a predetermined order to withdraw the elements, means responsive to the code on each element positioned with respect to said scanning means for operatively connecting the transfer means in the second group of magazines to said drive means upon movement of the element into position with respect to the magazine designated by the code thereon, means responsive, after a predetermined interval of time, to the last element withdrawn from the magazine in said first group for rendering said connecting means operative to index the next adjacent row of magazines in said second group in relation to said conveyor and for operatively connecting the transfer means next in order to said drive means to withdraw elements from its respective magazine, means for controlling the direction of movement of said carrier including a first switch means on said spaced members adjacent the forward end thereof and a second switch means on said spaced members adjacent the rear end thereof, said first switch means being actuated by said carrier, upon movement of the last row of magazines positioned with respect to said conveyor in a forward direction, to render said reversing means operative to reverse the direction of movement of said carrier and said second switch means being actuated by said carrier, upon movement thereof in said rearward direction and with alignment of said first row of magazines with said first group, to render said reversing means inoperative, means responsive to movement of said carrier for rendering said transfer means inoperative, and means independent of said means responsive to the last element and of said switch means for rendering said second drive means operative to position any one row of magazine in said second group in alignment with said first group.

24. A device for sorting a plurality of elements having code thereon comprising a first group of magazines aligned in a row, a second group of magazines aligned in a row and coextensive with said first group of magazines, said magazines in each group being adapted to have said elements inserted into and withdrawn from the same open end, means arranged between said first and second group of magazines for scanning the code on each element presented thereto to determine the magazine into which each element is to be inserted, means arranged with respect to said magazines of each group for transporting said elements individually from any magazine of one group past said scanning means to any magazine of the other group, transfer means arranged with respect to said transporting means and to each of said magazines, the transfer means of one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, means for determining the direction of movement of said transporting means and the function of said transfer means with respect to each group of magazines, and means actuated in response to the absence of an element with respect to said scanning means, after a predetermined interval, for rendering operative the transfer means next in order to withdraw elements from the magazine associated therewith.

25. A device for sorting a plurality of elements having code thereon arranged in a number of adjacent rows and columns and a control mark associated with each column of code comprising a first group of magazines aligned in a row, a second group of magazines aligned in a row and with said first group of magazines, said magazines being adapted to have said elements inserted into and withdrawn from the same open end, means arranged between said first and second groups of magazines for scanning the code of each column simultaneously and the columns of code successively on each element presented thereto to determine the magazine into which each element is to be inserted, means arranged with respect to said magazines for transporting said elements individually from any magazine of one group past said scanning means to any magazine of the other group, transfer means arranged with respect to said transporting means and to each of said magazines, the transfer means for one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, plugboard means for establishing the direction of movement of said transporting means and the function of said transfer means with respect to each group of magazines, an electronic counter means responsive to absence of successive elements with respect to said scanning means for providing an output signal with a predetermined count, means cyclically actuated in timed relation to positioning of an element with respect to said scanning means for providing a signal to pulse said counter means, means responsive to the control marks on each element positioned with respect to said scanning means for generating a signal to reset said counter means to a zero state, and means responsive to the output signal derived from said counter means for rendering operative the transfer means next in order to withdraw elements from the magazine associated therewith.

26. A device for sorting a plurality of elements having code thereon arranged in a number of adjacent rows and columns and a control mark associated with each column of code comprising a first group of magazines aligned in a row, a second group of magazines aligned in a row and with said first group of magazines, said magazines being adapted to have said elements inserted into and withdrawn from the same open end, means arranged between said first and second groups of magazines for scanning the code of each column simultaneously and the columns of code successively on each element presented thereto to determine the magazine into which each element is to be inserted, means arranged with respect to said magazines for transporting said elements individually from any magazine of one group past said scanning means to any magazine of the other group, transfer means arranged with respect to said transporting means and to each of said magazines, the transfer means for one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, plugboard means for establishing the direction of movement of said transporting means and the function of said transfer means with respect to each group of magazines, an electronic counter means responsive to absence of successive elements with respect to said scanning means for providing an output signal with a predetermined count, means cyclically actuated in timed relation to positioning of an element with respect to said scanning means for providing a signal to pulse said counter means, means responsive to the control marks on each element positioned with respect to said scanning means for generating a signal to reset said counter means to a zero state, means responsive to the output signal derived from said counter means for rendering operative the transfer means next in order to withdraw elements from the magazine associated therewith, and means responsive to the output signal derived from said counter means with respect to the last transfer means in said order for reversing said transporting means and switching the functions of said transfer means with respect to each group of magazines.

27. A device for sorting a plurality of elements having code thereon arranged in a number of adjacent rows and columns and a control mark associated with each column of code comprising a first group of magazines aligned in a row, a second group of magazines aligned in a row and with said first group of magazines, said magazines being adapted to have said elements inserted into and withdrawn from the same open end, means arranged between said first and second group of magazines for scanning the code of each column simultaneously and the columns of code successively on each element to determine the magazine into which each element is to be inserted, means including an endless conveyor provided with a plurality of apertures and arranged below said groups of magazines for transporting said elements individually from any magazine in said first group past said scanning means to any magazine in said second group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, to withdraw said elements individually from the respective magazine and position each element on said conveyor over the aligned aperture and to move an element arranged over the aperture into the respective magazine, means for generating a cyclic pulse in timed relation to positioning of each of said apertures with respect to said scanning means, a synchronous drive means including means for imparting intermittent motion to said conveyor, means for imparting reciprocatory motion to said transfer means and means for imparting rotary motion to said pulse generating means, means for operatively connecting said transfer means in said first group of magazines to said reciprocatory means in a predetermined order to withdraw the elements, means responsive to the code on each element positioned with respect to said scanning means for operatively connecting the transfer means in the second group of magazines to said reciprocatory means upon movement of the element into position with respect to the magazine designated by the code thereon, plugboard means for establishing the direction of movement of said transporting means and the function of said transfer means with respect to each group of magazines, an electronic counter means responsive to said cyclic pulse for providing an output signal with a predetermined number of said pulses, means responsive to the control marks on each element positioned with respect to said scanning means for generating a signal to reset said counter means to a zero state, and means responsive to the output signal derived from said counter means for rendering operative the transfer means next in order to withdraw elements from the magazine associated therewith.

28. A device for sorting a plurality of elements having code thereon arranged in a number of adjacent rows and columns and a control mark associated with each column of code comprising a first group of magazines aligned in a row, a second group of magazines aligned in a row and with said first group of magazines, said magazines being adapted to have said elements inserted into and withdrawn from the same open end, means arranged between said first and second group of magazines for scanning the code of each column simultaneously and the columns of code successively on each element to determine the magazine into which each element is to be inserted, means including an endless conveyor provided with a plurality of apertures and arranged below said groups of magazines for transporting said elements individually from any magazine in said first group past said scanning means to any magazine in said second group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, to withdraw said elements individually from the respective magazine and position each element on said conveyor over the aligned aperture and to move an element arranged over the aperture into the respective magazine, means for generating a cyclic pulse in timed relation to positioning of each of said apertures with respect to said scanning means, a synchronous drive means including means for imparting intermittent motion to said conveyor, means for imparting reciprocatory motion to said transfer means and means for imparting rotary motion to said pulse generating means, means for operatively connecting said transfer means in said first group of magazines to said reciprocatory means in a predetermined order to withdraw the elements, means responsive to the code on each element positioned with respect to said scanning means for operatively connecting the transfer means in the second group of magazines to said reciprocatory means upon movement of the element into position with respect to the magazine designated by the code thereon, plugboard means for establishing the direction of movement of said transporting means and the function of said transfer means with respect to each group of magazines, an electronic counter means responsive to said cyclic pulse for providing an output signal with a predetermined number of said pulses, means responsive to the control marks on each element positioned with respect to said scanning means for generating a signal to reset said counter means to a zero state, means responsive to the output signal derived from said counter means for rendering operative the transfer means next in order to withdraw elements from the magazine associated therewith, and means responsive to the output signal derived from said counter means with respect to the last transfer means in said order for reversing said drive means and switching the functions of said transfer means with respect to each group of magazines.

29. A device for sorting a plurality of elements having code thereon arranged in a number of adjacent rows and columns and a control mark associated with each column of code, said elements including multiple related elements having code to identify the first and last of such related elements, comprising a first group of magazines aligned in a row, a second group of magazines aligned in a row and with said first group of magazines, said magazines being adapted to have said elements inserted into and withdrawn from the same open end, means arranged between said first and second group of magazines for scanning the code of each column simultaneously and the columns of code successively on each element presented thereto to determine the magazine into which each element is to be inserted, means arranged with respect to said magazines of each group for transporting said elements individually from any magazine of one group past said scanning means to any magazine of the other group, transfer means arranged with respect to said transporting means and to each of said magazines, the transfer means of one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, plugboard means for establishing the direction of movement of said transporting means with respect to each group of magazines, an electronic counter means responsive to absence of successive elements with respect to said scanning means for providing an output signal with a first predetermined count and with a second and greater predetermined count, means cyclically actuated in timed relation to positioning of an element with respect to said scanning means for providing a signal to pulse said counter means, means responsive to the control marks on each element positioned with respect to said scanning means for generating a signal to reset said counter means to a zero state, means responsive to said second count output signal for rendering operative the transfer means next in order to withdraw elements from the magazine associated therewith, means arranged with respect to each group of magazines for providing a signal when any one of said stations has received its full complement of elements, and means responsive to said first count output signal and said last-mentioned signal for delaying stoppage of said transport means for a predetermined interval to permit detection of single elements and of any of said multiple-related elements by said scanning means to retain such elements in order.

30. A device for sorting a plurality of elements having code thereon arranged in a number of adjacent rows and columns and a control mark associated with each column of code, said elements including multiple related elements having code to identify the first and last of such related elements, comprising a first group of magazines aligned in a row, a second group of magazines aligned in a row and with said first group of magazines, said magazines being adapted to have said elements inserted into and withdrawn from the same open end, means arranged between said first and second group of magazines for scanning the code of each column simultaneously and the columns of code successively on each element presented thereto to determine the magazine into which each element is to be inserted, means arranged with respect to said magazines of each group for transporting said elements individually from any magazine of one group past said scanning means to any magazine of the other group, transfer means arranged with respect to said transporting means and to each of said magazines, the transfer means of one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, plugboard means for establishing the direction of movement of said transporting means with respect to each group of magazines, an electronic counter means responsive to absence of successive elements with respect to said scanning means for providing an output signal with a first predetermined count and with a second and greater predetermined count, means cyclically actuated in timed relation to positioning of an element with respect to said scanning means for providing a signal to pulse said counter means, means responsive to the control marks on each element positioned with respect to said scanning means for generating a signal to reset said counter means to a zero state, means responsive to said second count output signal for rendering operative the transfer means next in order to withdraw elements from the magazine associated therewith, light-responsive means arranged with respect to each group of magazines for providing a signal when any one of said magazines has received its full complement of elements, and a plurality of relays arranged for sequential operation in response to said first count output signal and the signal derived from said light-responsive means for delaying stoppage of said transport means for a predetermined interval to permit detection of single elements and of any of said multiple-related elements by said scanning means to retain such elements in order.

31. A device for sorting a plurality of elements having code thereon arranged in a number of adjacent rows and columns and a control mark associated with each column of code comprising a first group of magazines aligned in a row, a second group of magazines aligned in a row and with said first group of magazines, said magazines being adapted to have said elements inserted into and withdrawn from the same open end, means arranged between said first and second group of magazines for scanning the code of each column simultaneously and the columns of code successively on each element presented thereto to determine the magazine into which each element is to be inserted, means arranged with respect to said magazines of each group for transporting said elements individually from any magazine of one group past said scanning means to any magazine of the other group, transfer means arranged with respect to said transporting means and to each of said magazines, the transfer means of one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, plugboard means establishing the direction of movement of said transporting means with respect to each group of magazines, an electronic counter means responsive to absence of successive elements with respect to said scanning means for providing an output signal with a first predetermined count and with a second and greater predetermined count, means cyclically actuated in timed relation to positioning of an element with respect to said scanning means for providing a signal to pulse said counter means, means responsive to the control marks on each element positioned with respect to said scanning means for generating a signal to reset said counter means to a zero state, means responsive to said second count output signal for rendering operative the transfer means next in order to withdraw elements from the magazine associated therewith, and circuit means including a manually operative switch associated with each magazine in each of said groups, said circuit means being responsive to said first count output signal when the switch corresponding to the magazine from which elements are being withdrawn is in its closed position, for arresting said transport means and preventing actuation of the transfer means next in order to permit additional elements to be inserted in the respective magazine.

32. A device for sorting a plurality of elements having code thereon arranged in a number of adjacent rows and columns and a control mark associated with each column of code comprising a first group of magazines aligned in a row, a second group of magazines aligned in a row and with said first group of magazines, said magazines being adapted to have said elements inserted into and withdrawn from the same open end, means arranged between said first and second group of magazines for scanning the code of each column simultaneously and the columns of code successively on each element presented thereto to determine the magazine into which each element is to be inserted, means arranged with respect to said magazines of each group for transporting said elements individually from any magazine of one group past said scanning means to any magazine of the other group, transfer means arranged with respect to said transporting means and to each of said magazines, the transfer means of one group being rendered operative in order for withdrawing elements individually from each magazine to position said elements on said transporting means and the transfer means of the other group being rendered operative in response to said scanning means, when the element is positioned with respect to the magazine corresponding to the code thereon, for moving the element from said transporting means and inserting the element into the designated magazine, plugboard means for establishing the direction of movement of said transporting means with respect to each group of magazines, an electronic counter means responsive to absence of successive elements with respect to said scanning means for providing an output signal with a first predetermined count and with a second and greater predetermined count, means cyclically actuated in timed relation to positioning of an element with respect to said scanning means for providing a signal to pulse said counter means, means responsive to the control marks on each element positioned with respect to said scanning means for generating a signal to reset said counter means to a zero state, means responsive to said second count output signal for rendering operative the transfer means next in order to withdraw elements from the magazine associated therewith, circuit means including a manually operative switch associated with each magazine in each of said groups, said circuit means being responsive to said first count output signal when the switch corresponding to the magazine from which elements are being withdrawn is in its closed position, for arresting said transport means and preventing actuation of the transfer means next in order to permit additional elements to be inserted in the respective magazine, and reset means for rendering said transport means operative and resetting said counter means to said zero state to continue withdrawal of said elements from said same magazine.

33. A device for sorting a plurality of elements having code thereon arranged in a number of rows and columns, the code of each column being representative of at least two characters, and a control mark associated with each column of code, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of the characters in only a predetermined column of code and a signal from each control mark associated with each of said code columns, means arranged with respect to said magazines for transporting said elements individually from any magazine of one group past said scanning means to any magazine of the other group, transfer means arranged with respect to said transporting means and to each of the said magazines, the transfer means for one group being rendered operative in order for withdrawing elements individually from each magazine to position said elements on said transporting means, a plurality of relays equivalent in number to the characters in a column and individually and selectively actuatable for permitting transmission of only the digital signals corresponding to the sortation character, plugboard means for establishing the sortation column and character position in the sortation column for each movement of the elements past said scanning means, the direction of movement of said transporting means and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count, means responsive to said counter output pulse for generating a gating pulse, a sort channel circuit responsive to said digital signals and to said gating pulse for converting said digital signals to an electrical signal representative of said sortation character, means associated with said transporting means for generating periodic pulses, and memory means connected to said sort channel for receiving and storing said electrical signals and responsive to said periodic pulses for releasing the stored signals in a timed relation to render operative the transfer means of the other group, when the element corresponding to the stored electrical signal is positioned with respect to the magazine corresponding to code thereon, for moving the element from said transporting means and into said magazine.

34. A device for sorting a plurality of elements having code thereon arranged in a number of rows and columns, the code of each column being representative of at least two characters, and a control mark associated with each column of code, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of the characters in only a predetermined column of code and a signal from each control mark associated with each of said code columns, means arranged with respect to said magazines for transporting said elements individually from any magazine of one group past said scanning means to any magazine of the other group, transfer means arranged with respect to said transporting means and to each of the said magazines, the transfer means of one group being rendered operative in order for withdrawing elements individually from each magazine to position said elements on said transporting means, a plurality of relays equivalent in number to the characters in a column and individually and selectively actuatable for permitting transmission of only the digital signals corresponding to the sortation character, plugboard means for establishing the sortation column and character position in the sortation column for each movement of the elements past said scanning means, the direction of movement of said transporting means and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count, means responsive to said counter output pulse for generating a gating pulse, a sort channel circuit responsive to said digital signals and to said gating pulse for converting said digital signals to an electrical signal representative of said sortation character, means associated with said transporting means for generating periodic pulses, memory means connected to said sort channel for receiving and storing said electrical signals and responsive to said periodic pulses for releasing the stored signals in a timed relation to render operative the transfer means of the other group, when the element corresponding to the stored electrical signal is positioned with respect to the magazine corresponding to code thereon, for moving the element from said transporting means and into said magazine, and means actuated in response to the absence of an element with respect to said scanning means, after a predetermined interval, for rendering operative the transfer means next in order to withdraw elements from the magazine associated therewith.

35. A device for sorting a plurality of elements having code thereon arranged in a number of rows and columns, the code of each column being representative of at least two characters, and a control mark associated with each column of code, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of the characters in only a predetermined column of code and a signal from each control mark associated with each of said code columns, means arranged with respect to said magazines for transporting said elements individually from any magazine of one group past said scanning means to any magazine of the other group, transfer means arranged with respect to said transporting means and to each of the said magazines, the transfer means for one group being rendered operative in order for withdrawing elements individually from each magazine to position said elements on said transporting means, a plurality of relays equivalent in number to the characters in a column and individually and selectively actuatable for permitting transmission of only the digital signals corresponding to the sortation character, plugboard means for establishing the sortation column and character position in the sortation column for each movement of the elements past said scanning means, the direction of movement of said transporting means and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count, means responsive to said counter output pulse for generating a gating pulse, a sort channel circuit responsive to said digital signals and to said gating pulse for converting said digital signals to an electrical signal representative of said sortation character, means associated with said transporting means for generating periodic pulses, memory means connected to said sort channel for receiving and storing said electrical signals and responsive to said periodic pulses for releasing the stored signals in a timed relation to render operative the transfer means of the other group, when the element corresponding to the stored electrical signal is positioned with respect to the magazine corresponding to code thereon, for moving the element from said transporting means and into said magazine, means actuated in response to the absence of an element with respect to said scanning means, after a predetermined interval, for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

36. A device for sorting a plurality of elements having code arranged thereon in a number of rows and columns, the code of each column being representative of at least two characters, and a control mark associated with each column of code, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of the characters in only a predetermined column of code and a signal from each control mark associated with each of said code columns, means including an endless conveyor provided with a plurality of apertures and arranged below said groups of magazines for transporting said elements individually from any magazine in said first group past said scanning means to any magazine in said second group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a cyclic pulse in timed relation to positioning of each of said apertures with respect of said scanning means, a synchronous drive means including means for imparting intermittent motion to said conveyor, means for imparting reciprocatory motion to said transfer means, and means for imparting rotary motion to said pulse generating means, means for operatively connecting said transfer means in said first group of magazines to said reciprocatory means in a predetermined order to withdraw the elements individually from the respective magazine and position each element on said conveyor over the aligned aperture, a plurality of relays equivalent in number to the characters in a column and individually and selectively actuatable for permitting transmission of only the digital signals corresponding to the sortation character, plugboard means for establishing the sortation column and sortation character position in the sortation column for each movement of the elements past said scanning means, the direction of movement of said transporting means, and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count, means responsive to said counter output pulse and the synchronizing pulse derived from the sortation column control mark for generating a gating pulse, a sort channel circuit responsive to said digital signals and to said gating pulse for converting the digital signals representative of the sortation character to an electrical signal and delivering said electrical signal via a sort channel line corresponding to the magazine of said second group into which the element is to be inserted, memory means including a plurality of registers equivalent in number to the magazines comprising a group, each register being associated with one of said magazines and connected to its respective sort channel line for receiving and storing the electrical signal, said registers being responsive to said cyclic pulses for stepping said stored electrical signals through each register to provide an output signal coincident with positioning of the element corresponding to the stored electrical signal with respect to the respective magazine, and means responsive to said last-mentioned output signal for connecting the transfer means of said second group and associated with said respective magazine to said reciprocatory means to move the element from said conveyor and into said magazine.

37. A device for sorting a plurality of elements having code arranged thereon in a number of rows and columns, the code of each column being representative of at least two characters, and a control mark associated with each column of code, comprising a first group of magazines aligned in a row, a second group of magazines aligned in a row and with said first group of magazines, said magazines in each group being equivalent in number and adapted to have said elements inserted into and withdrawn from the same open end, means arranged between said first and second group of magazines for scanning the code of each column simultaneously and the columns of code successively on each of said elements presented thereto to derive digital signals representative of the characters in only a predetermined column of code and a signal from each control mark associated with each of said code columns, means including an endless conveyor provided with a plurality of apertures and arranged below said groups of magazines for transporting said elements individually from any magazine in said first group past said scanning means to any magazine in said second group, said apertures being spaced so as to be aligned with the open ends of the magazines when said conveyor is stationary, transfer means arranged with respect to said conveyor and to each magazine in said groups for movement through the aperture aligned therewith, when said conveyor is stationary, means for generating a cyclic pulse in timed relation to positioning of each of said apertures with respect of said scanning means, a synchronous drive means including means for imparting intermittent motion to said conveyor, means for imparting reciprocatory motion to said transfer means, and means for imparting rotary motion to said pulse generating means, means for operatively connecting said transfer means in said first group of magazines to said reciprocatory means in a predetermined order to withdraw the elements individually from the respective magazine and position each element on said conveyor over the aligned aperture, a plurality of relays equivalent in number to the characters in a column and individually and selectively actuatable for permitting transmission of only the digital signals corresponding to the sortation character, plugboard means for establishing the sortation column and sortation character position in the sortation column for each movement of the elements past said scanning means, the direction of movement of said transporting means, and the function of said transfer means with respect to each group of magazines, synchronizing means responsive to each of said control mark signals for deriving a series of synchronizing signals therefrom, counter means preset to a count corresponding to the sortation column and responsive to said synchronizing signals for providing an output pulse upon reaching said count, means responsive to said counter output pulse and the synchronizing pulse derived from the sortation column control mark for generating a gating pulse, a sort channel circuit responsive to said digital signals and to said gating pulse for converting the digital signals representative of the sortation character to an electrical signal and delivering said electrical signal via a sort channel line corresponding to the magazine of said second group into which the element is to be inserted, memory means including a plurality of registers equivalent in number to the magazines comprising a group, each register being associated with one of said magazines and connected to its respective sort channel line for receiving and storing the electrical signal, said registers being responsive to said cyclic pulses for stepping said stored electrical signals through each register to provide an output signal coincident with positioning of the element corresponding to the stored electrical signal with respect to the respective magazine, means responsive to said last-mentioned output signal for connecting the transfer means of said second group and associated with said respective magazine to said reciprocatory means to move the elements from said conveyor and into said magazine, means actuated in response to the absence of an element with respect to said scanning means, after a predetermined interval, for rendering operative the transfer means next in order to withdraw elements from the magazine associated therewith, and means actuated in response to the absence of an element with respect to said scanning means, after removal of the last element in the last magazine of said one group, for reversing said transporting means and switching the functions of said transfer means with respect to each group of magazines.

References Cited in the file of this patent

UNITED STATES PATENTS

| | | |
|---|---|---|
| 2,265,441 | Maul | Dec. 9, 1941 |
| 2,540,654 | Cohen et al. | Feb. 6, 1951 |
| 2,624,786 | Potter | Jan. 6, 1953 |
| 2,749,533 | Daniels | June 5, 1956 |
| 2,795,328 | Tyler | June 11, 1957 |

FOREIGN PATENTS

| | | |
|---|---|---|
| 792,109 | Great Britain | Mar. 19, 1958 |

UNITED STATES PATENT OFFICE
CERTIFICATE OF CORRECTION

Patent No. 2,996,184  
August 15, 1961

Wesley B. Barton et al.

It is hereby certified that error appears in the above numbered patent requiring correction and that the said Letters Patent should read as corrected below.

Column 40, lines 45 and 46, strike out -- coextensive --; line 50, after "code" insert -- of each column simultaneously and the columns of code successively --; line 53, after "mark" insert -- associated with each of said code columns --; line 56, before "from" insert -- individually --; line 58, before "transfer" insert -- said apertures being spaced so as to be aligned with the open ends of the magazines when said conveyor is stationary. --; line 64, before "drive" insert -- synchronous --; column 41, line 5, after "character" insert -- positions in the sortation column --; line 28, before "line" insert -- sort channel --.

Signed and sealed this 22nd day of May 1962.

(SEAL)  
Attest:  
ERNEST W. SWIDER  
Attesting Officer

DAVID L. LADD  
Commissioner of Patents